(12) United States Patent
Yu

(10) Patent No.: US 11,588,741 B2
(45) Date of Patent: Feb. 21, 2023

(54) SERVICE FLOW PROCESSING METHOD, COMMUNICATION METHOD, AND APPARATUS

(71) Applicant: Huawei Technologies Co., Ltd., Shenzhen (CN)

(72) Inventor: Youyang Yu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 59 days.

(21) Appl. No.: 17/172,722

(22) Filed: Feb. 10, 2021

(65) Prior Publication Data

US 2021/0168079 A1 Jun. 3, 2021

Related U.S. Application Data

(63) Continuation of application No. PCT/CN2019/098659, filed on Jul. 31, 2019.

(30) Foreign Application Priority Data

Aug. 13, 2018 (CN) .......................... 201810918635.8

(51) Int. Cl.
- *H04L 47/24* (2022.01)
- *H04L 43/0882* (2022.01)
- *H04L 47/20* (2022.01)
- *H04L 67/148* (2022.01)
- *H04L 67/51* (2022.01)

(52) U.S. Cl.
CPC .......... *H04L 47/24* (2013.01); *H04L 43/0882* (2013.01); *H04L 47/20* (2013.01); *H04L 67/148* (2013.01); *H04L 67/51* (2022.05)

(58) Field of Classification Search
CPC ..... H04L 47/24; H04L 43/0882; H04L 47/20; H04L 67/148; H04L 67/51; H04W 28/0804; H04W 28/0925; H04W 28/10; H04W 24/08
See application file for complete search history.

(56) References Cited

U.S. PATENT DOCUMENTS

| | | | |
|---|---|---|---|
| 10,111,135 | B2 | 10/2018 | Schwarzbauer et al. |
| 2012/0307658 | A1 | 12/2012 | Xia et al. |

(Continued)

FOREIGN PATENT DOCUMENTS

| | | |
|---|---|---|
| CN | 102238632 A | 11/2011 |
| CN | 103188725 A | 7/2013 |

(Continued)

OTHER PUBLICATIONS

Ericsson,"Various corrections due to editorial problems detected during CR implementation after RAN-39",3GPP TSG RAN WG2 meeting #62 R2-082144,Kansas City, Missouri, US, May 5-9, 2008, 1491 pages.

(Continued)

*Primary Examiner* — Benjamin M Thieu

(74) *Attorney, Agent, or Firm* — Conley Rose, P.C.

(57) ABSTRACT

A service flow processing method includes obtaining, by a terminal, policy information of a service flow, where the policy information includes at least one of a flow steering policy, a flow steering mode, and link condition information for transmitting the service flow, and a packet data unit (PDU) session to which the service flow belongs supports a plurality of access technologies, and processing, by the terminal, the service flow based on the policy information.

20 Claims, 28 Drawing Sheets

(56) References Cited

U.S. PATENT DOCUMENTS

| | | |
|---|---|---|
| 2015/0113160 A1 | 4/2015 | Sun et al. |
| 2016/0183125 A1 | 1/2016 | Sun et al. |
| 2017/0231020 A1 | 8/2017 | Tomici et al. |
| 2018/0027451 A1 | 1/2018 | Sun et al. |

FOREIGN PATENT DOCUMENTS

| | | |
|---|---|---|
| CN | 103491578 A | 1/2014 |
| CN | 103857011 A | 6/2014 |
| CN | 103929740 A | 7/2014 |
| CN | 104125608 A | 10/2014 |
| CN | 106105382 A | 11/2016 |
| EP | 2919529 A1 | 9/2015 |
| EP | 3018934 A1 | 5/2016 |
| EP | 3282752 A1 | 2/2018 |
| WO | 2016161937 A1 | 10/2016 |
| WO | 2017182927 A1 | 10/2017 |
| WO | 2017194768 A1 | 11/2017 |
| WO | 2018062949 A1 | 4/2018 |
| WO | 2018130968 A1 | 7/2018 |

OTHER PUBLICATIONS

3GPP TS 23.501 V15.2.0, Jun. 2018, "3rd Generation Partnership Project; Technical Specification Group Services and System Aspects; System Architecture for the 5G System; Stage 2 (Release 15)," 216 pages.

3GPP TS 23.502 V15.2.0, Jun. 2018, "3rd Generation Partnership Project; Technical Specification Group Services and System Aspects; Procedures for the 5G System; Stage 2 (Release 15)," 308 pages.

3GPP TR 23.793 V0.5.0, "3rd Generation Partnership Project;Technical Specification Group Services and System Aspects; Study on Access Traffic Steering, Switching and Splitting support in the 5G system architecture (Release 16)," Jun. 2018, 68 pages.

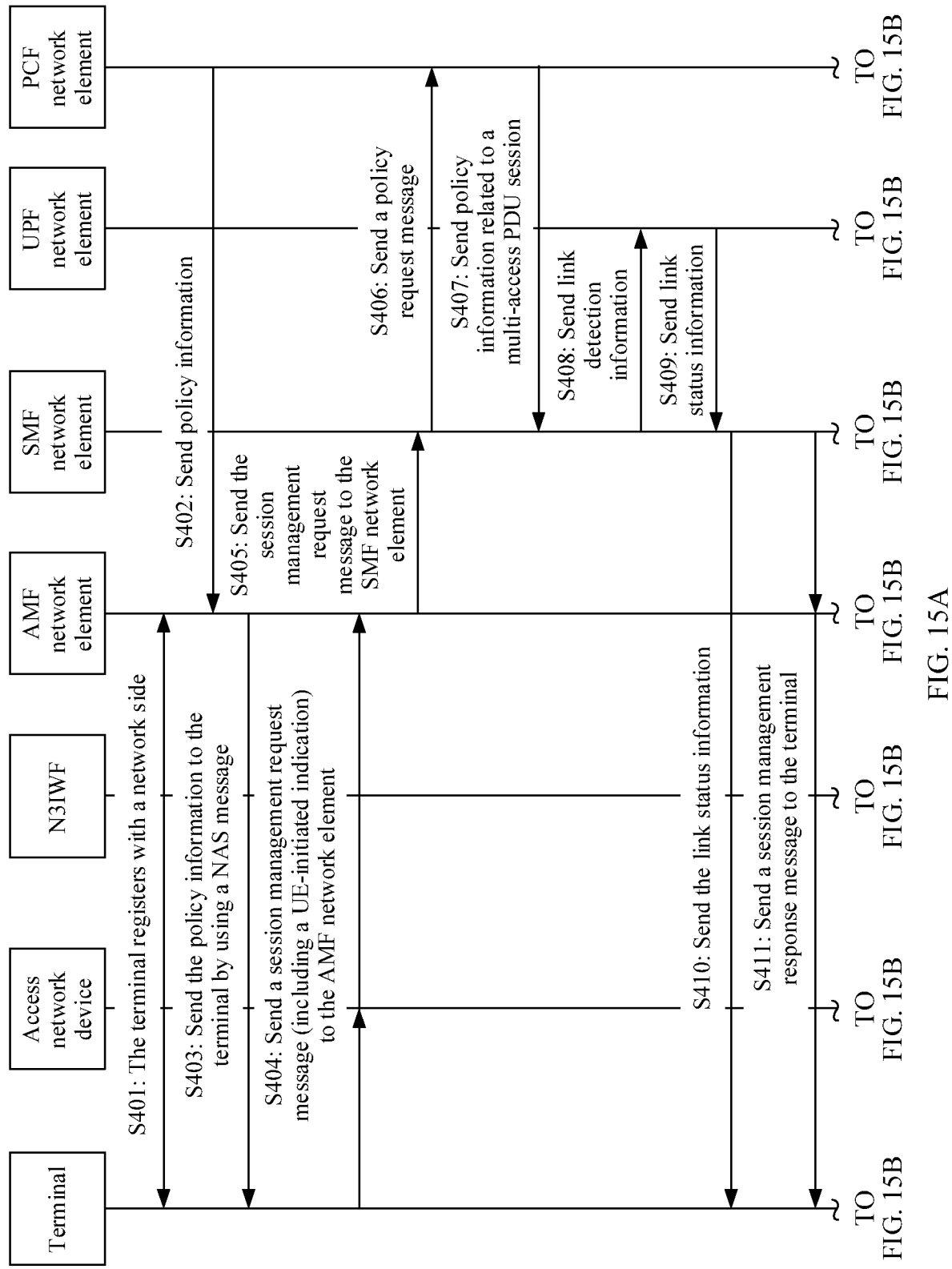

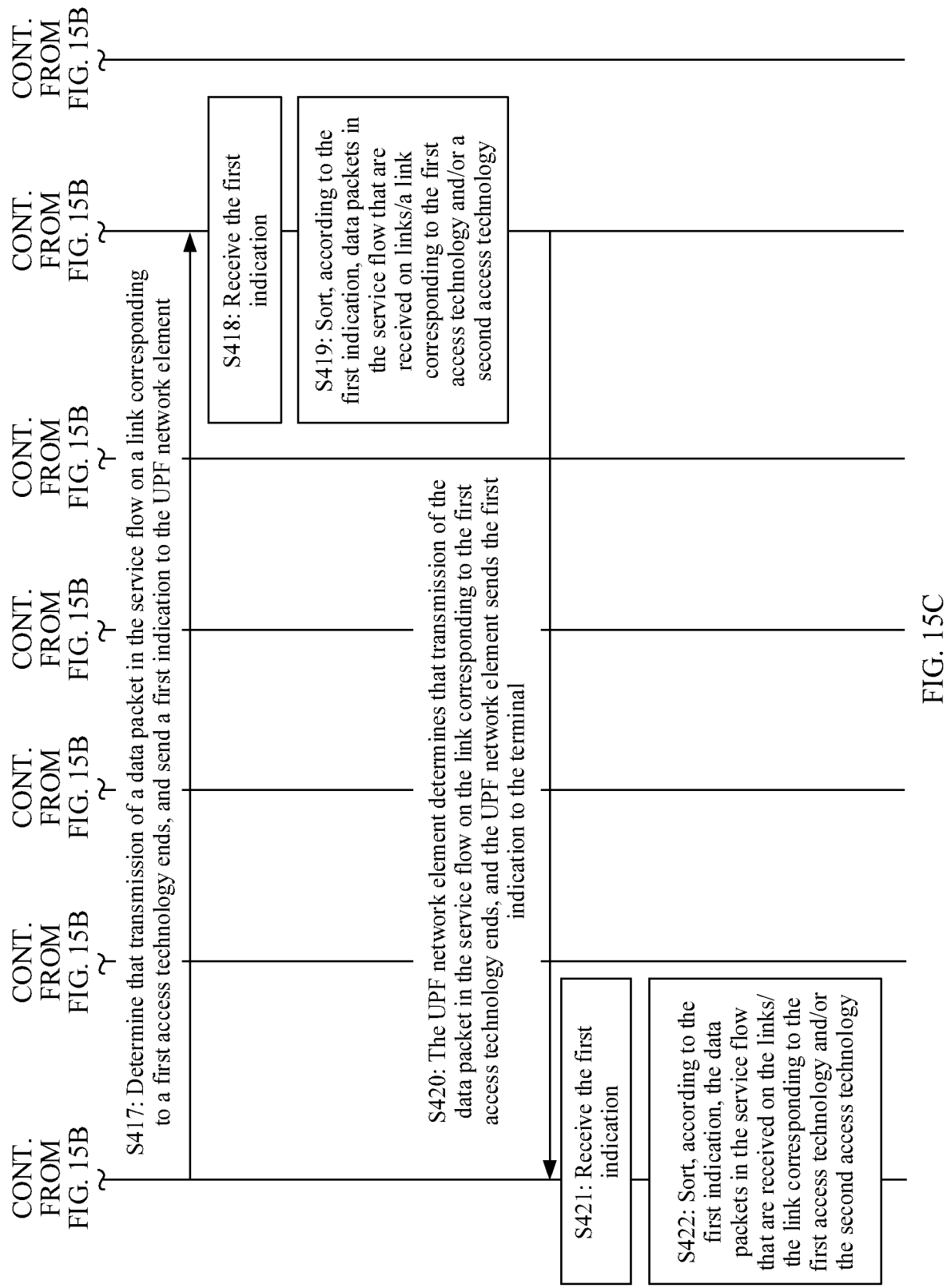

SERVICE FLOW PROCESSING METHOD, COMMUNICATION METHOD, AND APPARATUS

CROSS-REFERENCE TO RELATED APPLICATION

This application is a continuation of International Patent Application No. PCT/CN2019/098659 filed on Jul. 31, 2019, which claims priority to Chinese Patent Application No. 201810918635.8 filed on Aug. 13, 2018. The disclosure of the aforementioned applications are hereby incorporated by reference in their entireties.

TECHNICAL FIELD

Embodiments of this application relate to the field of communications technologies, and in particular, to a service flow processing method, a communication method, and an apparatus.

BACKGROUND

To face a challenge from a wireless broadband technology and keep a leading advantage of a 3rd Generation Partnership Project (3GPP) network, the 3GPP standard group formulates a next generation mobile communications network architecture (Next Generation System), which is referred to as a 5th generation (5G) network architecture. The 5G network architecture supports a terminal in accessing a core network by using a wireless technology (for example, Long-Term Evolution (LTE) or a 5G radio access network (RAN)) defined by the 3GPP standard group, and supports access to the core network by using a non-3GPP access technology through a non-3GPP interworking function (N3IWF) or a next generation packet data gateway (ngPDG).

In a 5G network, there is a packet data unit (PDU) session used to provide a data transmission channel between user equipment (UE) and a data network (DN). A single PDU session may support a plurality of access technologies. As shown in FIG. 1, a PDU session A may support a first access technology, or may support a second access technology, or may support both a first access technology and a second access technology.

When a PDU session supports a plurality of access technologies, a network side may configure a flow steering policy for UE, to indicate the UE to move a service flow between different access technologies. For example, the flow steering policy indicates that a service flow 1 is transmitted by using a first access technology, and a subsequent service flow 1 is transmitted by using a second access technology. However, according to a solution from another approach, refined processing on the service flow cannot be implemented.

SUMMARY

Embodiments of the present disclosure provide a service flow processing method, a communication method, and an apparatus, to resolve a problem in other approaches that an expected effect cannot be achieved after a service flow moves.

To resolve the foregoing technical problem, the embodiments of this application provide the following solutions.

According to a first aspect, an embodiment of this application provides a service flow processing method, including a terminal obtains policy information of a service flow, where the policy information includes at least one of a flow steering policy, a flow steering mode, and link condition information for transmitting the service flow, and a PDU session to which the service flow belongs supports a plurality of access technologies. The terminal processes the service flow based on the policy information.

According to the service flow processing method provided in this embodiment of this application, the terminal obtains the policy information of the service flow, and processes the service flow based on the policy information of the service flow. Because the terminal processes the service flow based on the at least one of the flow steering policy, the flow steering mode, and the link condition information that are delivered by a network side, the processed service flow can be transmitted on a link that meets the link condition information, and the terminal can implement more refined processing on the service flow.

In a possible design, the method provided in this embodiment of this application further includes the terminal sends, to a core network element, link detection information used to obtain link status information of a link. The terminal receives link status information from the core network element. In this way, the terminal determines, based on the link status information sent by the network side, whether a link for transmitting the service flow meets the link condition information, to determine whether to process the service flow.

In a possible design, that the terminal processes the service flow based on the policy information includes the terminal determines that link status information of a target link meets the link condition information or link status information of a current link does not meet the link condition information. The terminal processes the service flow based on at least one of the flow steering policy and the flow steering mode. The terminal processes the service flow when the link status information of the current link does not meet the link condition information or the link status information of the target link meets the link condition information. This ensures that after migration, the service flow is transmitted on a link that meets a requirement.

In a possible design, that the terminal processes the service flow includes the terminal transmits the service flow on links corresponding to the plurality of access technologies. Alternatively, the terminal migrates the service flow from a link corresponding to a first access technology in the plurality of access technologies to a link corresponding to a second access technology in the plurality of access technologies for transmission. Alternatively, the terminal migrates the service flow from links corresponding to the plurality of access technologies to a link corresponding to a first access technology or a second access technology in the plurality of access technologies for transmission. Alternatively, the terminal initiates a processing procedure of the service flow.

In a possible design, the link detection information includes at least one of a subscribed link status parameter and sending condition information of the subscribed link status parameter. In this way, the network side can determine to detect specific parameters of a link, to send link status information required by the terminal.

In a possible design, the subscribed link status parameter includes one or more of the following access network signal quality, access network signal strength, access network bandwidth, access network load, backhaul network bandwidth or load, a link delay parameter, a link packet loss rate parameter, and a link jitter parameter.

In a possible design, the link detection information further includes one or more of the following an access technology indication, a guaranteed bit rate (GBR) indication, a non-GBR indication, a quality of service flow identifier (QFI), and a flow description parameter.

In a possible design, the link detection information further includes sending frequency information of the subscribed link status parameter. The sending frequency information is set, so that the network side can periodically report the subscribed link status parameter based on the frequency information.

In a possible design, the link condition information includes at least one of access-related condition information and access-independent condition information.

In a possible design, the access-related condition information includes one or more of the following an access network signal strength threshold, an access network signal quality threshold, a backhaul bandwidth threshold or load threshold, an access network bandwidth threshold, and an access network load threshold. The access-independent condition information includes at least one or more of the following a link delay threshold, a link packet loss rate threshold, and a link jitter threshold.

In a possible design, that a terminal obtains policy information of a service flow includes the terminal obtains, from a non-access stratum (NAS) transport message, at least one of the flow steering mode of the service flow and the link condition information for transmitting the service flow that are from a policy control network element. The terminal obtains, from a session management response message from a session management network element, at least one of the flow steering policy of the service flow, the flow steering mode of the service flow, and the link condition information for transmitting the service flow.

In a possible design, that the terminal processes the service flow based on the policy information includes the terminal migrates, based on the policy information, the service flow from the link corresponding to the first access technology in the plurality of access technologies to the link corresponding to the second access technology in the plurality of access technologies for transmission. The terminal determines that transmission of a data packet in the service flow from using the first access technology ends. The terminal sends a first indication to a user plane function (UPF) network element, where the first indication indicates that transmission of the data packet in the service flow transmitted by using the first access technology ends.

In a possible design, the method provided in this embodiment of this application further includes the terminal sends indication information to the core network element, where the indication information indicates that the terminal processes the service flow.

In a possible design, the flow steering mode includes one or more of the following an access technology preference indication, used to indicate that the service flow is preferably transmitted by using an access technology associated with the access technology preference indication, an optimal link-based flow steering indication, used to indicate that the service flow is preferably transmitted by using an optimal link, where the optimal link is a link whose link state is better than that of another link, a link load balancing-based flow steering indication, used to indicate that the service flow is transmitted according to a link load balancing policy, an access technology and flow steering percentage indication, used to indicate that the service flow is transmitted based on a flow steering percentage corresponding to the access technology, and a redundant transmission indication, used to indicate that same data packets in the service flow are simultaneously transmitted by using different access technologies.

In a possible design, the method provided in this embodiment of this application further includes the terminal receives the link status information or the link status parameter, and at least one of the access technology indication, the GBR indication, the non-GBR indication, the QFI, and the flow description parameter that are from the network side.

In a possible design, the method provided in this embodiment of this application further includes the terminal receives link status information from an access network device, where the link status information is a recommended bandwidth value of the access network device. Alternatively, the terminal receives link status information from the session management network element or the user plane network element, where the link status information is a recommended bandwidth value of an access network device.

In a possible design, that the terminal processes the service flow based on the policy information includes the terminal processes the service flow based on the policy information and the available bandwidth value.

According to a second aspect, an embodiment of this application provides a communication method, including a session management network element obtains policy information of a service flow, where the policy information includes at least one of a flow steering policy, a flow steering mode, and link condition information for transmitting the service flow, and a PDU session to which the service flow belongs supports a plurality of access technologies. The session management network element sends the policy information to a terminal.

In a possible design, the method provided in this embodiment of this application further includes the session management network element receives link detection information from the terminal, where the link detection information is used to obtain link status information of a link for transmitting the service flow. In this way, a network side can determine to obtain specific link detection parameters.

In a possible design, the method provided in this embodiment of this application further includes the session management network element sends the link detection information to a user plane network element. The session management network element receives link status information from the user plane network element. The session management network element sends the link status information to the terminal.

In a possible design, the method provided in this embodiment of this application further includes the session management network element sends a link status parameter and at least one of an access technology indication, a GBR indication, a non-GBR indication, a QFI, and a flow description parameter to the terminal.

In a possible design, the method provided in this embodiment of this application further includes the session management network element sends a first indication to the user plane network element, where the first indication indicates a link whose link status information needs to be sent.

In a possible design, the first indication includes at least one of the QFI, the access technology indication, a tunnel identifier, the GBR indication, the non-GBR indication, and the flow description parameter.

In a possible design, the method provided in this embodiment of this application further includes the session management network element sends the QFI and a notification indication to an access network device, where the QFI and the notification indication are used to indicate to send a recommended bandwidth value of the access network device to the session management network element or the user plane network element when the access network device cannot meet a bandwidth requirement of a quality of service (QoS) flow corresponding to the QFI.

In a possible design, the method provided in this embodiment of this application further includes the session management network element receives the QFI and the recommended bandwidth value of the access network device that are from the access network device. The session management network element sends the QFI and the recommended bandwidth value of the access network device to the terminal.

In a possible design, the method provided in this embodiment of this application further includes the session management network element receives a session management request message from the terminal, where the session management request message includes an access technology indication indicating that the terminal requests to transmit the service flow.

According to a third aspect, an embodiment of this application provides a service flow processing method, including a session management network element obtains policy information of a service flow, where the policy information includes at least one of a flow steering policy, a flow steering mode, and link condition information for transmitting the service flow, and a PDU session to which the service flow belongs supports a plurality of access technologies. The session management network element sends at least one access technology indication to a terminal based on the policy information, where the access technology indication indicates to migrate the service flow to a link corresponding to an access technology indicated by the access technology indication.

In a possible design, the method provided in this embodiment of this application further includes the session management network element sends link detection information to the terminal or a user plane network element, where the link detection information is used to obtain link status information of a link. The session management network element receives link status information from the terminal or the user plane network element.

In a possible design, that the session management network element sends at least one access technology indication to a terminal based on the policy information includes the session management network element determines that link status information of a target link meets the link condition information or link status information of a current link does not meet the link condition information. The session management network element sends the at least one access technology indication to the terminal based on at least one of the flow steering policy and the flow steering mode.

In a possible design, the method provided in this embodiment of this application further includes the session management network element generates the link detection information based on the policy information.

In a possible design, the method provided in this embodiment of this application further includes the session management network element sends, to the terminal or the user plane network element, a first indication used to indicate a link whose link status information needs to be sent.

In a possible design, the first indication includes at least one of a QFI, an access technology indication, a tunnel identifier, a GBR indication, a non-GBR indication, and a flow description parameter.

For specific content of the link detection information, the flow steering mode, the link condition information, and the link detection information, refer to the descriptions in the first aspect or the possible implementations of the first aspect. Details are not described herein again.

In a possible design, the method provided in this embodiment of this application further includes the session management network element receives first indication information from the terminal, where the first indication information indicates that a core network processes the service flow.

In a possible design, the method provided in this embodiment of this application further includes the session management network element sends the QFI and a notification indication to an access network device, where the QFI and the notification indication are used to indicate to send a recommended bandwidth value of the access network device to the session management network element or the user plane network element when the access network side cannot meet a bandwidth requirement of a QoS flow corresponding to the QFI.

In a possible design, the method provided in this embodiment of this application further includes the session management network element receives the QFI and the recommended bandwidth value of the access network device that are from the access network device. The session management network element sends the QFI and the recommended bandwidth value of the access network device to the terminal.

In a possible design, that a session management network element obtains policy information of a service flow includes the session management network element obtains the policy information of the service flow from a policy control network element in a session management procedure. Alternatively, the session management network element obtains the policy information of the service flow from a policy control network element when the terminal completes registration.

According to a fourth aspect, an embodiment of this application provides a service flow processing method, including a policy control network element obtains policy information of a service flow, where the policy information includes at least one of a flow steering policy, a flow steering mode, and link condition information for transmitting the service flow, and a PDU session to which the service flow belongs supports a plurality of access technologies. The policy control network element sends, to a session management network element based on the policy information, at least one updated access technology indication corresponding to the service flow, where the at least one access technology indication indicates to migrate the service flow to a link corresponding to an access technology indicated by the access technology indication.

For specific content of link detection information, the flow steering mode, the link condition information, and link detection information, refer to the descriptions in the first aspect or the possible implementations of the first aspect. Details are not described herein again.

In a possible design, the method provided in this embodiment of this application further includes the policy control network element sends link detection information to a terminal, or sends link detection information to the session management network element.

In a possible design, the method provided in this embodiment of this application further includes the policy control network element receives link status information from the session management network element.

In a possible design, that the policy control network element sends, to a session management network element based on the policy information, at least one updated access technology indication corresponding to the service flow includes the policy control network element determines, based on the obtained link status information of the service flow, that link status information of a current link does not meet the link condition information or link status information of a target link meets the link condition information, and sends the at least one updated access technology indication corresponding to the service flow to the session management network element.

In a possible design, the method provided in this embodiment of this application further includes after receiving a multi-access session indication from the session management network element, the policy control network element sends the policy information of the service flow to the session management network element.

In a possible design, the policy control network element receives indication information that is from the session management network element and that indicates the policy control network element to process the service flow.

According to a fifth aspect, an embodiment of this application provides a service flow processing method, including a user plane network element obtains policy information of a service flow, where the policy information includes at least one of a flow steering policy, a flow steering mode, and link condition information for transmitting the service flow. The user plane network element processes the service flow based on the policy information.

In a possible design, the method provided in this embodiment of this application further includes the user plane network element obtains link detection information from a session management network element.

In a possible design, the method provided in this embodiment of this application further includes the user plane network element sends, to a terminal, link status information obtained by the user plane network element based on the link detection information.

In a possible design, the method provided in this embodiment of this application further includes the user plane network element receives link status information that is of a current link or a target link and that is obtained by the terminal based on the link detection information.

In a possible design, that the user plane network element processes the service flow based on the policy information includes the user plane network element determines that the link status information of the current link does not meet or the link status information of the target link meets the link condition information, and processes the service flow based on at least one of the flow steering policy and the flow steering mode.

In a possible design, that the user plane network element determines that the link status information of the current link does not meet or the link status information of the target link meets the link condition information, and processes the service flow based on at least one of the flow steering policy and the flow steering mode includes the user plane network element determines, based on the at least one of the flow steering policy and the flow steering mode, an access technology used for the service flow. The user plane network element transmits the service flow by using the determined access technology.

In a possible design, that the user plane network element transmits the service flow by using the determined access technology includes the user plane network element transmits the service flow on links corresponding to a plurality of access technologies. Alternatively, the user plane network element migrates the service flow from a link corresponding to a first access technology in a plurality of access technologies to a link corresponding to a second access technology in the plurality of access technologies for transmission. Alternatively, a core network element migrates the service flow from links corresponding to a plurality of access technologies to a link corresponding to a first access technology or a second access technology in the plurality of access technologies for transmission.

In a possible design, the user plane network element receives indication information from the session management network element, where the indication information indicates the user plane network element to process the service flow.

For specific content of the link detection information, the flow steering mode, the link condition information, and the link detection information, refer to the descriptions in the first aspect or the possible implementations of the first aspect. Details are not described herein again.

According to a sixth aspect, an embodiment of this application provides a communication method, including a terminal receives link detection information from a session management network element/a UPF network element, where the link detection information is used to obtain link status information of a link, and a PDU session to which a service flow belongs supports a plurality of access technologies. The terminal sends link status information to a core network element.

For example, the terminal may send link status information of a current link, or may send link status information of a target link.

In a possible design, the method provided in this embodiment of this application further includes the terminal receives a first indication from the session management network element, where the first indication indicates a link whose link status information needs to be sent.

In a possible design, the method provided in this embodiment of this application further includes the terminal receives an access technology indication that corresponds to the service flow and that is from the session management network element, where the access technology indication indicates to migrate the service flow to a link corresponding to an access technology indicated by the access technology indication. The terminal processes the service flow based on the access technology indication.

In a possible design, the method provided in this embodiment of this application further includes the terminal receives a recommended bandwidth value of an access network device that is from the access network device. Alternatively, the terminal receives a recommended bandwidth value of an access network device that is from the session management network element or the user plane network element.

In a possible design, the method provided in this embodiment of this application further includes the terminal processes the service flow based on the link status information from the UPF network element and at least one of a flow steering policy and a flow steering mode. For a specific processing method, refer to the descriptions in the foregoing embodiments. Details are not described herein again.

It should be noted that in the method described in any one of the third aspect to the sixth aspect, when the terminal migrates the service flow from one access technology to another access technology, the method described in any one of the seventh aspect or the manners of the seventh aspect may be used to enable the user plane network element to determine that transmission of the service flow in the first access technology ends.

For specific content of the link detection information, refer to the descriptions in the first aspect or the possible implementations of the first aspect. Details are not described herein again.

According to a seventh aspect, an embodiment of this application provides a data packet processing method, including a sending network element determines that a service flow needs to be migrated from a link corresponding to a first access technology in a plurality of access technologies to a link corresponding to a second access technology in the plurality of access technologies for transmission. The sending network element determines that transmission of a data packet in the service flow sent on the link corresponding to the first access technology ends. The sending network element sends, to a receiving network element, a first indication used to indicate that transmission of the data packet in the service flow transmitted on the link corresponding to the first access technology ends.

In a possible design, that the sending network element sends a first indication to a receiving network element includes the sending network element uses a last packet sent on the link corresponding to the first access technology to carry the first indication.

In a possible design, the last packet is a null packet or a last data packet in the service flow.

In a possible design, the first indication is carried in at least one of a packet data convergence protocol (PDCP) packet header and a service data adaptation protocol (SDAP) packet header that are of the last data packet.

In a possible design, the sending network element uses a General Packet Radio Service (GPRS) Tunneling Protocol (GTP-U) data packet header of the data packet to carry the first indication information.

In a possible design, that the sending network element sends a first indication to a receiving network element includes the sending network element uses a packet header of the last packet to carry the first indication.

In a possible design, the packet header of the last packet includes one or more of the following an Internet Protocol (IP) packet header, an Ethernet packet header, a user datagram protocol (UDP) packet header, a Transmission Control Protocol (TCP) packet header, the PDCP packet header, and the SDAP packet header.

According to an eighth aspect, an embodiment of this application provides a data packet processing method, including a receiving network element receives a data packet/data packets in a service flow from a link corresponding to a first access technology or/and a link corresponding to a second access technology in a plurality of access technologies supported by the service flow. The receiving network element receives a first indication from a sending network element, where the first indication indicates that transmission of the data packet in the service flow transmitted on the link corresponding to the first access technology ends. The receiving network element sorts, according to the first indication, the data packets in the service flow that are received by using the link corresponding to the first access technology and the link corresponding to the second access technology.

In a possible design, the method provided in this embodiment of this application further includes the receiving network element receives the first indication carried in a last packet sent on the link corresponding to the first access technology.

In a possible design, the last packet is a null packet or a last data packet in the service flow.

In a possible design, the receiving network element determines, based on a flow description parameter in the null packet or the last data packet in the service flow, the service flow corresponding to the first indication.

In a possible design, that the receiving network element sorts, according to the first indication, the data packets in the service flow that are received by using the link corresponding to the first access technology and the link corresponding to the second access technology includes after receiving the first indication, the receiving network element processes the data packet that is in the service flow and that is received by using the link corresponding to the second access technology.

According to a ninth aspect, an embodiment of this application provides a service flow processing apparatus. The service flow processing apparatus may implement the service flow processing method described in any one of the first aspect or the possible implementations of the first aspect, and therefore may also achieve beneficial effects in any one of the first aspect or the possible implementations of the first aspect. The service flow processing apparatus may be a terminal, or may be a service flow processing apparatus that can support a terminal in implementing any one of the first aspect or the possible implementations of the first aspect, for example, a chip applied to the terminal. The communications apparatus may implement the foregoing method by using software, hardware, or hardware executing corresponding software.

The service flow processing apparatus is a terminal or a chip applied to a terminal. The service flow processing apparatus includes an obtaining unit, configured to obtain policy information of a service flow, where the policy information includes at least one of a flow steering policy, a flow steering mode, and link condition information for transmitting the service flow, and a PDU session to which the service flow belongs supports a plurality of access technologies, and a processing unit, configured to process the service flow based on the policy information.

In a possible design, the apparatus provided in this embodiment of this application further includes a sending unit, configured to send, to a core network element, link detection information used to obtain link status information of a link, and a receiving unit, configured to receive link status information from the core network element.

In a possible design, the apparatus provided in this embodiment of this application further includes a determining unit, configured to determine that link status information of a target link meets the link condition information or link status information of a current link does not meet the link condition information. The processing unit is specifically configured to, when the determining unit determines that the link status information of the target link meets the link condition information or the link status information of the current link does not meet the link condition information, process the service flow based on at least one of the flow steering policy or the flow steering mode.

In a possible design, the processing unit is specifically configured to transmit the service flow on links corresponding to the plurality of access technologies. Alternatively, the processing unit is specifically configured to migrate the service flow from a link corresponding to a first access technology in the plurality of access technologies to a link corresponding to a second access technology in the plurality of access technologies for transmission. Alternatively, the processing unit is specifically configured to migrate the service flow from links corresponding to the plurality of access technologies to a link corresponding to a first access technology or a second access technology in the plurality of access technologies for transmission. Alternatively, the processing unit is specifically configured to initiate a processing procedure of the service flow.

In a possible design, the link detection information includes at least one of a subscribed link status parameter and sending condition information of the subscribed link status parameter.

In a possible design, the subscribed link status parameter includes one or more of the following access network signal quality, access network signal strength, access network bandwidth, access network load, backhaul network bandwidth or load, a link delay parameter, a link packet loss rate parameter, and a link jitter parameter.

In a possible design, the link detection information further includes one or more of the following an access technology indication, a GBR indication, a non-GBR indication, a QFI, and a flow description parameter.

In a possible design, the link detection information further includes sending frequency information of the subscribed link status parameter.

In a possible design, the link condition information includes at least one of access-related condition information and access-independent condition information.

In a possible design, the access-related condition information includes one or more of the following an access network signal strength threshold, an access network signal quality threshold, a backhaul bandwidth threshold or load threshold, an access network bandwidth threshold, and an access network load threshold. The access-independent condition information includes at least one or more of the following a link delay threshold, a link packet loss rate threshold, and a link jitter threshold.

In a possible design, the obtaining unit is specifically configured to obtain, from a NAS transport message, at least one of the flow steering mode of the service flow and the link condition information for transmitting the service flow that are from a policy control network element. Alternatively, the obtaining unit is specifically configured to obtain, from a session management response message from a session management network element, at least one of the flow steering policy of the service flow, the flow steering mode of the service flow, and the link condition information for transmitting the service flow.

In a possible design, the processing unit is specifically configured to migrate, based on the policy information, the service flow from the link corresponding to the first access technology in the plurality of access technologies to the link corresponding to the second access technology in the plurality of access technologies for transmission. The determining unit is configured to determine that transmission of a data packet in the service flow from using the first access technology ends. The sending unit is configured to, when the determining unit determines that transmission of the data packet in the service flow from using the first access technology ends, send a first indication to a UPF network element, where the first indication indicates that transmission of the data packet in the service flow transmitted by using the first access technology ends.

In a possible design, the sending unit is further configured to send indication information to the core network element, where the indication information indicates that the terminal processes the service flow.

In a possible design, the flow steering mode includes one or more of the following an access technology preference indication, used to indicate that the service flow is preferably transmitted by using an access technology associated with the access technology preference indication, an optimal link-based flow steering indication, used to indicate that the service flow is preferably transmitted by using an optimal link, where the optimal link is a link whose link state is better than that of another link, a link load balancing-based flow steering indication, used to indicate that the service flow is transmitted according to a link load balancing policy, an access technology and flow steering percentage indication, used to indicate that the service flow is transmitted based on a flow splitting percentage corresponding to the access technology, and a redundant transmission indication, used to indicate that same data packets in the service flow are simultaneously transmitted by using different access technologies.

In a possible design, the apparatus provided in this embodiment of this application further includes the receiving unit, configured to receive the link status information or the link status parameter, and at least one of the access technology indication, the GBR indication, the non-GBR indication, the QFI, and the flow description parameter that are from a network side.

In a possible design, the receiving unit is further configured to receive link status information from an access network device, where the link status information is a recommended bandwidth value of the access network device. Alternatively, the receiving unit is further configured to receive link status information from the session management network element or the user plane network element, where the link status information is a recommended bandwidth value of an access network device.

In a possible design, the processing unit is further configured to process the service flow based on the policy information and the available bandwidth value.

In a possible implementation, an embodiment of this application further provides a service flow processing apparatus. The service flow processing apparatus may be a terminal or a chip applied to a terminal. The service flow processing apparatus includes a processor and an interface circuit. The interface circuit is configured to support the service flow processing apparatus in performing the steps of receiving and sending a message/data on a side of the service flow processing apparatus described in any one of the first aspect or the possible implementations of the first aspect. The processor is configured to support the service flow processing apparatus in performing the step of processing a message/data on a side of the service flow processing apparatus described in any one of the first aspect or the possible implementations of the first aspect. For specific corresponding steps, refer to the descriptions in any one of the first aspect or the possible implementations of the first aspect. Details are not described herein again.

Optionally, the interface circuit and the processor that are in the service flow processing apparatus are coupled to each other.

Optionally, the service flow processing apparatus may further include a memory, configured to store code and data. The processor, the interface circuit, and the memory are coupled to each other.

According to a tenth aspect, an embodiment of this application provides a communications apparatus. The communications apparatus may implement the communications method described in any one of the second aspect or the possible implementations of the second aspect, and therefore may also achieve beneficial effects in any one of the second aspect or the possible implementations of the second aspect. The communications apparatus may be a session management network element, or may be an apparatus that can support a session management network element in implementing the communication method in any one of the second aspect or the possible implementations of the second aspect, for example, a chip applied to the session management network element. The communications apparatus may implement the foregoing method by using software, hardware, or hardware executing corresponding software.

The communications apparatus includes an obtaining unit, configured to obtain policy information of a service flow, where the policy information includes at least one of a flow steering policy, a flow steering mode, and link condition information for transmitting the service flow, and a PDU session to which the service flow belongs supports a plurality of access technologies, and a sending unit, configured to send the policy information to a terminal.

In a possible design, the communications apparatus provided in this embodiment of this application further includes a receiving unit, configured to receive link detection information from the terminal, where the link detection information is used to obtain link status information of a link for transmitting the service flow.

In a possible design, the sending unit is further configured to send the link detection information to a user plane network element. The receiving unit is further configured to receive link status information from the user plane network element. The sending unit is further configured to send the link status information to the terminal.

In a possible design, the sending unit is further configured to send a link status parameter and at least one of an access technology indication, a GBR indication, a non-GBR indication, a QFI, and a flow description parameter to the terminal.

In a possible design, the sending unit is further configured to send a first indication to the user plane network element, where the first indication indicates a link whose link status information needs to be sent.

In a possible design, the first indication includes at least one of the QFI, the access technology indication, a tunnel identifier, the GBR indication, the non-GBR indication, and the flow description parameter.

In a possible design, the sending unit is further configured to send the QFI and a notification indication to an access network device, where the QFI and the notification indication are used to indicate to send a recommended bandwidth value of the access network device to the session management network element or the user plane network element when the access network device cannot meet a bandwidth requirement of a QoS flow corresponding to the QFI.

In a possible design, the receiving unit is further configured to receive the QFI and the recommended bandwidth value of the access network device that are from the access network device. The sending unit is further configured to send the QFI and the recommended bandwidth value of the access network device to the terminal.

In a possible design, the receiving unit is further configured to receive a session management request message from the terminal, where the session management request message includes an access technology indication indicating that the terminal requests to transmit the service flow.

In a possible implementation, an embodiment of this application further provides a communications apparatus. The communications apparatus may be a session management network element or a chip applied to a session management network element. The communications apparatus includes a processor and an interface circuit. The interface circuit is configured to support the communications apparatus in performing the steps of receiving and sending a message/data on a side of the communications apparatus described in any one of the second aspect or the possible implementations of the second aspect. The processor is configured to support the communications apparatus in performing the step of processing a message/data on a side of the communications apparatus described in any one of the second aspect or the possible implementations of the second aspect. For specific corresponding steps, refer to the descriptions in any one of the second aspect or the possible implementations of the second aspect. Details are not described herein again.

Optionally, the interface circuit and the processor that are in the communications apparatus are coupled to each other.

Optionally, the communications apparatus may further include a memory, configured to store code and data. The processor, the interface circuit, and the memory are coupled to each other.

According to an eleventh aspect, an embodiment of this application provides a service flow processing apparatus. The service flow processing apparatus may implement the service flow processing method described in any one of the third aspect or the possible implementations of the third aspect, and therefore may also achieve beneficial effects in any one of the third aspect or the possible implementations of the third aspect. The service flow processing apparatus may be a session management network element, or may be an apparatus that can support a session management network element in implementing the service flow processing method in any one of the third aspect or the possible implementations of the third aspect, for example, a chip applied to the session management network element. The service flow processing apparatus may implement the foregoing method by using software, hardware, or hardware executing corresponding software.

The service flow processing apparatus includes an obtaining unit, configured to obtain policy information of a service flow, where the policy information includes at least one of a flow steering policy, a flow steering mode, and link condition information for transmitting the service flow, and a PDU session to which the service flow belongs supports a plurality of access technologies, and a sending unit, configured to send at least one access technology indication to a terminal based on the policy information, where the access technology indication indicates to migrate the service flow to a link corresponding to an access technology indicated by the access technology indication.

In a possible design, the sending unit is further configured to send link detection information to the terminal or a user plane network element, where the link detection information is used to obtain link status information of a link. The obtaining unit is further configured to receive link status information from the terminal or the user plane network element.

In a possible design, the sending unit is specifically configured to, when a determining unit determines that link status information of a target link meets the link condition information or link status information of a current link does not meet the link condition information, send the at least one access technology indication to the terminal based on at least one of the flow steering policy and the flow steering mode.

In a possible design, the apparatus provided in this embodiment of this application further includes a generation unit, configured to generate the link detection information based on the policy information.

In a possible design, the sending unit is further configured to send, to the terminal or the user plane network element, a first indication used to indicate a link whose link status information needs to be sent.

In a possible design, the first indication includes at least one of a QFI, an access technology indication, a tunnel identifier, a GBR indication, a non-GBR indication, and a flow description parameter.

For specific content of the link detection information, the flow steering mode, the link condition information, and the link detection information, refer to the descriptions in the first aspect or the possible implementations of the first aspect. Details are not described herein again.

In a possible design, the apparatus provided in this embodiment of this application further includes a receiving unit, configured to receive first indication information from the terminal, where the first indication information indicates that a core network processes the service flow.

In a possible design, the sending unit is further configured to send the QFI and a notification indication to an access network device, where the QFI and the notification indication are used to indicate to send a recommended bandwidth value of the access network device to the session management network element or the user plane network element when the access network side cannot meet a bandwidth requirement of a QoS flow corresponding to the QFI.

In a possible design, the receiving unit is further configured to receive the QFI and the recommended bandwidth value of the access network device that are from the access network device. The sending unit is further configure to send the QFI and the recommended bandwidth value of the access network device to the terminal.

In a possible design, the obtaining unit is further configured to obtain the policy information of the service flow from a policy control network element in a session management procedure. Alternatively, the obtaining unit is further configured to obtain the policy information of the service flow from a policy control network element when the terminal completes registration.

In a possible implementation, an embodiment of this application further provides a service flow processing apparatus. The service flow processing apparatus may be a session management network element or a chip applied to a session management network element. The service flow processing apparatus includes a processor and an interface circuit. The interface circuit is configured to support the service flow processing apparatus in performing the steps of receiving and sending a message/data on a side of the service flow processing apparatus described in any one of the third aspect or the possible implementations of the third aspect. The processor is configured to support the service flow processing apparatus in performing the step of processing a message/data on a side of the service flow processing apparatus described in any one of the third aspect or the possible implementations of the third aspect. For specific corresponding steps, refer to the descriptions in any one of the third aspect or the possible implementations of the third aspect. Details are not described herein again.

Optionally, the interface circuit and the processor that are in the service flow processing apparatus are coupled to each other.

Optionally, the service flow processing apparatus may further include a memory, configured to store code and data. The processor, the interface circuit, and the memory are coupled to each other.

According to a twelfth aspect, an embodiment of this application provides a service flow processing apparatus.

The service flow processing apparatus may implement the service flow processing method described in any one of the fourth aspect or the possible implementations of the fourth aspect, and therefore may also achieve beneficial effects in any one of the fourth aspect or the possible implementations of the fourth aspect. The service flow processing apparatus may be a policy control network element, or may be an apparatus that can support a policy control network element in implementing the service flow processing method in any one of the fourth aspect or the possible implementations of the fourth aspect, for example, a chip applied to the policy control network element. The service flow processing apparatus may implement the foregoing method by using software, hardware, or hardware executing corresponding software.

The service flow processing apparatus includes an obtaining unit, configured to obtain policy information of a service flow, where the policy information includes at least one of a flow steering policy, a flow steering mode, and link condition information for transmitting the service flow, and a PDU session to which the service flow belongs supports a plurality of access technologies, and a sending unit, configured to send, to a session management network element based on the policy information, at least one updated access technology indication corresponding to the service flow, where the at least one access technology indication indicates to migrate the service flow to a link corresponding to an access technology indicated by the access technology indication.

For specific content of link detection information, the flow steering mode, the link condition information, and link detection information, refer to the descriptions in the first aspect or the possible implementations of the first aspect. Details are not described herein again.

In a possible design, the sending unit provided in this embodiment of this application is further configured to send link detection information to a terminal, or send link detection information to the session management network element.

In a possible design, a receiving unit is further configured to receive link status information from the session management network element.

In a possible design, the obtaining unit is further configured to determine, based on the obtained link status information of the service flow, that link status information of a current link does not meet the link condition information or link status information of a target link meets the link condition information. The sending unit is configured to send the at least one updated access technology indication corresponding to the service flow to the session management network element.

In a possible design, the sending unit provided in this embodiment of this application is further configured to after the receiving unit receives a multi-access session indication from the session management network element, send the policy information of the service flow to the session management network element.

In a possible design, the receiving unit is further configured to receive indication information that is from the session management network element and that indicates the policy control network element to process the service flow.

In a possible implementation, an embodiment of this application further provides a service flow processing apparatus. The service flow processing apparatus may be a policy control network element or a chip applied to a policy control network element. The service flow processing apparatus includes a processor and an interface circuit. The interface circuit is configured to support the service flow processing apparatus in performing the steps of receiving and sending a message/data on a side of the service flow processing apparatus described in any one of the fourth aspect or the possible implementations of the fourth aspect. The processor is configured to support the service flow processing apparatus in performing the step of processing a message/data on a side of the service flow processing apparatus described in any one of the fourth aspect or the possible implementations of the fourth aspect. For specific corresponding steps, refer to the descriptions in any one of the fourth aspect or the possible implementations of the fourth aspect. Details are not described herein again.

Optionally, the interface circuit and the processor that are in the service flow processing apparatus are coupled to each other.

Optionally, the service flow processing apparatus may further include a memory, configured to store code and data. The processor, the interface circuit, and the memory are coupled to each other.

According to a thirteenth aspect, an embodiment of this application provides a service flow processing apparatus. The service flow processing apparatus may implement the service flow processing method described in any one of the fifth aspect or the possible implementations of the fifth aspect, and therefore may also achieve beneficial effects in any one of the fifth aspect or the possible implementations of the fifth aspect. The service flow processing apparatus may be a user plane network element, or may be an apparatus that can support a user plane network element in implementing the service flow processing method in any one of the fifth aspect or the possible implementations of the fifth aspect, for example, a chip applied to the user plane network element. The service flow processing apparatus may implement the foregoing method by using software, hardware, or hardware executing corresponding software.

An embodiment of this application provides a service flow processing apparatus, including an obtaining unit, configured to obtain policy information of a service flow, where the policy information includes at least one of a flow steering policy, a flow steering mode, and link condition information for transmitting the service flow, and a processing unit, configured to process the service flow based on the policy information.

In a possible design, the obtaining unit is further configured to obtain link detection information from a session management network element.

In a possible design, the apparatus provided in this embodiment of this application further includes a sending unit, configured to send, to a terminal, link status information obtained by the user plane network element based on the link detection information.

In a possible design, the apparatus provided in this embodiment of this application further includes a receiving unit, configured to receive link status information that is of a current link or a target link and that is obtained by the terminal based on the link detection information.

In a possible design, the processing unit is specifically configured to, when a determining unit determines that the link status information of the current link does not meet or the link status information of the target link meets the link condition information, process the service flow based on at least one of the flow steering policy and the flow steering mode.

In a possible design, the determining unit is further configured to determine, based on the at least one of the flow steering policy and the flow steering mode, an access technology used for the service flow. The processing unit is specifically configured to transmit the service flow by using the determined access technology.

In a possible design, the processing unit is specifically configured to transmit the service flow on links corresponding to a plurality of access technologies. Alternatively, the processing unit is specifically configured to migrate the service flow from a link corresponding to a first access technology in a plurality of access technologies to a link corresponding to a second access technology in the plurality of access technologies for transmission. Alternatively, the processing unit is specifically configured to migrate the service flow from links corresponding to a plurality of access technologies to a link corresponding to a first access technology or a second access technology in the plurality of access technologies for transmission.

In a possible design, the receiving unit is configured to receive indication information from the session management network element, where the indication information indicates the user plane network element to process the service flow.

For specific content of the link detection information, the flow steering mode, the link condition information, and the link detection information, refer to the descriptions in the first aspect or the possible implementations of the first aspect. Details are not described herein again.

In a possible implementation, an embodiment of this application further provides a service flow processing apparatus. The service flow processing apparatus may be a user plane network element or a chip applied to a user plane network element. The service flow processing apparatus includes a processor and an interface circuit. The interface circuit is configured to support the service flow processing apparatus in performing the steps of receiving and sending a message/data on a side of the service flow processing apparatus described in any one of the third aspect or the possible implementations of the fifth aspect. The processor is configured to support the service flow processing apparatus in performing the step of processing a message/data on a side of the service flow processing apparatus described in any one of the fifth aspect or the possible implementations of the fifth aspect. For specific corresponding steps, refer to the descriptions in any one of the fifth aspect or the possible implementations of the fifth aspect. Details are not described herein again.

Optionally, the interface circuit and the processor that are in the service flow processing apparatus are coupled to each other.

Optionally, the service flow processing apparatus may further include a memory, configured to store code and data. The processor, the interface circuit, and the memory are coupled to each other.

According to a fourteenth aspect, an embodiment of this application provides a communications apparatus. The communications apparatus may implement the communication method described in any one of the sixth aspect or the possible implementations of the sixth aspect, and therefore may also achieve beneficial effects in any one of the sixth aspect or the possible implementations of the sixth aspect. The communications apparatus may be an apparatus, or may be an apparatus that can support a terminal in implementing the communication method in any one of the seventh aspect or the possible implementations of the seventh aspect, for example, a chip applied to the terminal. The communications apparatus may implement the foregoing method by using software, hardware, or hardware executing corresponding software.

An embodiment of this application provides a communications apparatus, including a receiving unit, configured to receive link detection information from a session management network element/a UPF network element, where the link detection information is used to obtain link status information of a link, and a PDU session to which a service flow belongs supports a plurality of access technologies, and a sending unit, configured to send link status information to a core network element.

For example, the terminal may send link status information of a current link, or may send link status information of a target link.

In a possible design, the receiving unit is configured to receive a first indication from the session management network element, where the first indication indicates a link whose link status information needs to be sent.

In a possible design, the receiving unit receives an access technology indication that corresponds to the service flow and that is from the session management network element, where the access technology indication indicates to migrate the service flow to a link corresponding to an access technology indicated by the access technology indication. The apparatus provided in this embodiment of this application further includes a processing unit, configured to process the service flow based on the access technology indication.

In a possible design, the receiving unit receives a recommended bandwidth value of an access network device that is from the access network device. Alternatively, the receiving unit receives a recommended bandwidth value of an access network device that is from the session management network element or the user plane network element.

In a possible design, the processing unit is specifically configured to process the service flow based on the link status information from the UPF network element and at least one of a flow steering policy and a flow steering mode. For a specific processing method, refer to the descriptions in the foregoing embodiments. Details are not described herein again.

In a possible implementation, an embodiment of this application further provides a communications apparatus. The communications apparatus may be a terminal or a chip applied to a terminal. The communications apparatus includes a processor and an interface circuit. The interface circuit is configured to support the communications apparatus in performing the steps of receiving and sending a message/data on a side of the communications apparatus described in any one of the sixth aspect or the possible implementations of the sixth aspect. The processor is configured to support the communications apparatus in performing the step of processing a message/data on a side of the communications apparatus described in any one of the sixth aspect or the possible implementations of the sixth aspect. For specific corresponding steps, refer to the descriptions in any one of the sixth aspect or the possible implementations of the sixth aspect. Details are not described herein again.

Optionally, the interface circuit and the processor that are in the communications apparatus are coupled to each other.

Optionally, the communications apparatus may further include a memory, configured to store code and data. The processor, the interface circuit, and the memory are coupled to each other.

According to a fifteenth aspect, an embodiment of this application provides a data packet processing apparatus. The data packet processing apparatus may implement the data packet processing method described in any one of the fifth aspect or the possible implementations of the fifth aspect, and therefore may also achieve beneficial effects in any one of the seventh aspect or the possible implementations of the seventh aspect. The data packet processing apparatus may be a sending network element, or may be an apparatus that can support a sending network element in implementing the data packet processing method in any one of the seventh aspect or the possible implementations of the seventh aspect, for example, a chip applied to the sending network element. The data packet processing apparatus may implement the foregoing method by using software, hardware, or hardware executing corresponding software.

The data packet processing apparatus includes a determining unit, configured to determine that a service flow needs to be migrated from a link corresponding to a first access technology in a plurality of access technologies to a link corresponding to a second access technology in the plurality of access technologies for transmission, and determine that transmission of a data packet in the service flow sent on the link corresponding to the first access technology ends, and a sending unit, configured to send, to a receiving network element, a first indication used to indicate that transmission of the data packet in the service flow transmitted on the link corresponding to the first access technology ends.

In a possible design, the sending unit is specifically configured to use a last packet sent on the link corresponding to the first access technology to carry the first indication.

In a possible design, the last packet is a null packet or a last data packet in the service flow.

In a possible design, the first indication is carried in at least one of a PDCP packet header and a SDAP packet header that are of the last data packet.

In a possible design, the sending unit is configured to use a GTP-U data packet header of the data packet to carry the first indication information.

In a possible design, the sending unit is configured to use a packet header of the last packet to carry the first indication.

In a possible design, the packet header of the last packet includes one or more of the following an IP packet header, an Ethernet packet header, a UDP packet header, a TCP packet header, the PDCP packet header, and the SDAP packet header.

In a possible implementation, an embodiment of this application further provides a data packet processing apparatus. The data packet processing apparatus may be a sending network element or a chip applied to a sending network element. The data packet processing apparatus includes a processor and an interface circuit. The interface circuit is configured to support the data packet processing apparatus in performing the steps of receiving and sending a message/data on a side of the data packet processing apparatus described in any one of the seventh aspect or the possible implementations of the seventh aspect. The processor is configured to support the data packet processing apparatus in performing the step of processing a message/data on a side of the data packet processing apparatus described in any one of the seventh aspect or the possible implementations of the seventh aspect. For specific corresponding steps, refer to the descriptions in any one of the seventh aspect or the possible implementations of the seventh aspect. Details are not described herein again.

Optionally, the interface circuit and the processor that are in the data packet processing apparatus are coupled to each other.

Optionally, the data packet processing apparatus may further include a memory, configured to store code and data. The processor, the interface circuit, and the memory are coupled to each other.

According to a sixteenth aspect, an embodiment of this application provides a data packet processing apparatus. The data packet processing apparatus may implement the data packet processing method described in any one of the eighth aspect or the possible implementations of the eighth aspect, and therefore may also achieve beneficial effects in any one of the eighth aspect or the possible implementations of the eighth aspect. The data packet processing apparatus may be a receiving network element, or may be an apparatus that can support a receiving network element in implementing the data packet processing method in any one of the eighth aspect or the possible implementations of the eighth aspect, for example, a chip applied to the receiving network element. The data packet processing apparatus may implement the foregoing method by using software, hardware, or hardware executing corresponding software.

The data packet processing apparatus includes a receiving unit, configured to receive, a data packet/data packets in a service flow from a link corresponding to a first access technology or/and a link corresponding to a second access technology in a plurality of access technologies supported by the service flow, and receive a first indication from a sending network element, where the first indication indicates that transmission of the data packet in the service flow transmitted on the link corresponding to the first access technology ends, and a processing unit, configured to sort, according to the first indication, the data packets in the service flow that are received by using the link corresponding to the first access technology and the link corresponding to the second access technology.

In a possible design, the receiving unit is further configured to receive the first indication carried in a last packet sent on the link corresponding to the first access technology.

In a possible design, the last packet is a null packet or a last data packet in the service flow.

In a possible design, a determining unit is configured to determine, based on a flow description parameter in the null packet or the last data packet in the service flow, the service flow corresponding to the first indication.

In a possible design, the processing unit is configured to after the first indication is received, process the data packet that is in the service flow and that is received by using the link corresponding to the second access technology.

In a possible implementation, an embodiment of this application further provides a data packet processing apparatus. The data packet processing apparatus may be a receiving network element or a chip applied to a receiving network element. The data packet processing apparatus includes a processor and an interface circuit. The interface circuit is configured to support the data packet processing apparatus in performing the steps of receiving and sending a message/data on a side of the data packet processing apparatus described in any one of the eighth aspect or the possible implementations of the eighth aspect. The processor is configured to support the data packet processing apparatus in performing the step of processing a message/data on a side of the data packet processing apparatus described in any one of the eighth aspect or the possible implementations of the eighth aspect. For specific corresponding steps, refer to the descriptions in any one of the eighth aspect or the possible implementations of the eighth aspect. Details are not described herein again.

Optionally, the interface circuit and the processor that are in the data packet processing apparatus are coupled to each other.

Optionally, the data packet processing apparatus may further include a memory, configured to store code and data. The processor, the interface circuit, and the memory are coupled to each other.

According to a seventeenth aspect, this application provides a computer readable storage medium. The computer readable storage medium stores an instruction. When the instruction is run on a computer, the computer is enabled to perform the service flow processing method described in the first aspect or the possible implementations of the first aspect.

According to an eighteenth aspect, this application provides a computer readable storage medium. The computer readable storage medium stores an instruction. When the instruction is run on a computer, the computer is enabled to perform the communication method described in the second aspect or the possible implementations of the second aspect.

According to a nineteenth aspect, this application provides a computer readable storage medium. The computer readable storage medium stores an instruction. When the instruction is run on a computer, the computer is enabled to perform the service flow processing method described in the third aspect or the possible implementations of the third aspect.

According to a twentieth aspect, this application provides a computer readable storage medium. The computer readable storage medium stores an instruction. When the instruction is run on a computer, the computer is enabled to perform the service flow processing method described in the fourth aspect or the possible implementations of the fourth aspect.

According to a twenty-first aspect, this application provides a computer readable storage medium. The computer readable storage medium stores an instruction. When the instruction is run on a computer, the computer is enabled to perform the service flow processing method described in the fifth aspect or the possible implementations of the fifth aspect.

According to a twenty-second aspect, this application provides a computer readable storage medium. The computer readable storage medium stores an instruction. When the instruction is run on a computer, the computer is enabled to perform the communication method described in the sixth aspect or the possible implementations of the sixth aspect.

According to a twenty-third aspect, this application provides a computer readable storage medium. The computer readable storage medium stores an instruction. When the instruction is run on a computer, the computer is enabled to perform the data packet processing method described in the seventh aspect or the possible implementations of the seventh aspect.

According to a twenty-fourth aspect, this application provides a computer readable storage medium. The computer readable storage medium stores an instruction. When the instruction is run on a computer, the computer is enabled to perform the data packet processing method described in the eighth aspect or the possible implementations of the eighth aspect.

According to a twenty-fifth aspect, this application provides a computer program product including an instruction. When the instruction is run on a computer, the computer is enabled to perform the service flow processing method described in the first aspect or the possible implementations of the first aspect.

According to a twenty-sixth aspect, this application provides a computer program product including an instruction. When the instruction is run on a computer, the computer is enabled to perform the communication method described in the second aspect or the possible implementations of the second aspect.

According to a twenty-seventh aspect, this application provides a computer program product including an instruction. When the instruction is run on a computer, the computer is enabled to perform the service flow processing method described in the third aspect or the possible implementations of the third aspect.

According to a twenty-eighth aspect, this application provides a computer program product including an instruction. When the instruction is run on a computer, the computer is enabled to perform the service flow processing method described in the fourth aspect or the possible implementations of the fourth aspect.

According to a twenty-ninth aspect, this application provides a computer program product including an instruction. When the instruction is run on a computer, the computer is enabled to perform the service flow processing method described in the fifth aspect or the possible implementations of the fifth aspect.

According to a thirtieth aspect, this application provides a computer program product including an instruction. When the instruction is run on a computer, the computer is enabled to perform the communication method described in the sixth aspect or the possible implementations of the sixth aspect.

According to a thirty-first aspect, this application provides a computer program product including an instruction. When the instruction is run on a computer, the computer is enabled to perform the data packet processing method described in the seventh aspect or the possible implementations of the seventh aspect.

According to a thirty-second aspect, this application provides a computer program product including an instruction. When the instruction is run on a computer, the computer is enabled to perform the data packet processing method described in the eighth aspect or the possible implementations of the eighth aspect.

According to a thirty-third aspect, an embodiment of this application provides a chip. The chip includes a processor and an interface circuit. The interface circuit is coupled to the processor. The processor is configured to run a computer program or an instruction, to implement the service flow processing method described in the first aspect or the possible implementations of the first aspect. The interface circuit is configured to communicate with a module other than the chip.

According to a thirty-fourth aspect, an embodiment of this application provides a chip. The chip includes a processor and an interface circuit. The interface circuit is coupled to the processor. The processor is configured to run a computer program or an instruction, to implement the communication method described in the second aspect or the possible implementations of the second aspect. The interface circuit is configured to communicate with a module other than the chip.

According to a thirty-fifth aspect, an embodiment of this application provides a chip. The chip includes a processor and an interface circuit. The interface circuit is coupled to the processor. The processor is configured to run a computer program or an instruction, to implement the service flow processing method described in the third aspect or the possible implementations of the third aspect. The interface circuit is configured to communicate with a module other than the chip.

According to a thirty-sixth aspect, an embodiment of this application provides a chip. The chip includes a processor and an interface circuit. The interface circuit is coupled to the processor. The processor is configured to run a computer program or an instruction, to implement the service flow processing method described in the fourth aspect or the possible implementations of the fourth aspect. The interface circuit is configured to communicate with a module other than the chip.

According to a thirty-seventh aspect, an embodiment of this application provides a chip. The chip includes a processor and an interface circuit. The interface circuit is coupled to the processor. The processor is configured to run a computer program or an instruction, to implement the service flow processing method described in the fifth aspect or the possible implementations of the fifth aspect. The interface circuit is configured to communicate with a module other than the chip.

According to a thirty-eighth aspect, an embodiment of this application provides a chip. The chip includes a processor and an interface circuit. The interface circuit is coupled to the processor. The processor is configured to run a computer program or an instruction, to implement the communication method described in the sixth aspect or the possible implementations of the sixth aspect. The interface circuit is configured to communicate with a module other than the chip.

According to a thirty-ninth aspect, an embodiment of this application provides a chip. The chip includes a processor and an interface circuit. The interface circuit is coupled to the processor. The processor is configured to run a computer program or an instruction, to implement the data packet processing method described in the seventh aspect or the possible implementations of the seventh aspect. The interface circuit is configured to communicate with a module other than the chip.

According to a fortieth aspect, an embodiment of this application provides a chip. The chip includes a processor and an interface circuit. The interface circuit is coupled to the processor. The processor is configured to run a computer program or an instruction, to implement the data packet processing method described in the eighth aspect or the possible implementations of the eighth aspect. The interface circuit is configured to communicate with a module other than the chip.

Specifically, the chip provided in this embodiment of this application further includes a memory, configured to store the computer program or the instruction.

According to a forty-first aspect, an embodiment of this application provides a communications system. The communications system includes the service flow processing apparatus provided in the ninth aspect or the possible implementations of the ninth aspect, and the communications apparatus provided in the tenth aspect or the possible implementations of the tenth aspect.

According to a forty-second aspect, an embodiment of this application provides a communications system. The communications system includes the service flow processing apparatus provided in the eleventh aspect or the possible implementations of the eleventh aspect, and the communications apparatus provided in the fourteenth aspect or the possible designs of the fourteenth aspect. Optionally, the communications system provided in the forty-second aspect further includes a policy control network element and a user plane network element that interact with the service flow processing apparatus.

According to a forty-third aspect, an embodiment of this application provides a communications system. The communications system includes the service flow processing apparatus provided in the twelfth aspect or the possible implementations of the twelfth aspect, and the communications apparatus provided in the fourteenth aspect or the possible designs of the fourteenth aspect. Optionally, the communications system provided in the forty-third aspect further includes a session management network element and a user plane network element that interact with the service flow processing apparatus.

According to a forty-fourth aspect, an embodiment of this application provides a communications system. The communications system includes the service flow processing apparatus provided in the thirteenth aspect or the possible implementations of the thirteenth aspect, and the communications apparatus provided in the fourteenth aspect or the possible designs of the fourteenth aspect. Optionally, the communications system provided in the forty-fourth aspect further includes a session management network element that interacts with the service flow processing apparatus.

BRIEF DESCRIPTION OF DRAWINGS

FIG. 15A, FIG. 15B, and FIG. 15C are a schematic diagram of a specific embodiment of processing a service flow by a terminal according to an embodiment of this application.

DESCRIPTION OF EMBODIMENTS

It should be noted that in the embodiments of this application, the word such as "example" or "for example" is used to represent giving an example, an illustration, or a description. Any embodiment or design solution described by using "example" or "for example" in the embodiments of this application shall not be construed as being more preferred or more advantageous than another embodiment or design solution. Exactly, use of the word "example", "for example", or the like is intended to present a relative concept in a specific manner.

In this application, "at least one" means one or more, and "a plurality of" means two or more. The term "and/or" describes an association relationship for describing associated objects and represents that three relationships may exist. For example, A and/or B may represent the following cases only A exists, both A and B exist, and only B exists, where A and B may be singular or plural. The character "/" usually indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

A system architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with the evolution of a network architecture and the emergence of a new service scenario, the technical solutions provided in the embodiments of this application are also applicable to similar technical problems.

Figure 1:
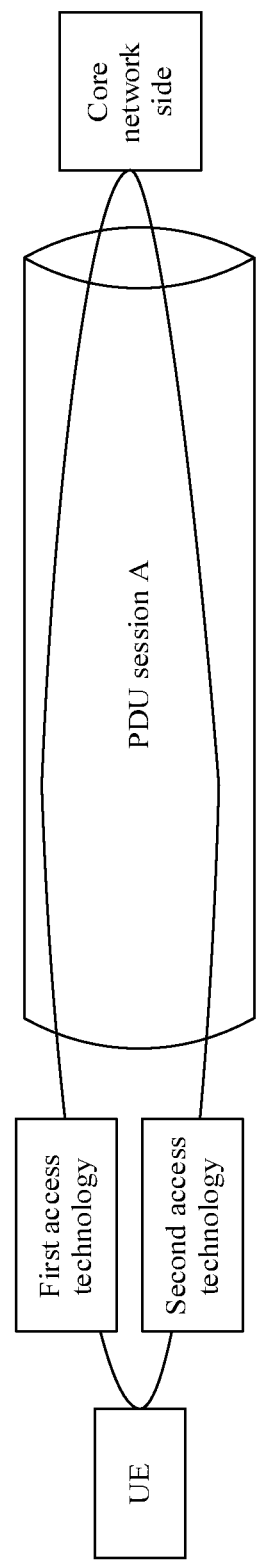
FIG. 1 is a schematic diagram of a multi-access PDU (MA PDU) session.
Figure 2:
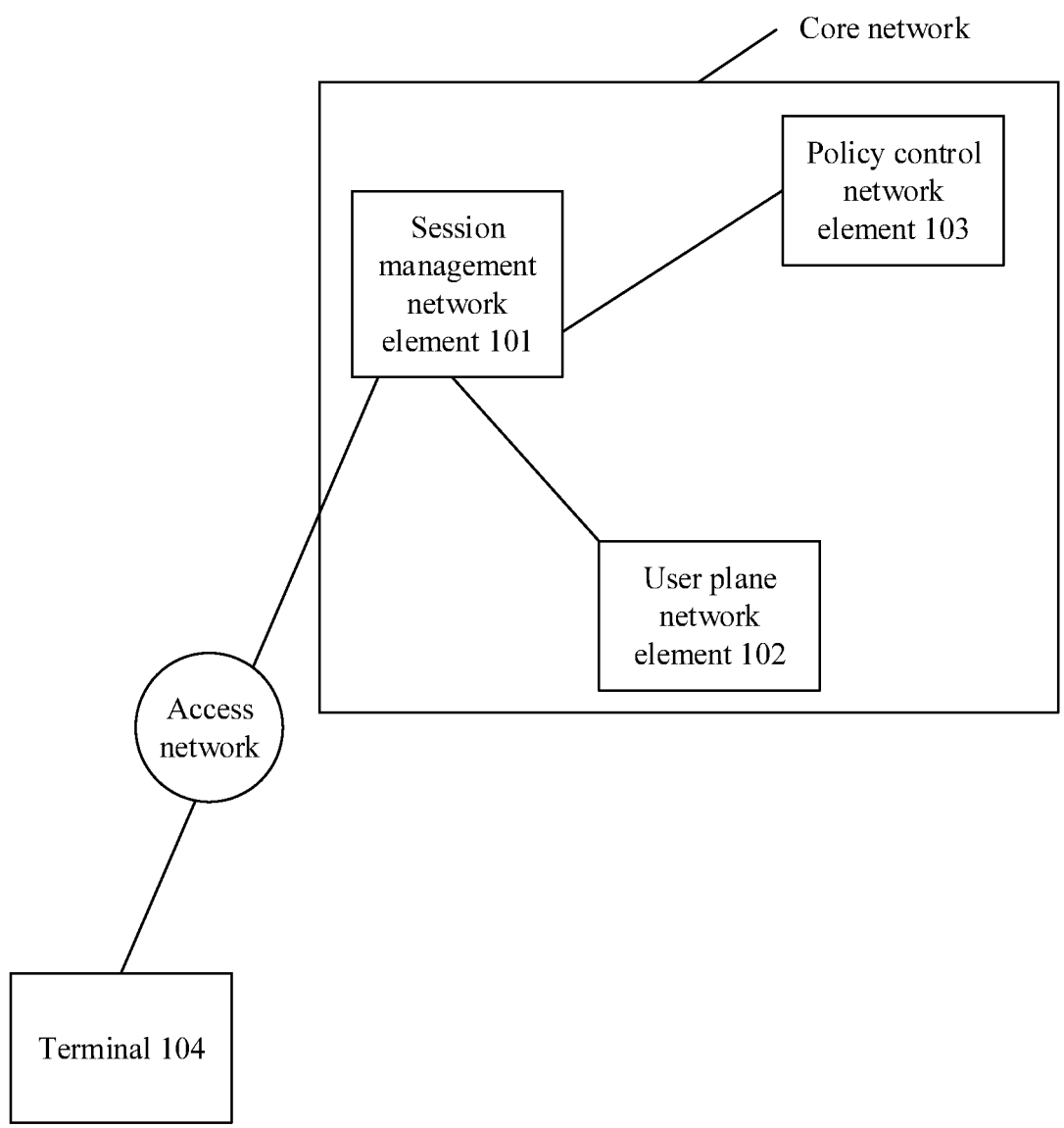
FIG. 2 is a schematic diagram of a communications system according to an embodiment of this application.

FIG. 2 is a schematic diagram of a communications system according to an embodiment of this application. The communications system includes a core network, an access network, and one or more terminals 104. The one or more terminals 104 (FIG. 2 shows only one terminal) access the core network through the access network. The core network includes the following network elements a session management network element 101, one or more user plane network elements 102 (FIG. 2 shows only one user plane network element) connected to the session management network element 101, and a policy control network element 103 connected to the session management network element 101.

The access network may be an access network device using a plurality of access technologies.

When the terminal 104 accesses a wireless network by using different access technologies, the terminal 104 may be connected to a core network device by using different access network devices.

Optionally, in this embodiment of this application, there is a session between at least one of the one or more terminals 104 and the user plane network element 102, and the session may support a plurality of access technologies. For example, the plurality of access technologies are a first access technology and a second access technology. The session may be accessed by using the first access technology, or may be accessed by using the second access technology.

In this embodiment of this application, the first access technology may be an access technology that complies with the 3GPP standard specification, for example, a 3GPP access technology, or an access technology used in a LTE, 2nd generation (2G), 3rd generation (3G), 4th generation (4G), or 5G system. An access network using the 3GPP access technology is referred to as a RAN. For example, the terminal 104 may use the 3GPP access technology to access a wireless network by using an access network device in a 2G, 3G, 4G, or 5G system.

The second access technology may be a radio access technology that is not defined in the 3GPP standard specification, for example, referred to as a non-3GPP access technology. The non-3GPP access technology may be an untrusted non-3GPP access technology, or may be a trusted non-3GPP access technology. The non-3GPP access technology may include WI-FI, worldwide interoperability for microwave access (WiMAX), code division multiple access (CDMA), a wireless local area network (WLAN), a fixed network technology, a wired technology, or the like. The terminal 104 may access a network by using an air interface technology represented by WI-FI, and the access network device may be an access point (AP).

In this embodiment of the present disclosure, the terminal may be distributed in a wireless network. Each terminal may be static or mobile.

In this embodiment of this application, all of the session management network element 101, the user plane network element 102, and the policy control network element 103 are network elements in a core network element, and may be collectively referred to as the core network element.

The core network element (for example, the user plane network element) is mainly responsible for packet data packet forwarding, QoS control, charging information statistics collection, and the like. The core network element (for example, the session management network element) is mainly responsible for user registration and authentication, mobility management, and delivery of a data packet forwarding policy, a QoS control policy, and the like to the UPF network element. The session management network element is responsible for establishing a corresponding session connection (for example, a PDU session) on a network side when a user initiates a service, providing a specific service for the user, and especially delivering a data packet forwarding policy, a QoS policy, and the like to the user plane network element by using an interface between the session management network element and the user plane network element.

Figure 3:
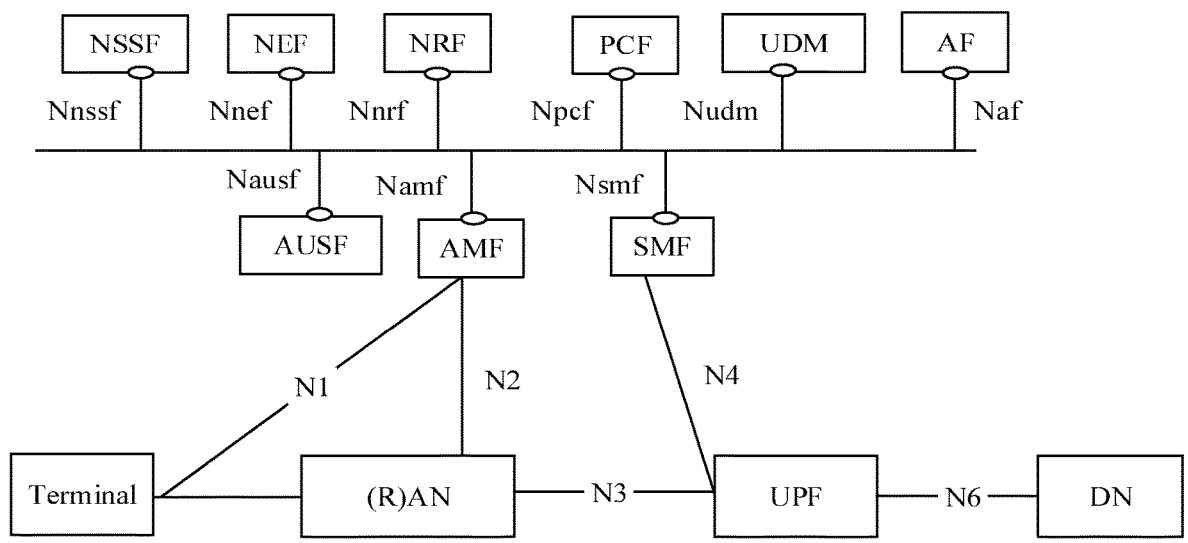
FIG. 3 is a schematic diagram of a 5G network architecture according to an embodiment of this application.

If the communications system shown in FIG. 2 is applied to a 5G network, as shown in FIG. 3, a network element or an entity corresponding to the session management network element 101 may be a session management function (SMF) network element, and the user plane network element may be a UPF network element. The policy control network element may be a policy control function (PCF) network element.

In addition, as shown in FIG. 3, the 5G network may further include an access and mobility management function (AMF) network element, an application function (AF) network element, an access network device (for example, an access network) that may also be referred to as a RAN device, an authentication server function (AUSF) network element, a unified data management (UDM) network element, a network slice selection function (NSSF) network element, a network exposure function (NEF) network element, a network repository function (NRF) network element, a DN, and the like. This is not specifically limited in this embodiment of this application.

The terminal communicates with the AMF network element through an N1 interface (N1). The AMF network element communicates with the SMF network element through an N11 interface (N11). The SMF network element communicates with one or more UPF network elements through an N4 interface (N4). Any two of the one or more UPF network elements communicate with each other through an N9 interface (N9). The UPF network element communicates with the DN through an N6 interface (N6). The terminal accesses a network by using the access network device (for example, the RAN device). The access network device communicates with the AMF network element through an N2 interface (N2). The SMF network element communicates with the PCF network element through an N7 interface (N7), and the PCF network element communicates with the AF network element through an N5 interface. The access network device communicates with the UPF network element through an N3 interface (N3). Any two or more AMF network elements communicate with each other through an N14 interface (N14). The SMF network element communicates with the UDM network element through an N10 interface (N10). The AMF network element communicates with the AUSF network element through an N12 interface (N12). The AUSF network element communicates with the UDM network element through an N13 interface (N13). The AMF network element communicates with the UDM network element through an N8 interface (N8).

It should be noted that names of the interfaces between the network elements in FIG. 3 are merely examples and the interfaces may have other names in a specific implementation. This is not specifically limited in the embodiments of this application.

It should be noted that the access network device, the AF network element, the AMF network element, the SMF network element, the AUSF network element, the UDM network element, the UPF network element, the PCF network element, and the like in FIG. 3 are merely names, and the names do not constitute any limitation on the devices. In a 5G network and another future network, network elements corresponding to the access network device, the AF network element, the AMF network element, the SMF network element, the AUSF network element, the UDM network element, the UPF network element, and the PCF network element may have other names. This is not specifically limited in the embodiments of this application. For example, the UDM network element may alternatively be replaced with a home subscriber server (HSS), a user subscription database (USD), a database entity, or the like. A general description is provided herein, and details are not described below.

For example, the access network device in this embodiment of this application is a device configured to access a core network, for example, may be a base station, a broadband network gateway (BNG), an aggregation switch, or a non-3GPP access device. The base station may include base stations in various forms, for example, a macro base station, a micro base station (also referred to as a small cell), a relay station, and an AP.

For example, the AMF network element in this embodiment of this application may be further responsible for functions such as a registration procedure during access of the terminal, location management in a movement process of the terminal, and lawful interception. This is not specifically limited in the embodiments of this application.

For example, the SMF network element in this embodiment of this application is configured to perform session management, including session-related control functions such as session establishment, session modification, session release, IP address assignment and management of the terminal, UPF network element selection and control, and lawful interception.

For example, in addition to the function of the UPF network element shown in FIG. 3, the UPF network element in this embodiment of this application may further implement UPFs of a serving gateway (SGW) and a packet data network gateway (PGW). Alternatively, the UPF network element may be a software-defined networking (SDN) switch. This is not specifically limited in the embodiments of this application.

The AUSF network element has an AUSF, and is mainly responsible for performing authentication on the terminal, and determining validity of the terminal. For example, authentication is performed on the terminal based on user subscription data of the terminal.

The UDM network element is a unified user data manager, and is mainly configured to store subscription data of the terminal. In addition, the UDM network element further includes functions such as authentication, terminal identifier information processing, and subscription management. This is not specifically limited in the embodiments of this application.

The PCF network element has a PCF, and is mainly configured to deliver a service-related policy to the AMF network element or the SMF network element.

The AF network element sends an application-related requirement to the PCF, so that the PCF network element generates a corresponding policy.

The DN provides a service for the terminal, for example, provides a mobile operator service, an internet service, or a third-party service.

The PDU session in this embodiment of this application refers to a data transmission channel that is established by the session management network element and that is used to connect the terminal 104 to the DN. Network elements related to the data transmission channel include the terminal, the access network device, the SMF network element, the UPF network element selected by the SMF network element for the session, and the DN corresponding to the UPF network element. The data transmission channel includes links between a plurality of pairs of adjacent network elements, for example, includes a link between the terminal and the access network device, a link between the access network device and the AMF network element, a link between the AMF network element and the SMF network element, a link between the SMF network element and the UPF network element, and a link between the UPF network element and the DN corresponding to the UPF network element.

The terminal is a device that provides a user with voice and/or data connectivity, for example, a handheld device or a vehicle-mounted device with a wireless connection function. The terminal may also be referred to as UE, an access terminal, a user unit, a user station, a mobile station, a mobile console, a remote station, a remote terminal, mobile equipment, a user terminal, wireless telecom equipment, a user agent, UE, or a user apparatus. The terminal may be a station in a WLAN, or may be a cellular phone, a cordless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal in a next generation communications system (for example, a 5G communications network), a terminal in a future evolved public land mobile network (PLMN), or the like. 5G may also be referred to as new radio (NR).

For example, in the embodiments of this application, the terminal may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on a body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of AF and need to work with other devices such as smartphones, such as various smart bands or smart jewelry for monitoring physical signs.

Figure 4:
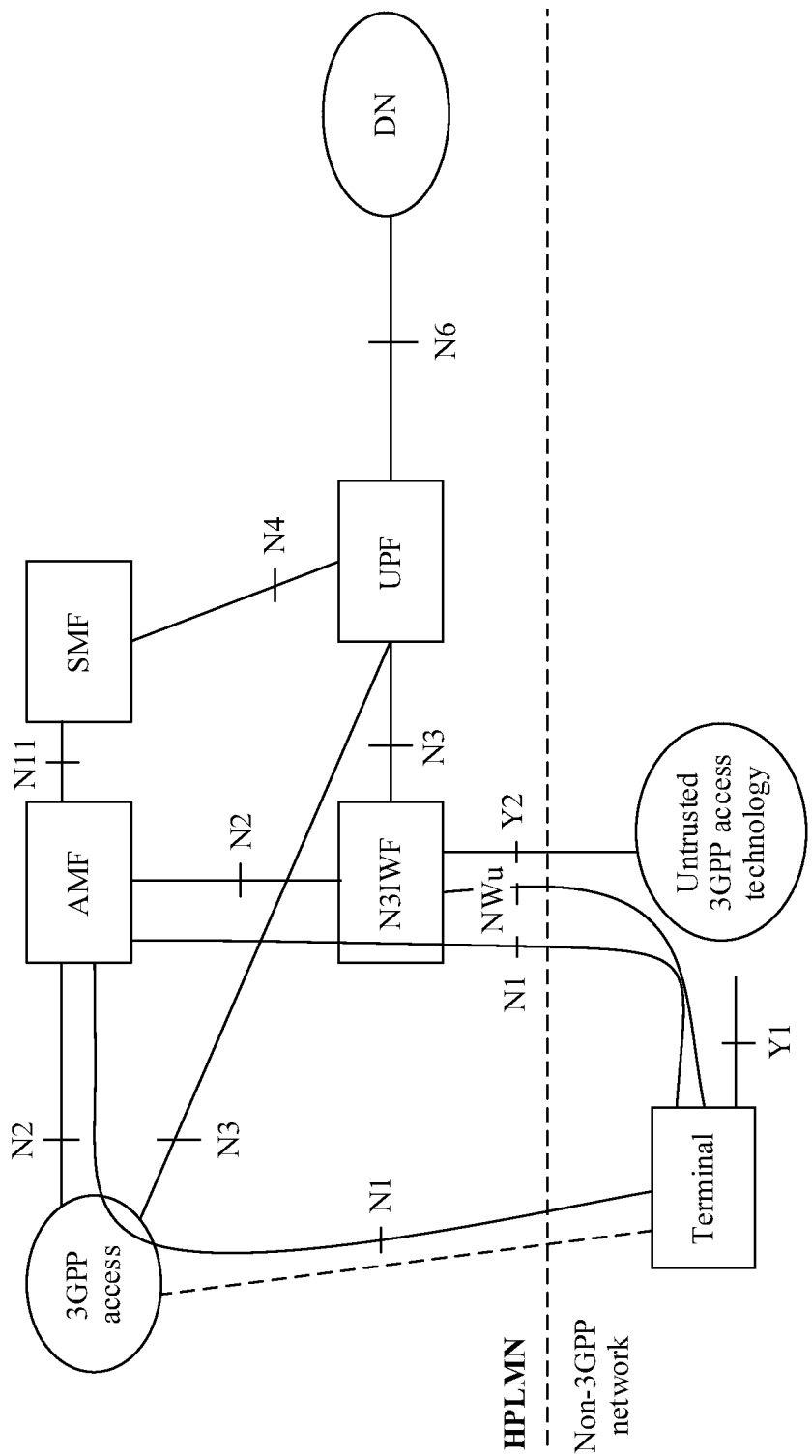
FIG. 4 is a schematic diagram in which a terminal accesses a network by using a plurality of access technologies according to an embodiment of this application.

FIG. 4 is a schematic diagram of an architecture in which a terminal accesses a network by using a plurality of access technologies according to an embodiment of this application, for example, an architecture in which the terminal uses both a 3GPP access technology and a non-3GPP access technology. As shown in FIG. 4, the terminal may be connected to an AMF network element by using both the 3GPP access technology and the non-3GPP access technology. Specifically, as shown in FIG. 4, when accessing the AMF network element by using the non-3GPP access technology, the terminal may access the AMF network element by using a N3IWF entity.

When the 3GPP access technology and the non-3GPP access technology belong to a same PLMN, the terminal selects a same AMF network element. When the 3GPP access technology and the non-3GPP access technology belong to different PLMNs, the terminal may select different AMF network elements. An SMF network element is selected by the AMF network element. Different SMF network elements may be selected for different PDU sessions, but a same SMF network element needs to be selected for a same PDU session.

When the SMF network element selects a UPF network element, one PDU session may have a plurality of UPF network elements. Therefore, the SMF network element may select a plurality of UPF network elements to create a tunnel connection for a PDU session.

An AUSF network element and an authentication repository function (ARPF)/a UDM network element form a home PLMN (HPLMN). When accessing a network by using different access technologies, the terminal may have different visited PLMNs (VPLMNs), or may have a same VPLMN. Specifically, for functions of the network elements shown in FIG. 4, refer to the foregoing embodiments. Details are not described herein again in this application.

The following explains some terms in this application.

(1) Service flow migration (switching or splitting) includes corresponding to supporting a MA PDU session, a service flow in the MA PDU session supports moving from a link corresponding to a first access technology in a plurality of access technologies to a link corresponding to a second access technology in the plurality of access technologies (switching). Alternatively, a service flow moves from a link corresponding to one access technology to links corresponding to a plurality of access technologies for simultaneous transmission (splitting). Alternatively, a service flow moves from links corresponding to a plurality of access technologies to a link corresponding to one access technology for transmission (switching).

The core network element in this embodiment of this application may be any one of a session management network element, a policy control network element, and a user plane network element.

Embodiment 1

Figure 5:
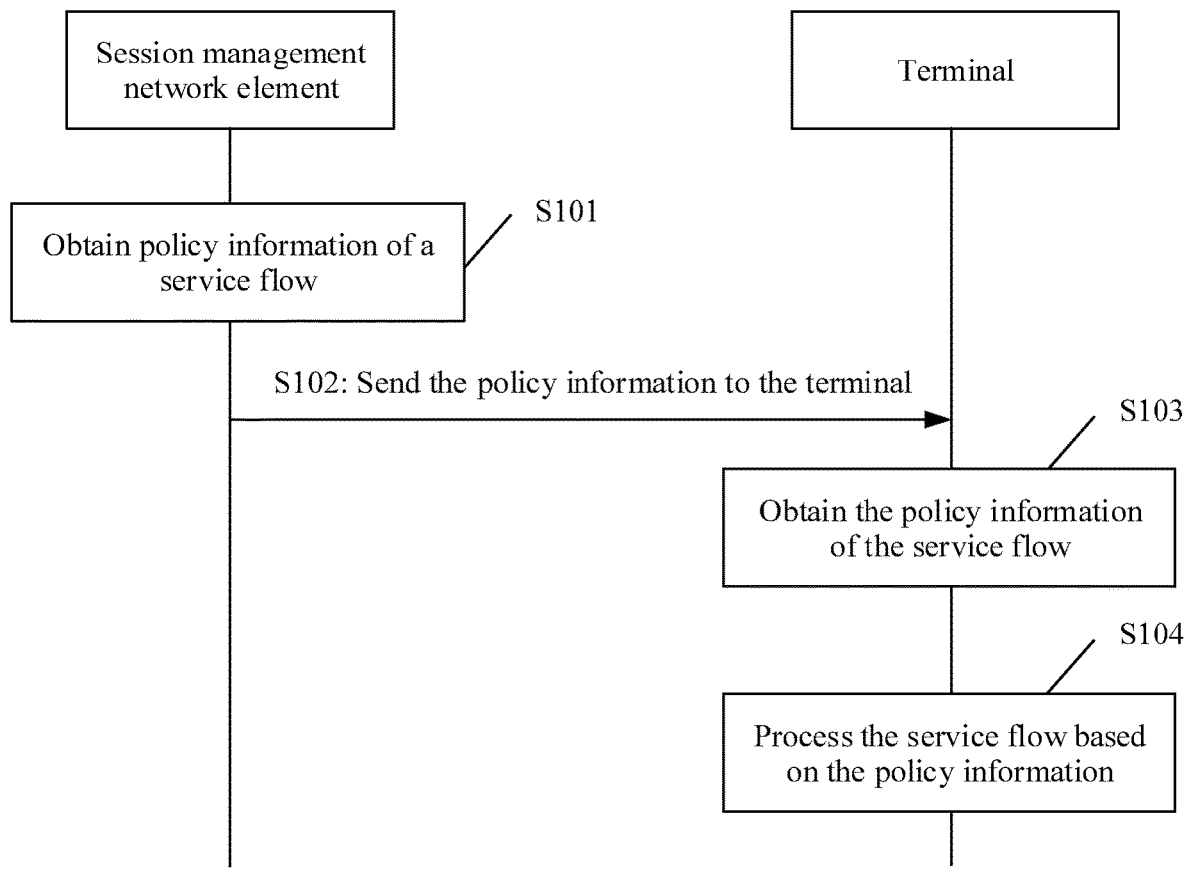
FIG. 5 to FIG. 13 are schematic flowcharts of a service flow processing method and a communication method according to an embodiment of this application.

FIG. 5 is a schematic flowchart of interaction between a service flow processing method and a communication method according to an embodiment of this application. The method includes the following steps.

S101. A session management network element obtains policy information of a service flow, where the policy information includes at least one of a flow steering policy, a flow steering mode, and link condition information for transmitting the service flow.

The link condition information for transmitting the service flow may include a link threshold parameter, for example, a link performance threshold/measurement threshold.

A PDU session to which the service flow belongs supports a plurality of access technologies.

In this embodiment of this application, a link may be a transmission channel corresponding to an access technology, or may be a data transmission channel corresponding to a service flow, or may be a data transmission channel corresponding to a QoS flow.

Specifically, the session management network element may obtain the policy information from a policy control network element in a process in which a terminal requests to register with a network by using at least one of the plurality of access technologies. Alternatively, the session management network element may obtain the policy information from a policy control network element in a session management procedure.

For example, the session management process may include a PDU session establishment procedure or a PDU session update (which may also be referred to as PDU session modification) procedure.

It may be understood that the policy information of the service flow includes a flow description parameter and policy information corresponding to the flow description parameter. The policy information of the service flow may specifically include at least one pair of the flow description parameter and a flow steering policy corresponding to the flow description parameter, the flow description parameter and a flow steering mode corresponding to the flow description parameter, and the flow description parameter and link condition information that is used to transmit the service flow and that corresponds to the flow description parameter.

The flow description parameter is used to determine the service flow. For example, the flow description parameter may include quintuple information (for example, at least one of a source IP address, a destination IP address, a source port number, a destination port number, and a protocol type) of the service flow.

The link condition information includes at least one of access-related condition information and access-independent condition information.

For example, the access-related condition information includes one or more of the following an access network signal strength threshold, an access network signal quality threshold, a backhaul bandwidth threshold or load threshold, an access network bandwidth threshold, and an access network load threshold.

For example, the access-independent condition information includes at least one or more of the following a link delay threshold (for example, an uplink delay threshold, a downlink delay threshold, and an uplink/downlink delay threshold (namely, a round-trip time (RTT) threshold)), a link packet loss rate threshold (for example, an uplink packet loss rate threshold, a downlink packet loss rate threshold, and an uplink/downlink packet loss rate threshold), and a link jitter threshold (for example, an uplink jitter threshold, a downlink jitter threshold, and an uplink/downlink jitter threshold).

Specifically, when link status information of a link meets the link condition information corresponding to the service flow, the link may be used to transmit the service flow. When link status information of a link does not meet the link condition information corresponding to the service flow, the link cannot be used to transmit the service flow.

For example, the flow steering policy may be an access traffic steering, switching, and splitting (ATSSS) policy/ATSSS rule. The flow steering policy may include at least one access technology indication. At least one access technology for transmitting the service flow may be determined by using the flow steering policy, for example, at least one of a 3GPP access technology and a non-3GPP access technology.

The flow steering mode includes one or more of the following.

(a) Access technology preference indication the access technology preference indication indicates that the service flow is preferably transmitted by using a link corresponding to an access technology associated with the access technology preference indication.

For example, the access technology preference indication indicates a 3GPP access technology or a non-3GPP access technology. When the access technology preferably used for transmission is unavailable, the service flow may be transmitted by using a link corresponding to another access technology.

(b) Optimal link-based flow steering indication the optimal link-based flow splitting indication indicates that the service flow is preferably transmitted by using an optimal link, where the optimal link is a link whose link state is better than that of another link.

For example, the optimal link-based flow steering indication may include at least one parameter of an optimal link indication, a minimum link delay indication, a minimum RTT indication, a minimum link load indication, a maximum link bandwidth indication, or a maximum access signal indication.

The terminal may determine the optimal link by using the foregoing parameter. For example, the optimal link may be a link with a shortest delay, a link with lowest load, or a link with highest access signal strength.

(c) Link load balancing-based flow steering indication the link load balancing-based flow steering indication indicates that the service flow is transmitted according to a link load balancing policy.

The link load balancing-based flow steering indication includes a load balancing indication.

(d) Access technology and flow steering percentage indication the access technology and flow steering percentage indication indicates that the service flow is transmitted based on a flow steering percentage corresponding to the access technology.

For example, when the flow steering percentage is a specific value, the terminal transmits the service flow based on the flow steering percentage corresponding to the access technology. For example, if the flow steering percentage indicates that a flow steering percentage of a 3GPP access technology is 20%, and a flow steering percentage of a non-3GPP access technology is 80%, 20% data packets in the service flow are transmitted by using the 3GPP access technology, and 80% data packets in the service flow are transmitted by using the non-3GPP access technology. When the flow steering percentage is null or no flow steering percentage is included, it indicates that the service flow is split based on link load balancing.

(e) Redundant transmission indication the redundant transmission indication indicates that same data packets in the service flow are simultaneously transmitted by using different access technologies.

S102. The session management network element sends the policy information to the terminal.

In an example, the session management network element sends the policy information to the terminal in a session management procedure.

Specifically, the session management network element sends, to the terminal based on a PDU session management request message from the terminal, a PDU session management response message that carries the policy information. For example, the PDU session management request message may be a PDU session establishment request message or a PDU session update request message.

For example, the PDU session management response message may be a PDU session establishment accept message or a PDU session update success message.

In an example, in a process in which the terminal successfully registers with a network, the session management network element may send, to the terminal by using a NAS transport message, the policy information from the policy control network element.

In a possible implementation, the session management network element may obtain the policy information from the policy control network element.

S103. The terminal obtains the policy information of the service flow.

For example, step S103 may be implemented in the following manner. The terminal obtains, from the NAS transport message, at least one of the flow steering mode of the service flow and the link condition information for transmitting the service flow that are from the policy control network element. Alternatively, the terminal obtains, from the session management response message from the session management network element, at least one of the flow steering policy of the service flow, the flow steering mode of the service flow, and the link condition information for transmitting the service flow.

S104. The terminal processes the service flow based on the policy information.

According to the service flow processing method provided in this embodiment of this application, the terminal obtains the policy information of the service flow, and processes the service flow based on the policy information of the service flow. Because the terminal processes the service flow based on the at least one of the flow steering policy, the flow steering mode, and the link condition information that are delivered by a network side, the processed service flow can be transmitted on a link that meets the link condition information, and the terminal can implement more refined processing on the service flow.

Figure 6:
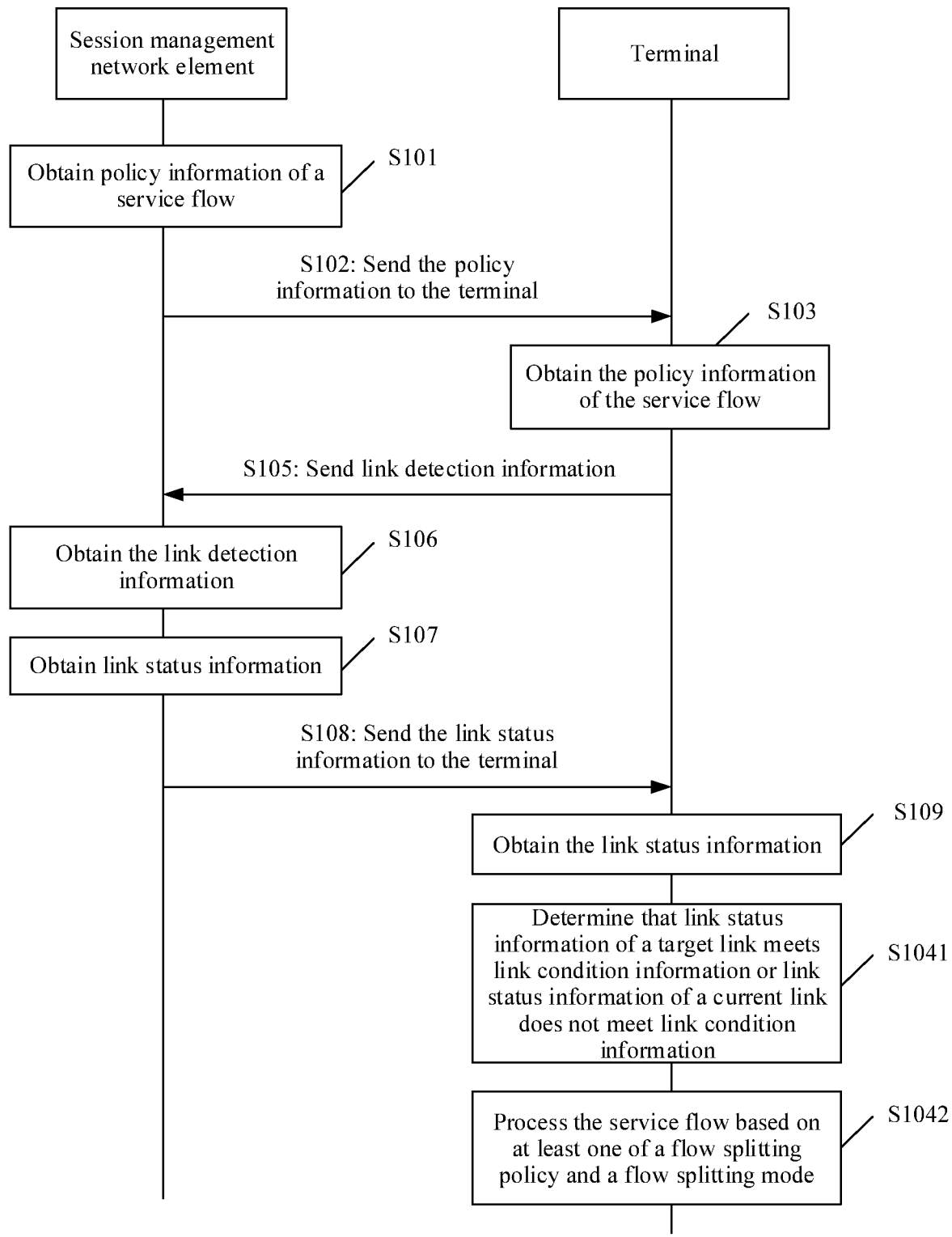

In a possible implementation, as shown in FIG. 6, the method provided in this embodiment of this application further includes the following steps.

S105. The terminal sends link detection information to the session management network element, where the link detection information is used to obtain link status information of a link.

For example, the link detection information includes a link status detection and reporting policy (measurement assistance policy/reporting).

Optionally, to reduce signaling overheads, the terminal may use the PDU session management request message to carry the link detection information.

For example, the link detection information provided in this application includes at least one of a subscribed link status parameter and sending condition information of the subscribed link status parameter. The condition information indicates to report the subscribed link status parameter when the subscribed link status parameter reaches a threshold that corresponds to the subscribed link status parameter and that is included in the link condition information. For example, if the subscribed link status parameter is access network signal quality, when the detected access network signal quality reaches the access network signal quality threshold, the detected access network signal quality is reported.

For example, the subscribed link status parameter includes at least one of an access-related state parameter and an access-independent state parameter.

For example, the access-related state parameter includes one or more of access network signal quality, access network signal strength, access network bandwidth, access network load, and backhaul network bandwidth or load.

For example, in the 3GPP access technology, the access network bandwidth is bandwidth of a RAN device. In the non-3GPP access technology, the access network bandwidth is bandwidth of an access network element, for example, bandwidth of an N3IWF or bandwidth of a trusted access gateway. The access network load is a load status of an AP, for example, load of the AP in the non-3GPP access technology or load of the RAN device in the 3GPP access technology.

The access-independent state parameter link includes one or more of a delay parameter, a link packet loss rate parameter, and a link jitter parameter.

Optionally, the link detection information further includes service flow information, used to determine to detect links corresponding to specific service flows. For example, the link detection information further includes one or more of the following an access technology indication, a GBR indication, a non-GBR indication, a QFI, and a flow description parameter.

The access technology indication indicates that a link corresponding to an access technology associated with the access technology indication needs to be subscribed to, and the GBR indication indicates that a link whose link status information needs to be sent is a link through which a GBR service flow is sent. The non-GBR indication indicates that the link whose link status information needs to be sent is a link through which a non-GBR service flow is sent. The flow description parameter indicates that the link whose link status information needs to be sent is a link through which a service flow determined based on the flow description parameter is sent. The QFI indicates that the link whose link status information needs to be sent is a link corresponding to a QoS flow associated with the QFI.

In a possible implementation, the link detection information may further include sending frequency information of the subscribed link status parameter, namely, an interval at which the subscribed link status parameter is reported. For example, the subscribed link status parameter is reported every second or every minute.

S106. The session management network element obtains the link detection information.

For example, the session management network element may receive the link detection information from the PDU session management request message.

It should be noted that in this embodiment of this application, the session management network element may alternatively generate the link detection information based on the policy information from the PCF to the terminal. When the link detection information is generated by the session management network element, step S105 may be omitted.

S107. The session management network element obtains link status information.

For example, step S107 may be implemented in the following manner. The session management network element sends the link detection information to a user plane network element. The session management network element receives the link status information from the user plane network element.

For example, the session management network element sends an N4 session message (for example, an N4 session establishment/update request message) to the user plane network element, where the N4 session message carries the link detection information. Alternatively, when an access network device requests to send a tunnel identifier related to the PDU session to the user plane network element, the session management network element sends an N4 session update message to the user plane network element, where the N4 session update message carries the link detection information.

Optionally, the session management network element further sends a first indication to the user plane network element, where the first indication indicates the link whose link status information needs to be sent.

For example, the first indication includes at least one of the QFI, the access technology indication, the tunnel identifier, the GBR indication, the non-GBR indication, and the flow description parameter.

If QFI=1, the link detection information is reported through RTT detection. In this case, the user plane network element performs RTT detection on a QoS flow whose QFI is equal to 1, and sends the detected link status information to the terminal or the session management network element. If the access technology is the 3GPP access technology, the link detection information is reported through RTT detection. In this case, the user plane network element performs RTT detection on a link corresponding to the 3GPP access technology, and sends the detected link status information to the terminal or the session management network element. If the first indication is the tunnel identifier, the link detection information is reported through RTT detection. In this case, the user plane network element performs RTT detection on a link corresponding to the tunnel identifier, and sends the detected link status information to the terminal or the session management network element.

S108. The session management network element sends the link status information to the terminal.

Optionally, the session management network element sends the link status parameter and the at least one of the access technology indication, the GBR indication, the non-GBR indication, the QFI, and the flow description parameter to the terminal.

S109. The terminal receives the link status information from the session management network element.

Optionally, after the terminal obtains the link status information, S104 may be implemented in the following manners.

S1041. The terminal determines that link status information of a target link meets the link condition information or link status information of a current link does not meet the link condition information.

The target link is a link corresponding to an access technology that is to be used to transmit a service flow after migration. The current link is a link corresponding to an access technology currently used to transmit a service flow.

For example, the current link is a link corresponding to the 3GPP access technology, and the target link may be a link corresponding to the non-3GPP access technology, or links corresponding to the non-3GPP access technology and the 3GPP access technology.

Alternatively, the current link is a link corresponding to the non-3GPP access technology, and the target link may be a link corresponding to the 3GPP access technology, or links corresponding to the non-3GPP access technology and the 3GPP access technology.

Alternatively, the current link is links corresponding to the non-3GPP access technology and the 3GPP access technology, and the target link may be a link corresponding to the 3GPP access technology or a link corresponding to the non-3GPP access technology.

S1042. The terminal processes the service flow based on at least one of the flow steering policy and the flow steering mode.

In a possible implementation, step S1042 may be implemented in the following manner. The terminal transmits the service flow on links corresponding to the plurality of access technologies.

For example, when determining that link status information of the links corresponding to the non-3GPP access technology and the 3GPP access technology meets the link condition information, the terminal migrates the service flow from the link corresponding to the 3GPP access technology to the links corresponding to the non-3GPP access technology and the 3GPP access technology.

In another possible implementation, step S1042 may be implemented in the following manner. The terminal migrates the service flow from a link corresponding to a first access technology in the plurality of access technologies to a link corresponding to a second access technology in the plurality of access technologies for transmission.

For example, the access technology currently used to transmit the service flow is the 3GPP access technology. When link status information of the link corresponding to the 3GPP access technology does not meet the link condition information, the terminal migrates the service flow from the link corresponding to the 3GPP access technology to the link corresponding to the non-3GPP access technology. Alternatively, if the terminal determines that the access technology preference indication indicates that the non-3GPP access technology is preferred, when determining that the link corresponding to the non-3GPP access technology meets the condition, the terminal migrates the service flow to the link corresponding to the non-3GPP access technology.

In still another possible implementation, step S1042 may be implemented in the following manner. The terminal migrates the service flow from links corresponding to the plurality of access technologies to a link corresponding to a first access technology or a second access technology in the plurality of access technologies for transmission.

For example, the access technologies currently used to transmit the service flow are the 3GPP access technology and the non-3GPP access technology. When link status information of the links corresponding to the 3GPP access technology and the non-3GPP access technology does not meet the link condition information, the terminal migrates the service flow from the links corresponding to the 3GPP access technology and the non-3GPP access technology to the link corresponding to the non-3GPP access technology or to the link corresponding to the 3GPP access technology. Alternatively, when the link corresponding to the 3GPP access technology or the link corresponding to the non-3GPP access technology meets the condition, the terminal switches the service flow from the links corresponding to the 3GPP access technology and the non-3GPP access technology to the link corresponding to the 3GPP access technology or the link corresponding to the non-3GPP access technology.

In yet another possible implementation, the terminal initiates a processing procedure of the service flow.

For example, the processing procedure that is of the service flow and that is initiated by the terminal includes a PDU session establishment procedure or a PDU session update procedure. The PDU session establishment procedure or the PDU session update procedure carries at least one access technology indication corresponding to the service flow. The at least one access technology indication indicates that the terminal requests to migrate the service flow to a link corresponding to at least one access technology indicated by the at least one access technology indication for transmission. Then, the session management network element may send an updated flow steering policy to the terminal, where the updated flow steering policy includes the at least one access technology indication corresponding to the service flow.

It should be noted that in this embodiment of this application, the terminal has a flow steering policy 1. When the terminal determines to transmit a service flow based on an access technology 1 indicated by the flow steering policy 1, the terminal determines that link status information corresponding to a link does not meet the link condition information, and in this case, the terminal may re-determine an access technology based on at least one of the flow steering mode and the link condition information. Alternatively, when determining, based on the flow steering mode, that link status information corresponding to an access technology (namely, an access technology indicated by the flow steering policy) preferably used to transmit a service flow does not meet the link condition information, the terminal requests the session management network element to re-determine an access technology to transmit the service flow. The session management network element may resend an access technology indication (that is, update the flow steering policy) to the terminal based on the access technology requested by the terminal. Then, the terminal migrates the service flow according to the updated flow steering policy.

Figure 7:
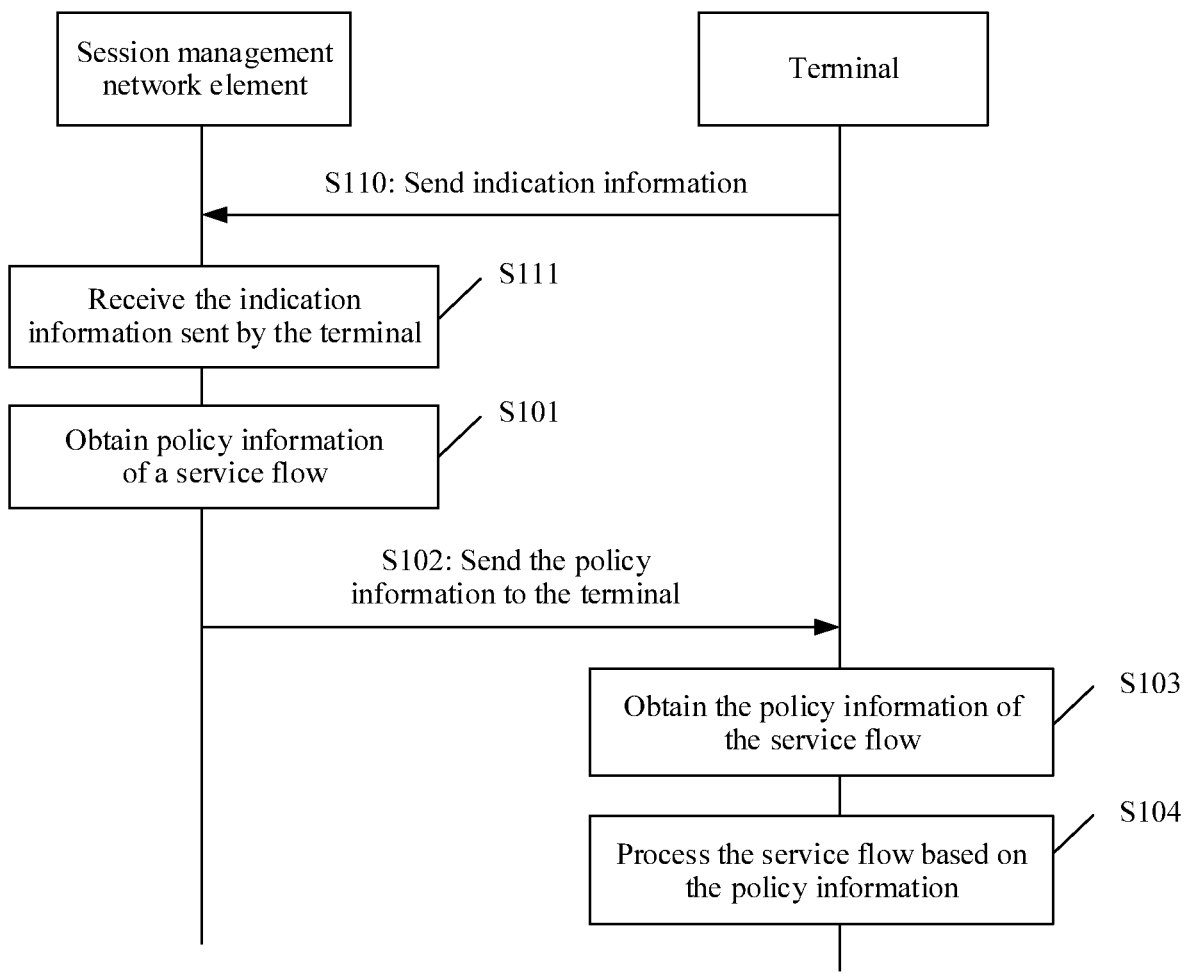

In another embodiment of this application, as shown in FIG. 7, the method provided in this embodiment of this application further includes the following steps.

S110. The terminal sends indication information to the session management network element, where the indication information indicates that the terminal processes the service flow.

For example, the indication information may be a UE-initiated indication.

Optionally, the terminal further sends a multi-access session indication to the session management network element, to indicate that the PDU session supports the plurality of access technologies.

For example, the indication information may be carried in the session management request message.

S111. The session management network element receives the indication information from the terminal.

Optionally, when the session management network element determines to authorize the terminal to migrate the service flow, the session management network element may use the PDU session management response message to carry the UE-initiated indication or send the flow steering policy of the service flow to the terminal.

Figure 8:
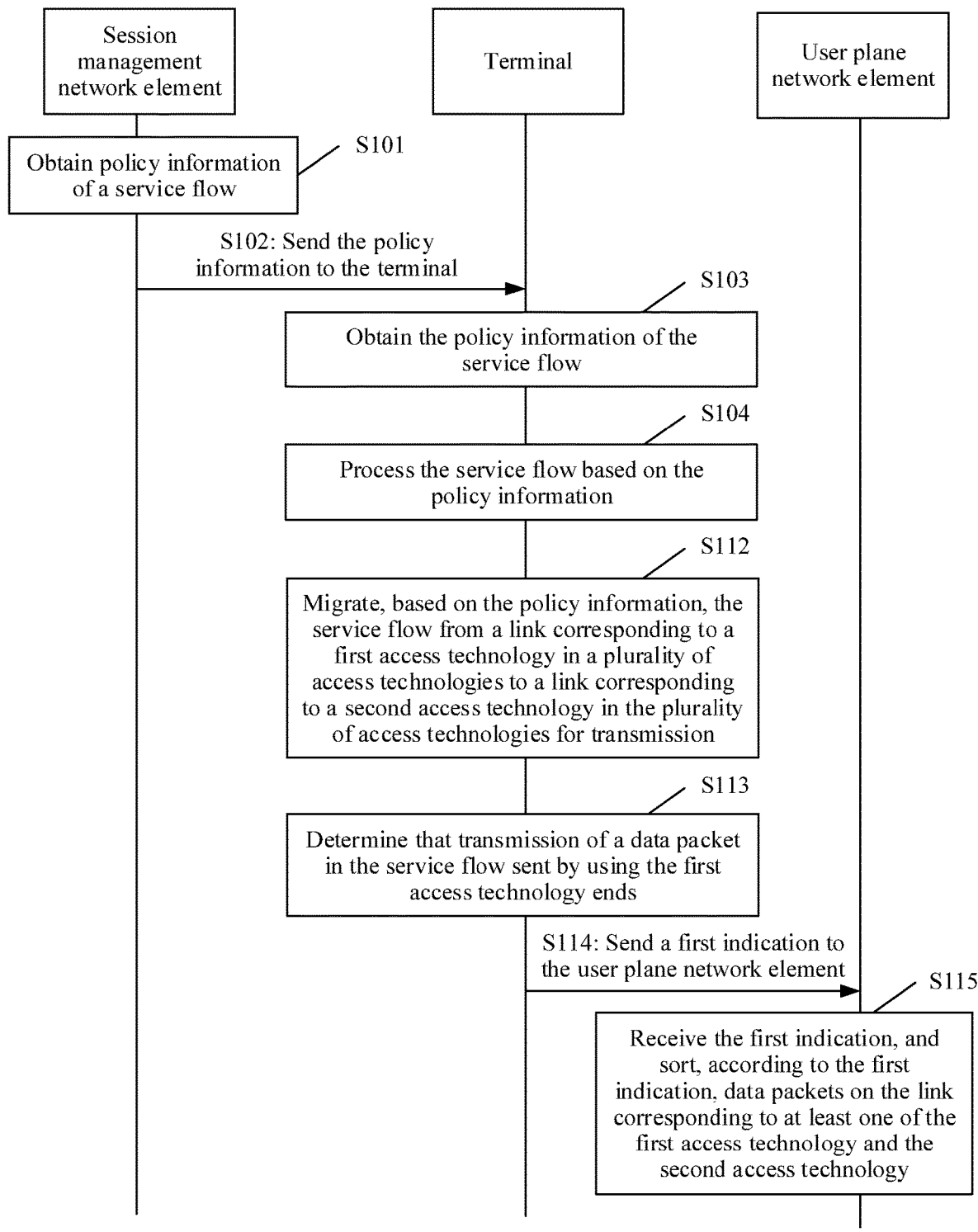

In still another embodiment of this application, as shown in FIG. 8, the method provided in this embodiment of this application further includes the following steps.

S112. The terminal migrates, based on the policy information, the service flow from the link corresponding to the first access technology in the plurality of access technologies to the link corresponding to the second access technology in the plurality of access technologies for transmission.

S113. The terminal determines that transmission of a data packet in the service flow from using the first access technology ends.

S114. The terminal sends a first indication to the user plane network element, where the first indication indicates that transmission of the data packet in the service flow transmitted by using the first access technology ends.

S115. The user plane network element receives the first indication, and sorts, according to the first indication, data packets on the link corresponding to at least one of the first access technology and the second access technology.

Specifically, for descriptions of steps S112 to S115, refer to descriptions in subsequent embodiments. Details are not described herein.

Figure 9:
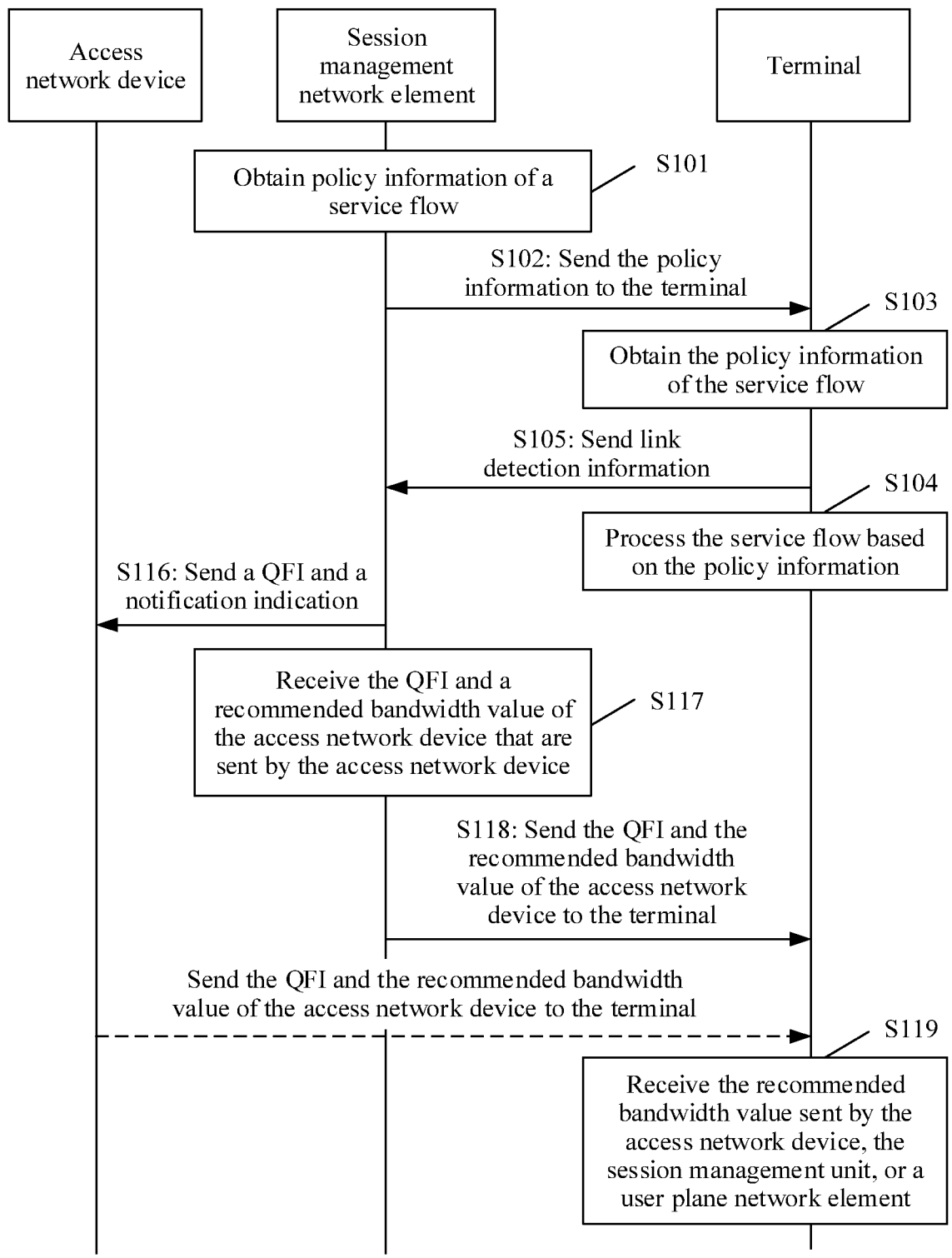

In yet another embodiment of this application, as shown in FIG. 9, the method provided in this embodiment of this application further includes the following steps.

S116. The session management network element sends the QFI and a notification indication to the access network device, where the notification indication indicates to send a recommended bandwidth value of the access network device to the session management network element or the user plane network element when the access network device cannot meet a bandwidth requirement of a QoS flow corresponding to the QFI.

The recommended bandwidth value may also be referred to as an "available bandwidth value", namely, a bandwidth resource that can be provided by the access network device for the QoS flow with the QFI. For example, if the access network device may provide bandwidth of 5 megabits per second (Mbps) for the QoS flow whose QFI is equal to 1, the recommended bandwidth is 5 Mbps.

For example, a QFI and an available bandwidth indication indicate that the bandwidth requirement of the QoS flow with the QFI is 10 Mbps. However, in this case, if available bandwidth of the access network device is 3 Mbps, the access network device sends a recommended bandwidth value of 3 Mbps to the session management network element or the user plane network element.

S117. The session management network element receives the QFI and the recommended bandwidth value of the access network device that are from the access network device.

S118. The session management network element sends the QFI and the recommended bandwidth value of the access network device to the terminal.

For example, the session management network element may send the recommended bandwidth value of the access network device to the terminal by using a NAS transport message.

S119. The terminal receives link status information from the access network device, where the link status information is the recommended bandwidth value of the access network device. Alternatively, the terminal receives link status information from the session management network element or the user plane network element, where the link status information is the recommended bandwidth value of the access network device.

It should be noted that when the terminal obtains the link status information from the access network device or the user plane network element, step S118 may be omitted.

Optionally, after the terminal obtains the recommended bandwidth value of the access network device, step S104 may be specifically implemented in the following manner. The terminal processes the service flow based on the policy information and the recommended bandwidth value.

A specific service flow processing solution includes, if the terminal determines that bandwidth required by the service flow is greater than the recommended bandwidth value of the access network device, it indicates that a current access network device cannot meet the bandwidth requirement of the service flow. The terminal requests bandwidth required by the service flow from another access technology, and migrates the overall service flow to another access technology. Alternatively, the terminal obtains supplementary bandwidth by subtracting the recommended bandwidth value of the access network device from bandwidth required by the service flow. The terminal requests the supplementary bandwidth from another access technology, and migrates a part of the service flow to another access technology, so that a current access device and an access device corresponding to the other access technology provide the required bandwidth for the service flow.

Embodiment 2

Figure 10:
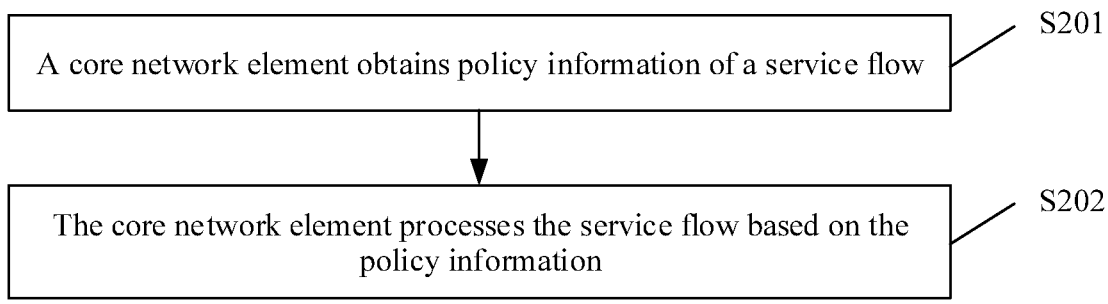

FIG. 10 shows a method for initiating service flow movement by a core network element. The method includes the following steps.

S201. The core network element obtains policy information of a service flow, where the policy information includes at least one of a flow steering policy, a flow steering mode, and link condition information for transmitting the service flow, and a PDU session to which the service flow belongs supports a plurality of access technologies.

For specific descriptions of the at least one of the flow steering policy, the flow steering mode, and the link condition information for transmitting the service flow, refer to the descriptions in Embodiment 1. Details are not described herein again.

Manners for obtaining the policy information vary with different core network elements. Descriptions are provided below.

In an example, the core network element is a session management network element.

The session management network element may obtain, from a policy control network element in a PDU session management process, the at least one of the flow steering policy, the flow steering mode, and the link condition information for transmitting the service flow.

The flow steering policy may be determined by the policy control network element based on link status information and at least one of the flow steering mode and the link condition information for transmitting the service flow. Certainly, the flow steering policy may alternatively be locally preconfigured by the session management network element.

In this case, the policy control network element sends only an optimal link-based flow steering indication and a link load balancing-based indication to the session management network element.

The session management network element determines an optimal link. To be specific, the session management network element determines, based on the optimal link-based flow steering indication, that the optimal link is a link indicated by at least one parameter of a minimum link delay indication, a minimum RTT indication, a minimum link load indication, a maximum link bandwidth indication, or a maximum access signal indication.

In addition, the session management network element determines, based on the link load balancing-based indication from the policy control network element, a flow steering percentage of a link corresponding to each access technology.

In another example, the core network element is a policy network element.

The policy control network element obtains, from a local configuration, the at least one of the flow steering policy, the flow steering mode, and the link condition information for transmitting the service flow.

In still another example, the core network element is a user plane network element.

The user plane network element may obtain, from a session management network element, the at least one of the flow steering policy, the flow steering mode, and the link condition information for transmitting the service flow. Specifically, after obtaining the policy information in a PDU session management procedure, the session management network element may send the policy information to the user plane network element by using an N4 session message.

S202. The core network element processes the service flow based on the policy information.

Figure 11:
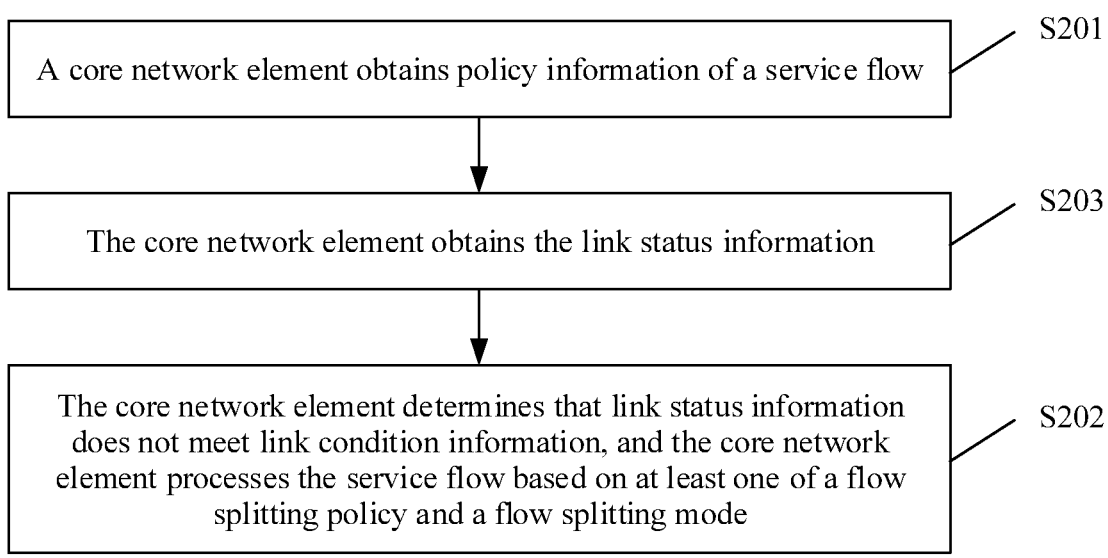

In still yet another embodiment of this application, as shown in FIG. 11, the method provided in this embodiment of this application further includes the following step.

S203. The core network element obtains the link status information.

Implementations of S203 vary with different core network elements. Therefore, descriptions are provided in the following embodiments.

Figure 12:
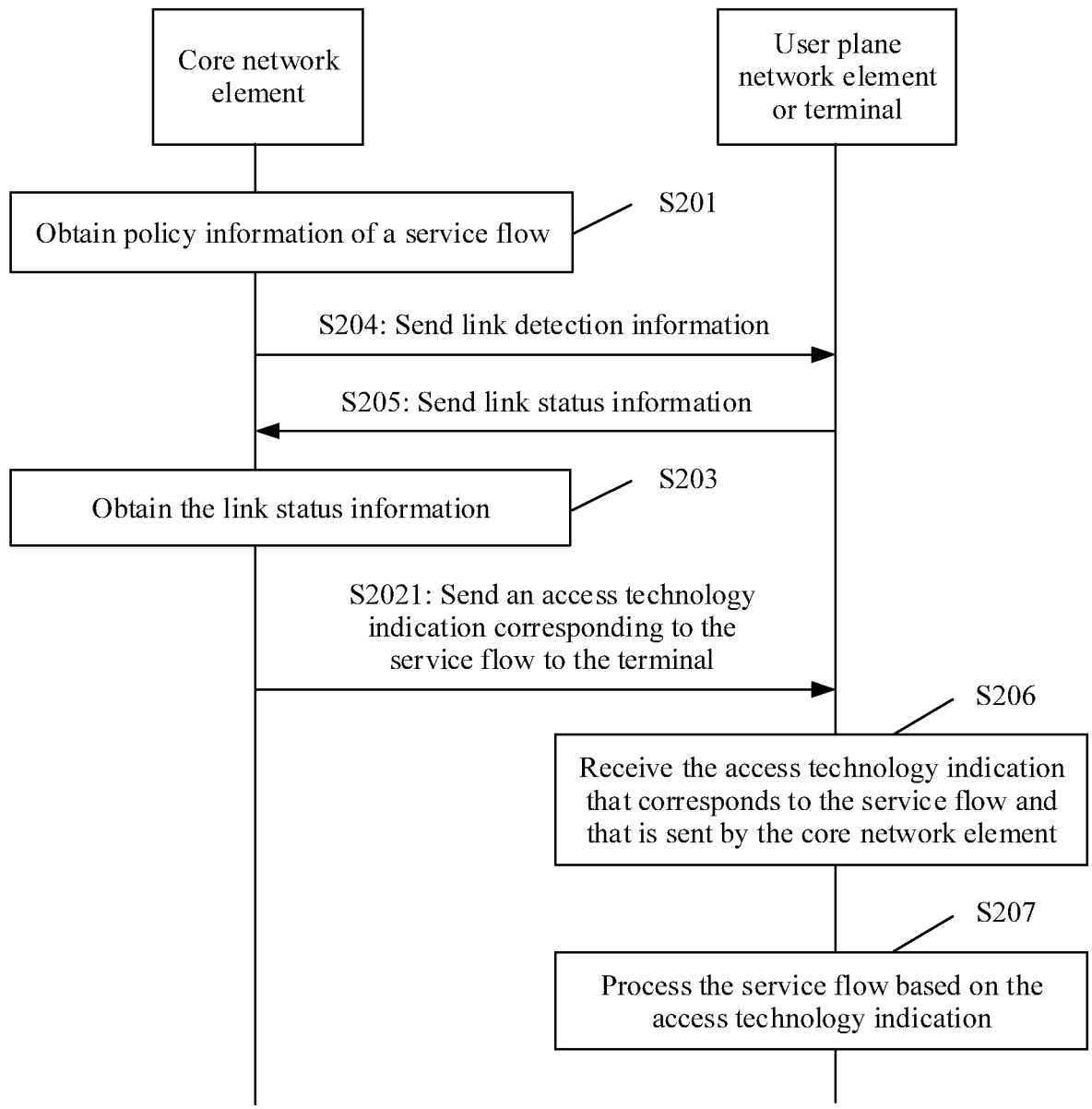

When the core network element is the session management network element, as shown in FIG. 12, the method provided in this embodiment of this application further includes the following steps.

S204. The core network element sends the link detection information to the user plane network element or the terminal.

Specifically, for specific content of the link detection information, refer to the descriptions in the foregoing embodiments. Details are not described herein again.

A difference from Embodiment 1 in which the link detection information obtained by the session management network element from the terminal is from the policy control network element lies in that the link detection information herein is generated by the session management network element based on the policy information.

It should be noted that when the session management network element sends the link detection information to the terminal, if the terminal already has the link detection information (for example, when the terminal registers with a network side, the policy control network element sends the link detection information to the terminal), the terminal detects a link status parameter by using the link detection information from the session management network element.

Optionally, the core network element sends a first indication to the terminal or the user plane network element, where the first indication indicates a link whose link status information needs to be sent.

For example, the first indication includes at least one of a QFI, an access technology indication, a tunnel identifier, a GBR indication, a non-GBR indication, and a flow description parameter. Specifically, for meanings of the content included in the first indication, refer to the descriptions in the foregoing embodiments. Details are not described herein again.

S205. The user plane network element or the terminal sends the link detection information to the core network element.

For example, the user plane network element may send the link detection information to the core network element by using an N4 interface message.

For example, the terminal may send the link detection information to the core network element by using a NAS transport message. Alternatively, the terminal sends the link status information to the user plane network element by using a user plane message, and then the user plane network element sends the link status information to the core network element.

Correspondingly, step S203 may be specifically implemented in the following manner. The core network element obtains, from the terminal or the user plane network element, the link status information from the terminal or the user plane network element.

When the core network element is the policy control network element, step S203 is specifically implemented in the following manner. The policy control network element sends the link detection information to the session management network element, and the session management network element sends the link detection information to the terminal or the user plane network element. After receiving the link status information from the terminal or the user plane network element, the session management network element reports the link status information to the policy control network element.

When the core network element is the user plane network element, step S203 is specifically implemented in the following manner. The session management network element sends the link detection information to the core network element/the terminal, the terminal sends the link status information to the core network element, and the core network element sends the link status information to the terminal. To be specific, the user plane network element independently detects the link status information, and sends the detected link status information to the terminal. Alternatively, the terminal independently detects the link status information, and sends the detected link status information to the user plane network element.

After the core network element obtains the link status information, step S202 may be implemented in the following manner. The core network element determines that the link status information does not meet the link condition information, and the core network element processes the service flow based on at least one of the flow steering policy and the flow steering mode.

Specifically, the core network element determines that link status information of a target link meets the link condition information or link status information of a current link does not meet the link condition information, and the core network element processes the service flow based on the at least one of the flow steering policy and the flow steering mode.

For a manner of determining the target link and a manner of determining the current link, refer to the descriptions in Embodiment 1. Details are not described herein again.

In an example, when the core network element is the session management network element, as shown in FIG. 12, step S202 may be specifically implemented in the following manner. S2021. Send an access technology indication corresponding to the service flow to the terminal, where the access technology indication indicates to migrate the service flow to a link corresponding to the access technology indication.

For example, the core network element may use a PDU session management response message to carry the access technology indication corresponding to the service flow, to indicate the terminal to migrate the service flow to the link corresponding to the access technology indication.

In addition, the method provided in this embodiment of this application further includes the following steps. S206. The terminal receives the access technology indication that corresponds to the service flow and that is from the core network element, where the access technology indication indicates to migrate the service flow to a link corresponding to an access technology indicated by the access technology indication. S207. The terminal processes the service flow based on the access technology indication. It may be understood that the processes performed by the terminal in steps S206 and S207 may also be performed by the user plane network element.

Specifically, the terminal migrates, based on the access technology indication, the service flow to the link corresponding to the access technology indicated by the access technology indication. For an implementation of step S207, refer to the manner in which the terminal processes the service flow in the foregoing embodiments. Details are not described herein again in this embodiment of this application.

In another example, when the core network element is the policy control network element, step S202 may be specifically implemented in the following manner. The core network element sends an updated flow steering policy corresponding to the service flow to the session management network element, where the updated flow steering policy includes at least one access technology indication, and the at least one access technology indication indicates to migrate the service flow to a link corresponding to the access technology indication.

Specifically, the policy control network element determines, based on the received link status information and at least one of the locally configured flow steering mode and link condition information, that the flow steering policy configured for the service flow cannot meet a link requirement, and sends the updated flow steering policy to the session management network element. For example, the currently configured flow steering policy is that the policy control network element transmits the service flow by using a 3GPP access technology, determines, based on the link condition information, that link status information corresponding to the 3GPP access technology does not meet the link condition information, and sends the updated flow steering policy to the session management network element, for example, a non-3GPP access technology. Then, after the session management network element receives the flow steering policy, the session management network element initiates service flow movement, or the session management network element sends the flow steering policy to the terminal, and the terminal initiates service flow movement.

In still another example, when the core network element is the user plane network element, step S202 may be specifically implemented in the following manner. The core network element transmits the service flow on links corresponding to the plurality of access technologies. Alternatively, the core network element migrates the service flow from a link corresponding to a first access technology in the plurality of access technologies to a link corresponding to a second access technology in the plurality of access technologies for transmission. Alternatively, the core network element migrates the service flow from links corresponding to the plurality of access technologies to a link corresponding to a first access technology or a second access technology in the plurality of access technologies for transmission.

Optionally, the method provided in this embodiment of this application further includes the terminal sends first indication information to the core network element, where the first indication information indicates the core network to process the service flow. The core network element receives the first indication information from the terminal.

Specifically, the first indication information may be a network-initiated indication or null. When the first indication information is null, the core network element determines that the network side initiates service flow migration.

Figure 13:
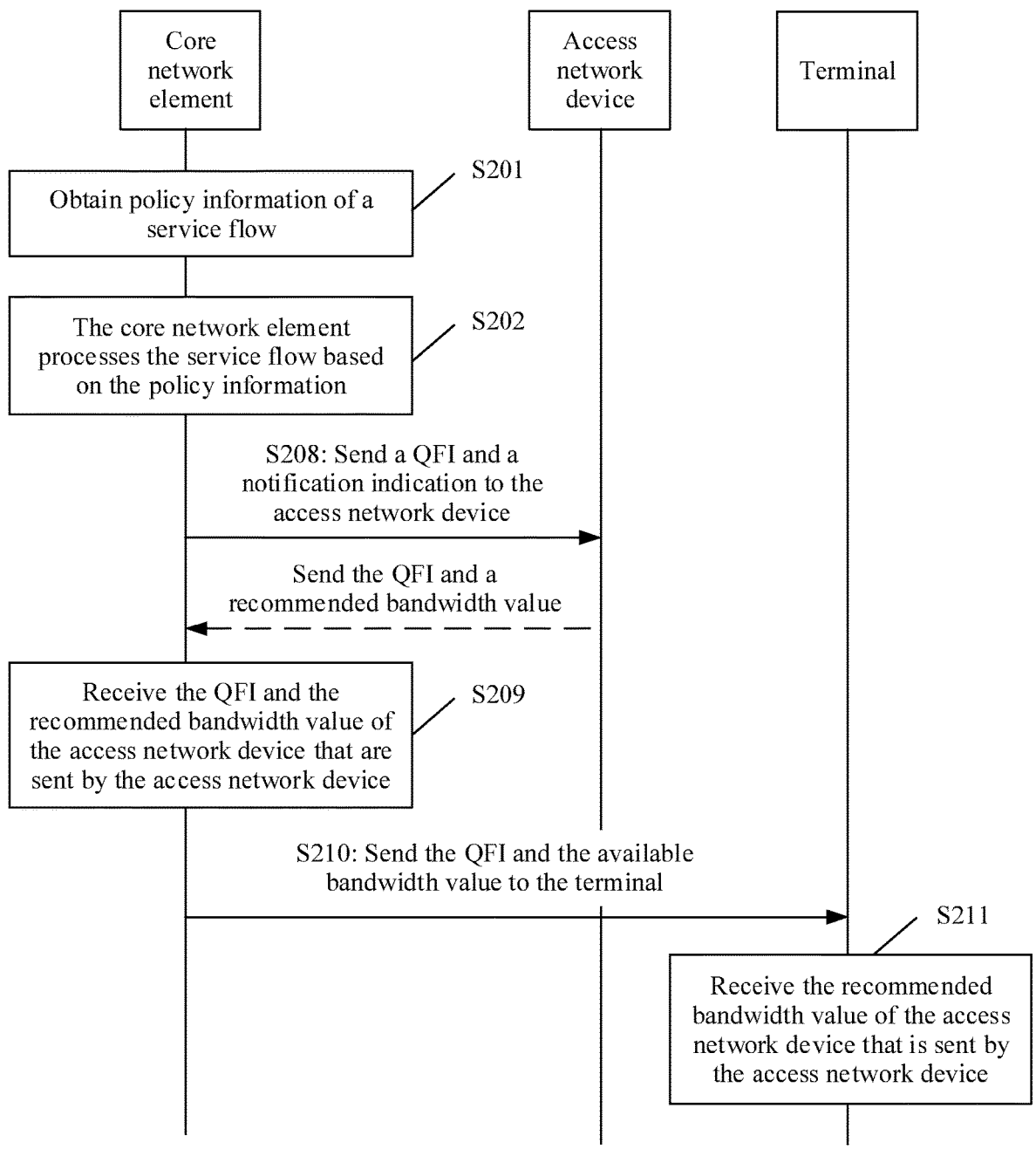

In still yet another embodiment of this application, as shown in FIG. 13, the method provided in this embodiment of this application further includes the following step. S208. The core network element sends the QFI and a notification indication to an access network device, where the QFI and the notification indication are used to indicate to send a recommended bandwidth value of the access network device to the session management network element or the user plane network element when the access network side cannot meet a bandwidth requirement of a QoS flow corresponding to the QFI.

Optionally, as shown in FIG. 13, the method provided in this embodiment of this application further includes the following steps. S209. The core network element receives the QFI and the recommended bandwidth value of the access network device that are from the access network device. S210. The core network element sends the QFI and the recommended bandwidth value of the access network device to the terminal. S211. The terminal receives the recommended bandwidth value of the access network device that is from the access network device. Alternatively, the terminal receives the recommended bandwidth value of the access network device that is from the session management network element or the user plane network element.

Embodiment 3

Figure 14:
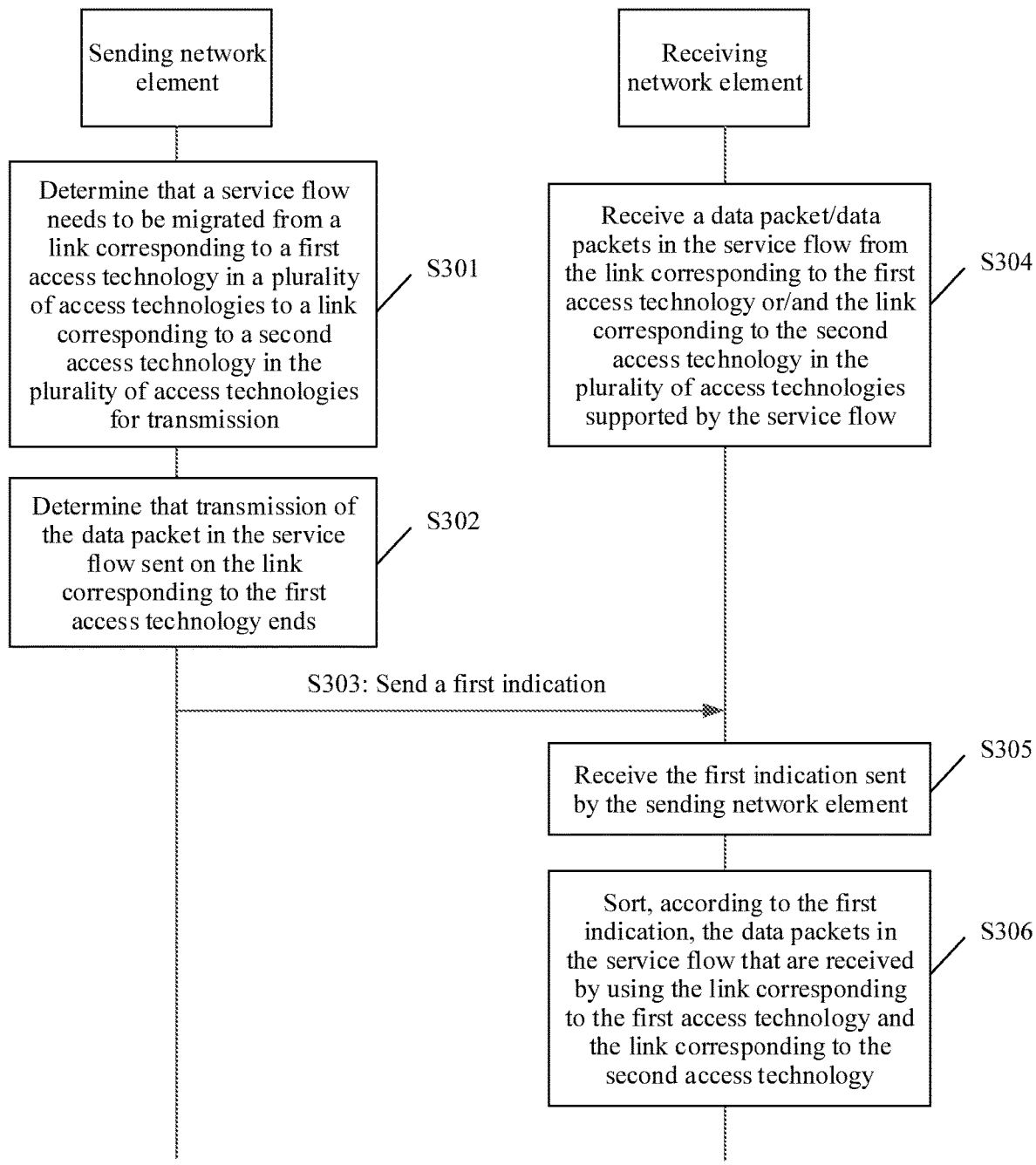
FIG. 14 is a schematic flowchart of a data packet processing method according to an embodiment of this application.

After a sending network element (for example, a terminal or a user plane network element) migrates a service flow from links corresponding to a plurality of access technologies to a link corresponding to any one of the plurality of access technologies, or migrates a service flow from a link corresponding to a first access technology in a plurality of access technologies to a link corresponding to a second access technology in the plurality of access technologies, to avoid a problem that received data packets are out of order when a receiving network element (for example, a user plane network element or a terminal) sorts the data packets in the service flow. As shown in FIG. 14, this application further provides a data packet transmission method. The method includes the following steps.

S301. A sending network element determines that a service flow needs to be migrated from a link corresponding to a first access technology in a plurality of access technologies to a link corresponding to a second access technology in the plurality of access technologies for transmission.

Specifically, for an implementation of step S301, refer to the descriptions in the foregoing embodiments or another manner. Details are not described herein again.

S302. The sending network element determines that transmission of a data packet in the service flow sent on the link corresponding to the first access technology ends.

S303. The sending network element sends a first indication (for example, an end marker indication) to a receiving network element, where the first indication indicates that transmission of the data packet in the service flow transmitted on the link corresponding to the first access technology ends.

In a possible implementation, step S303 may be implemented in the following manner. The sending network element uses a last packet in the service flow on the link corresponding to the first access technology to carry the first indication.

For example, the last packet may be a null packet or a last data packet.

In an example, for example, the last packet is the last data packet. The sending network element may use at least one of a PDCP packet header and a SDAP packet header to carry the first indication. Alternatively, for example, the last packet is the null packet. After sending the last data packet, the sending network element generates the null packet, and uses at least one of a PDCP packet header and an SDAP packet header that are of the null packet to carry the first indication.

The null packet in this embodiment of this application means that the data packet includes information used to determine the service flow, and a payload of the data packet is null. For example, the data packet includes at least one of an IP packet header, a UDP packet header, a TCP packet header, and an Ethernet packet header.

For example, the sending network element is a terminal. If the terminal determines that transmission of the data packet in the service flow on the link corresponding to the first access technology ends, the terminal uses a PDCP packet header or an SDAP packet header of the last packet to carry the first indication, and sends the first indication to an access network device (for example, a 5G RAN or a non-3GPP access network element). The access network device obtains the first indication carried in the last packet, and transfers the first indication to a UPF network element by using a GTP-U or another protocol (for example, the Ethernet protocol or the protocol Segment Routing over IP version 6 (IPv6) protocol (SRv6)) data packet header. In addition, the access network device encapsulates the last packet (the null packet or the last data packet) in the GTP-U data packet header that carries the first indication, and transfers the GTP-U data packet header to the UPF network element. The UPF network element determines, according to the first indication, that the data packet is a last data packet on a link corresponding to a 3GPP access technology, and determines the service flow based on information in the last packet. An example in which a tunneling protocol between the access network device and the UPF is the GTP-U protocol is used subsequently.

For example, the sending network element is the UPF network element. The UPF network element uses a GTP-U data packet header to carry the first indication, and sends the GTP-U data packet header to the access network device. After removing the GTP-U data packet header, the access network device uses a PDCP packet header or an SDAP packet header to carry the first indication, and sends the PDCP packet header or the SDAP packet header to the terminal. In addition, the UPF network element encapsulates the last packet (the null packet or a last service data packet) in a GTP-U data packet header including the first indication, and sends the GTP-U data packet header to the access network device. The access network device encapsulates the last packet in a PDCP packet header or an SDAP packet header that carries the first indication, and sends the PDCP packet header or the SDAP packet header to the terminal.

In another example, for example, the last packet is the null packet. The first indication may be carried in information that is in the null packet and that is used to determine the service flow.

For example, the sending network element uses an IP packet header, a UDP packet header, a TCP packet header, or an Ethernet packet header to carry the first indication. For example, an option is added to the IP packet header, and the option carries the first indication. Alternatively, in the Ethernet packet header, an Ethernet type is set to a special value used as the first indication, or a length of the Ethernet packet header is set to a special value used as an end marker indication.

In still another example, for example, the last packet is the last data packet. The sending network element may use at least one of a UDP header, a TCP header, and an Ethernet packet header to carry the first indication. For details about how to use the at least one of the UDP header, the TCP header, and the Ethernet packet header to carry the first indication, refer to the foregoing descriptions. Details are not described herein again.

For example, the sending network element is the terminal. The terminal determines that transmission of the service flow on the link corresponding to the first access technology ends, and the terminal sends the last data packet to the access network device on the link corresponding to the first access technology, where the at least one of the Ethernet packet header, the UDP packet header, and the TCP packet header that are of the last data packet carries the first indication. The access network device sends the last data packet to the UPF network element. The UPF parses the last data packet, obtains flow description information from packet header information of the last data packet, and obtains the first indication from the last data packet.

For example, the sending network element is the UPF network element. The UPF network element determines that transmission of the service flow on the link corresponding to the first access technology ends, and the UPF network element uses at least one of an Ethernet packet header, a UDP packet header, and a TCP packet header that are of the last data packet to carry the first indication. The UPF network element encapsulates the last data packet in a GTP-U data packet header, and sends the GTP-U data packet header to the access network device on the link corresponding to the first access technology. After receiving the GTP-U data packet header, the access network device removes the GTP-U data packet header, and then sends the last data packet to the terminal. The terminal parses the last data packet, obtains flow description information from packet header information of the last data packet, and obtains the first indication from the last data packet. The access network device determines, based on the flow description information, the service flow corresponding to the first indication.

Optionally, when the sending network element is the UPF network element, the sending network element uses a GTP-U data packet header of the data packet to carry the first indication.

The packet header of the data packet further includes one or more pieces of the following information used to indicate the service flow a source IP address and/or a destination IP address in an IP packet header, a source IP address and/or a destination IP address in an Ethernet packet header, source port numbers and/or destination port numbers in a UDP packet header and a TCP packet header, a virtual local area network (VLAN) label, and protocol types of the IP packet header, the Ethernet packet header, the UDP packet header, and the TCP packet header.

S304. The receiving network element receives a data packet/data packets in the service flow from the link corresponding to the first access technology or/and the link corresponding to the second access technology in the plurality of access technologies supported by the service flow.

S305. The receiving network element receives the first indication from the sending network element, where the first indication indicates that transmission of the data packet in the service flow transmitted on the link corresponding to the first access technology ends.

Optionally, the receiving network element receives the first indication carried in the last packet sent on the link corresponding to the first access technology.

S306. The receiving network element sorts, according to the first indication, the data packets in the service flow that are received by using the link corresponding to the first access technology and the link corresponding to the second access technology.

Optionally, the receiving network element determines, based on a flow description parameter in the null packet or the last data packet in the service flow, the service flow corresponding to the first indication.

For example, step S306 in this embodiment of this application may be implemented in the following manner. After receiving the first indication, the receiving network element processes the data packet that is in the service flow and that is received by using the link corresponding to the second access technology.

Specifically, for an uplink data packet, in a process in which the terminal migrates the service flow from the link corresponding to the first access technology to the link corresponding to the second access technology, if the terminal determines that transmission of the data packet in the service flow on the link corresponding to the first access technology ends, the terminal sends the first indication to the UPF network element. In this process, the UPF network element receives the data packets/the data packet in the service flow from the link corresponding to the first access technology and/or the link corresponding to the second access technology. Before receiving the first indication, the UPF network element buffers the data packet in the service flow on the link corresponding to the second access technology. After receiving the first indication, the UPF network element first sorts the data packets in the service flow on the link corresponding to the first access technology, and then processes the data packet that is in the service flow and that is received by using the link corresponding to the second access technology.

For a process in which for a downlink data packet, the terminal sorts the data packets in the service flow according to the first indication from the UPF network element, refer to a process in which for the uplink data packet, the UPF network element sorts the data packets in the service flow according to the first indication. Details are not described herein again.

Figure 15B:
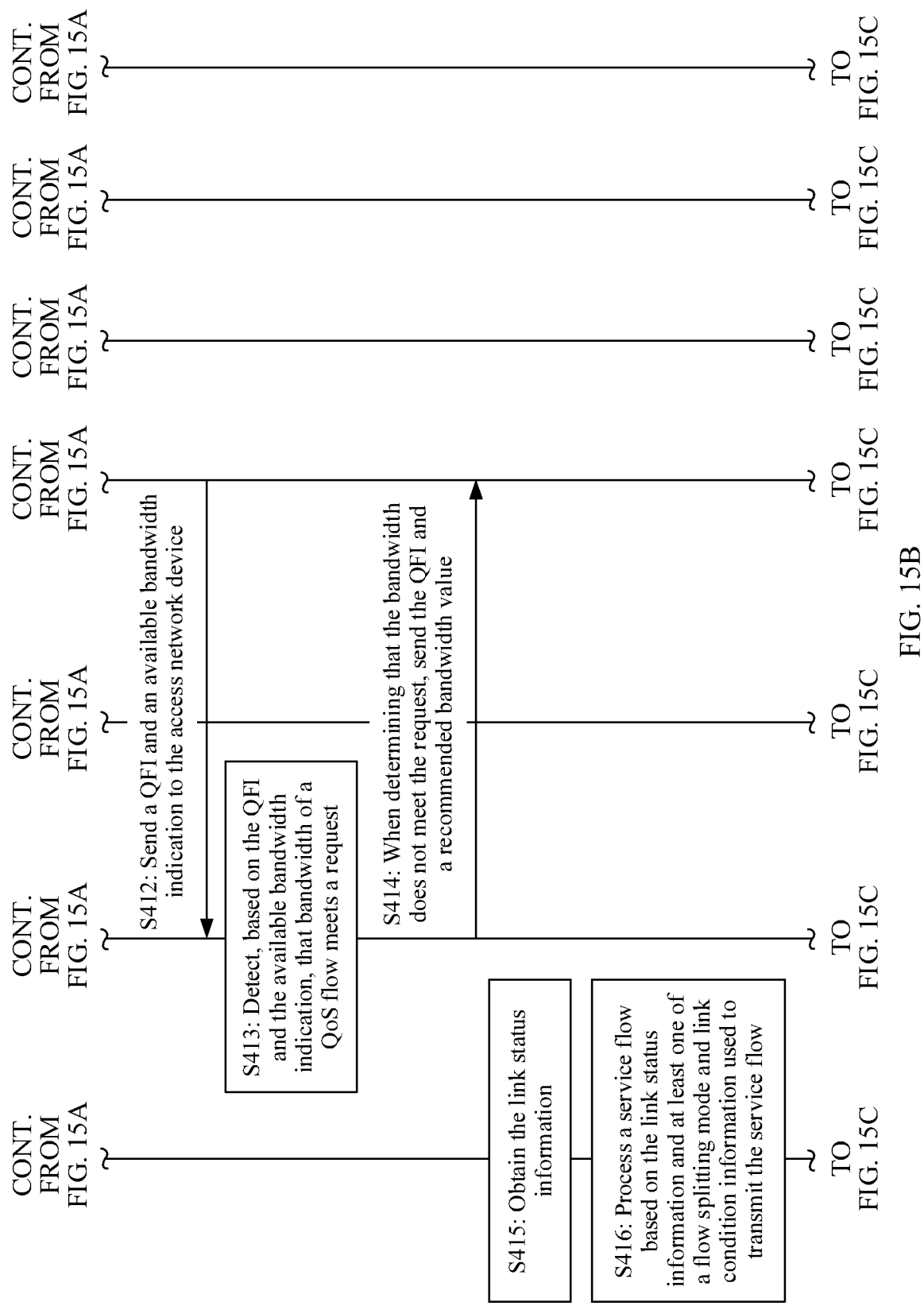

FIG. 15A, FIG. 15B, and FIG. 15C show a specific embodiment of processing service flow migration by a terminal according to an embodiment of this application. The method includes the following steps.

S401. A terminal registers with a network side.

For example, the terminal may access the network side by using a 3GPP access technology and complete a registration procedure. Alternatively, the terminal accesses the network side by using a non-3GPP access technology and completes a registration procedure. Alternatively, the terminal accesses the network side by using a non-3GPP access technology and a 3GPP access technology and completes a registration procedure.

S402. A PCF network element sends policy information to an AMF network element for a successfully registered terminal, where the policy information includes at least one of a flow description parameter, at least one flow steering mode, and link condition information used to transmit a service flow.

S403. The AMF network element sends the policy information to the terminal by using a NAS message.

It may be understood that if the terminal completes registration by using one of the non-3GPP access technology and the 3GPP access technology in step S401, the terminal completes registration by using the other one of the non-3GPP access technology and the 3GPP access technology, so that the terminal accesses the network side by using both the non-3GPP access technology and the 3GPP access technology.

S404. The terminal sends a session management request message to the AMF network element. The session management request message carries a PDU session identifier, a UE-initiated indication, and a multi-access session indication.

The UE-initiated indication indicates that migration of a service flow in a PDU session associated with the PDU session identifier is processed by the terminal. The multi-access session indication indicates that the PDU session supports a plurality of access technologies. In other words, the PDU session is a MA PDU session.

For example, the session management request message may be a PDU session establishment request message or a PDU session update request message.

Optionally, the session management request message further carries link detection information.

For specific content of the link detection information, refer to the descriptions in the foregoing embodiments. Details are not described herein again.

Optionally, the session management request message further carries sending frequency information of a subscribed link status parameter.

S405. After receiving the session management request message, the AMF network element selects an SMF network element, and sends the session management request message to the SMF network element.

Optionally, the SMF network element stores the UE-initiated indication. In this way, after receiving the policy information from the PCF network element, the terminal may determine to send the policy information to the terminal indicated by the UE-initiated indication.

S406. The SMF network element sends a policy request message to the PCF network element, where the policy request message carries the multi-access session indication.

S407. The PCF network element sends, based on the multi-access session indication, policy information related to the MA PDU session to the SMF network element. The policy information herein includes at least one of a mapping relationship between the flow description parameter and a flow steering policy, the flow description parameter, the at least one flow steering mode, and the link condition information.

For example, the PCF network element may send the policy information to the SMF network element by using a policy response message.

The flow steering policy may be carried in a policy control and charging (PCC) rule and sent to the SMF network element.

In addition, the SMF network element may further send the UE-initiated indication to the PCF network element, and then the PCF network element stores the UE-initiated indication.

If the session management request message received by the SMF network element may further include the link detection information, the SMF network element performs steps S408 to S410.

S408. The SMF network element sends the link detection information to a UPF network element associated with the PDU session.

Optionally, the SMF network element may further send at least one of a QFI, an access technology indication, a tunnel identifier, a GBR indication, a non-GBR indication, and a flow description parameter to the UPF network element. The QFI indicates that detected link information indicates a link to which a QoS flow associated with the QFI belongs. The tunnel identifier indicates that the detected link information indicates a link corresponding to a tunnel associated with the tunnel identifier. The access technology indication indicates that the detected link information indicates a link corresponding to an access technology indicated by the access technology indication. A GBR indication indicates that a link whose link status information needs to be sent is a link through which a GBR service flow is sent. The non-GBR indication indicates that the link whose link status information needs to be sent is a link through which a non-GBR service flow is sent. The flow description parameter indicates that the link whose link status information needs to be sent is a link to which a service flow determined based on the flow description parameter belong.

S409. The UPF network element sends the link status information to the SMF network element based on the link detection information.

If the link status information is detected based on the at least one of the QFI, the access technology indication, the tunnel identifier, the GBR indication, the non-GBR indication, and the flow description parameter, the UPF network element further sends the at least one of the QFI, the access technology indication, the tunnel identifier, the GBR indication, the non-GBR indication, and the flow description parameter to the SMF network element or the terminal.

S410. The SMF network element sends the link status information to the terminal.

Optionally, step S409 may alternatively be implemented in the following manner. The UPF network element sends the link status information to the SMF network element, and the SMF sends the link status information to the terminal by using a NAS message. Alternatively, the UPF network element sends the link status information to the terminal by using a user plane message (for example, a link message) between the UPF network element and the terminal.

S411. The SMF network element sends a session management response message to the terminal, where the session management response message includes the mapping relationship between the flow description parameter and the flow steering policy or an indication used to indicate to authorize the terminal to migrate the service flow.

For example, the session management response message may be a PDU session establishment accept message or a PDU session update success message.

The flow description parameter and the flow steering policy are used to indicate an association relationship between a service flow and at least one access technology. To be specific, the service flow is transmitted by using one or more access technologies.

Optionally, the SMF network element may send an N1N2 message to the AMF network element. The N1N2 message carries the session management response message.

Optionally, the N1N2 message further carries a QFI and an available bandwidth indication.

S412. The AMF network element sends the QFI and the available bandwidth indication to the access network device.

Optionally, if the N1N2 message further includes an access technology indication, the AMF network element sends the QFI and the available bandwidth indication to an access network device indicated by the access technology indication. The QFI and the available bandwidth indication are used to indicate the access network device to report recommended bandwidth of the access network device to the SMF network element or the UPF network element when the access network side cannot meet a bandwidth requirement of a QoS flow corresponding to the QFI.

For example, if the access technology indication is a 3GPP access technology indication, the AMF network element sends the QFI and the available bandwidth indication to a 5G RAN. If the access technology indication is a non-3GPP access technology indication, the AMF network element sends the QFI and the available bandwidth indication to a device in a non-3GPP access network.

It may be understood that the access network device may assign a related tunnel identifier to the PDU session, and send the tunnel identifier to the UPF network element by using the AMF network element or the SMF network element. If the SMF network element does not perform steps S408 to S410, the SMF network element may send the link detection information to the UPF network element in a process of sending the tunnel identifier to the UPF network element by using an N4 session update message.

Network elements at two endpoints of a tunnel each notify a peer end of a tunnel identifier of the peer end. In this way, the tunnel identifier of the peer end is encapsulated in subsequent data.

S413. The access network device detects, based on the QFI and the available bandwidth indication, whether bandwidth of the QoS flow meets a request.

S414. When determining that the bandwidth of the QoS flow does not meet the request, the access network device sends a recommended bandwidth value of the QoS flow to the AMF network element.

Specifically, the access network device may send the QFI and the recommended bandwidth value to the AMF by using a RAN notification message.

Then, the AMF network element sends the QFI and the recommended bandwidth value to the terminal by using a NAS message. Alternatively, the AMF network element sends the QFI and the recommended bandwidth value to the SMF network element, and the SMF network element sends the QFI and the recommended bandwidth value to the terminal by using a NAS message. Alternatively, the SMF network element sends the QFI and the recommended bandwidth value to the UPF network element, and the UPF network element sends the QFI and the recommended bandwidth value to the terminal by using a user plane message.

S445. The terminal obtains the link status information.

S416. The terminal processes the service flow based on the link status information and at least one of the flow steering mode and the link condition information for transmitting the service flow.

For example, if a service flow 1 is currently transmitted on a 3GPP side, the flow steering mode is that a 3GPP access technology is preferred. The link condition information includes a 3GPP side channel strength threshold. If the terminal determines, based on the link status information, that current 3GPP side signal strength is less than the 3GPP side channel strength threshold, the terminal initiates migration of the service flow 1.

That the terminal initiates migration of the service flow 1 is specifically as follows. The terminal sends a PDU session update request message, where the PDU session update request message carries a flow description parameter and at least one access technology indication. In the foregoing example, the PDU session update request message carries a description parameter of the service flow 1 and a non-3GPP access technology indication, to indicate that the terminal requests to move the service flow 1 to a non-3GPP side.

Optionally, after the SMF network element receives the policy information sent in step S407, the SMF network element stores the policy information, so that the SMF determines, based on the policy information, whether service flow migration initiated by the terminal is allowed. If the initiated service flow migration is not allowed, the SMF network element may reject a service flow migration request from the terminal. If the initiated service flow migration is allowed, the SMF network element may send the flow steering policy to the terminal based on the service flow migration initiated by the terminal. After receiving the flow steering policy delivered by the SMF network element based on the PDU session update request message, the terminal migrates the service flow to a link corresponding to an access technology indicated by the flow steering policy.

It may be understood that before performing the service flow migration, the terminal has a flow steering policy 1, for example, including a 3GPP access technology indication. After requesting to move the service flow, the terminal obtains an updated flow steering policy, for example, including a non-3GPP access technology indication.

In another solution provided in this embodiment of this application, when the terminal migrates the service flow from a link corresponding to a first access technology to a link corresponding to a second access technology, the method may further include the following steps.

S417. When the terminal determines that transmission of a data packet in the service flow on the link corresponding to the first access technology ends, the terminal sends a first indication to the UPF network element, where the first indication indicates that transmission of the data packet in the service flow transmitted by using the first access technology ends.

Specifically, for a sending manner and an implementation of the first indication, refer to the descriptions in the foregoing embodiments. Details are not described herein again.

S418. The UPF network element receives the first indication.

S419. The UPF network element sorts, according to the first indication, data packets in the service flow that are received on the links/the link corresponding to the first access technology and/or the second access technology.

For a specific sorting manner, refer to the descriptions in the foregoing embodiments. Details are not described herein again.

S420. The UPF network element determines that transmission of the data packet in the service flow on the link corresponding to the first access technology ends, and the UPF network element sends the first indication to the terminal.

S421. The terminal receives the first indication.

S422. The terminal sorts, according to the first indication, the data packets in the service flow that are received on the links/the link corresponding to the first access technology and/or the second access technology.

Figure 16A:
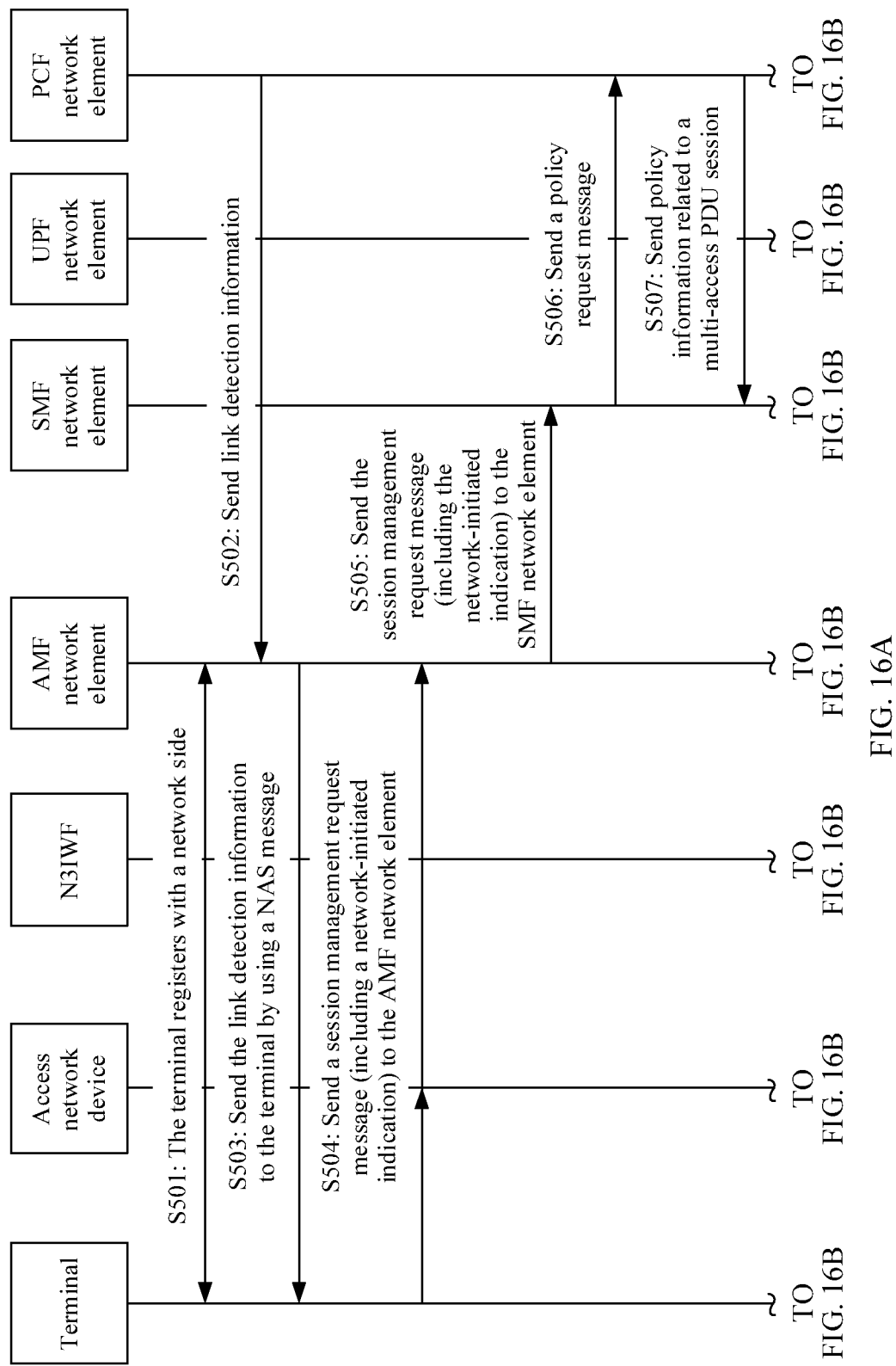
FIG. 16A and FIG. 16B are a schematic diagram of a specific embodiment of processing a service flow by a session management network element according to an embodiment of this application.
Figure 16B:
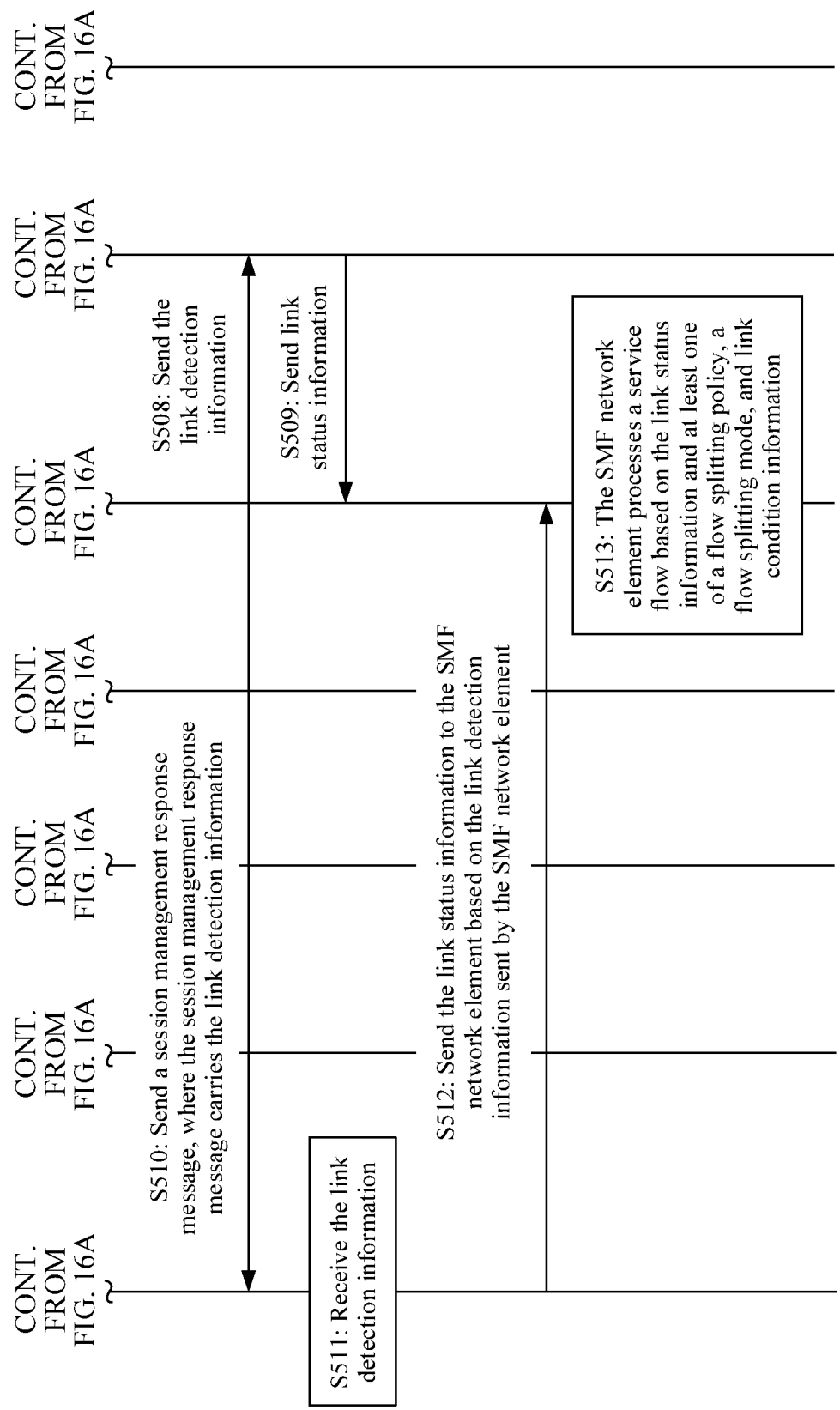

FIG. 16A and FIG. 16B are a schematic flowchart of initiating service flow migration by an SMF network element. In the solution shown in FIG. 16A and FIG. 16B, for steps S501 to S504, refer to steps S401 to S404. A difference lies in that link condition information is sent to the terminal in S502 and S503. In step S504, the UE-initiated indication is replaced with a network-initiated indication, where the UE-initiated indication indicates that a core network sends service flow migration.

It may be understood that the terminal and the network side may further negotiate in advance, and when the session management request message does not carry any indication, the network side initiates service flow migration.

For steps S505 to S507, refer to steps S405 to S407. Optionally, a difference between the flow steering mode herein and the flow steering mode in step S407 lies in that the PCF network element may send only the following to the SMF network element (1) Optimal link-based flow steering indication. The SMF network element determines an optimal link. To be specific, the SMF network element determines which parameters are used to determine the optimal link. (2) Load link balancing-based flow steering indication. The SMF network element determines, based on a current link state, a flow steering percentage of a link corresponding to each access technology.

For steps S508 and S509, refer to steps S408 and S409. A difference lies in that the link detection information in step S408 is obtained by the SMF network element from the terminal, and the link detection information herein is generated by the SMF network element based on the policy information obtained from the PCF network element.

S510. The SMF network element sends a session management response message to the terminal, where the session management response message includes the link detection information.

S511. The terminal receives the link detection information.

It should be noted that if the terminal has received, in steps S501 to S504, the link detection information from the PCF network element, the terminal replaces, with the link detection information received in step S511, the link detection information that is from the PCF network element and that is received in steps S501 to S504.

S512. The terminal sends the link status information to the SMF network element based on the link detection information from the SMF network element.

Specifically, the terminal may send the link status information to the SMF network element by using a NAS message. Alternatively, the terminal may send the link status information to the UPF network element by using a user plane message, so that the UPF network element sends the link status information to the SMF network element by using an N4 interface message.

Optionally, the method in this embodiment further includes the SMF network element receives recommended bandwidth of an access network device. For a specific process, refer to steps S411 to S414. Details are not described herein again.

S513. The SMF network element processes the service flow based on the link status information and at least one of the flow steering policy, the flow steering mode, and the link condition information.

Optionally, the method further includes a process in which the terminal and the UPF network element process a data packet in a service flow migration process. For a specific process, refer to the descriptions in steps S417 to S422. Details are not described herein again. The first indication is sent to the UE or the UPF, so that a problem that data packets are out of order in a process in which the service flow is migrated from a link corresponding to an access technology to a link corresponding to another access technology can be resolved.

Figure 17A:
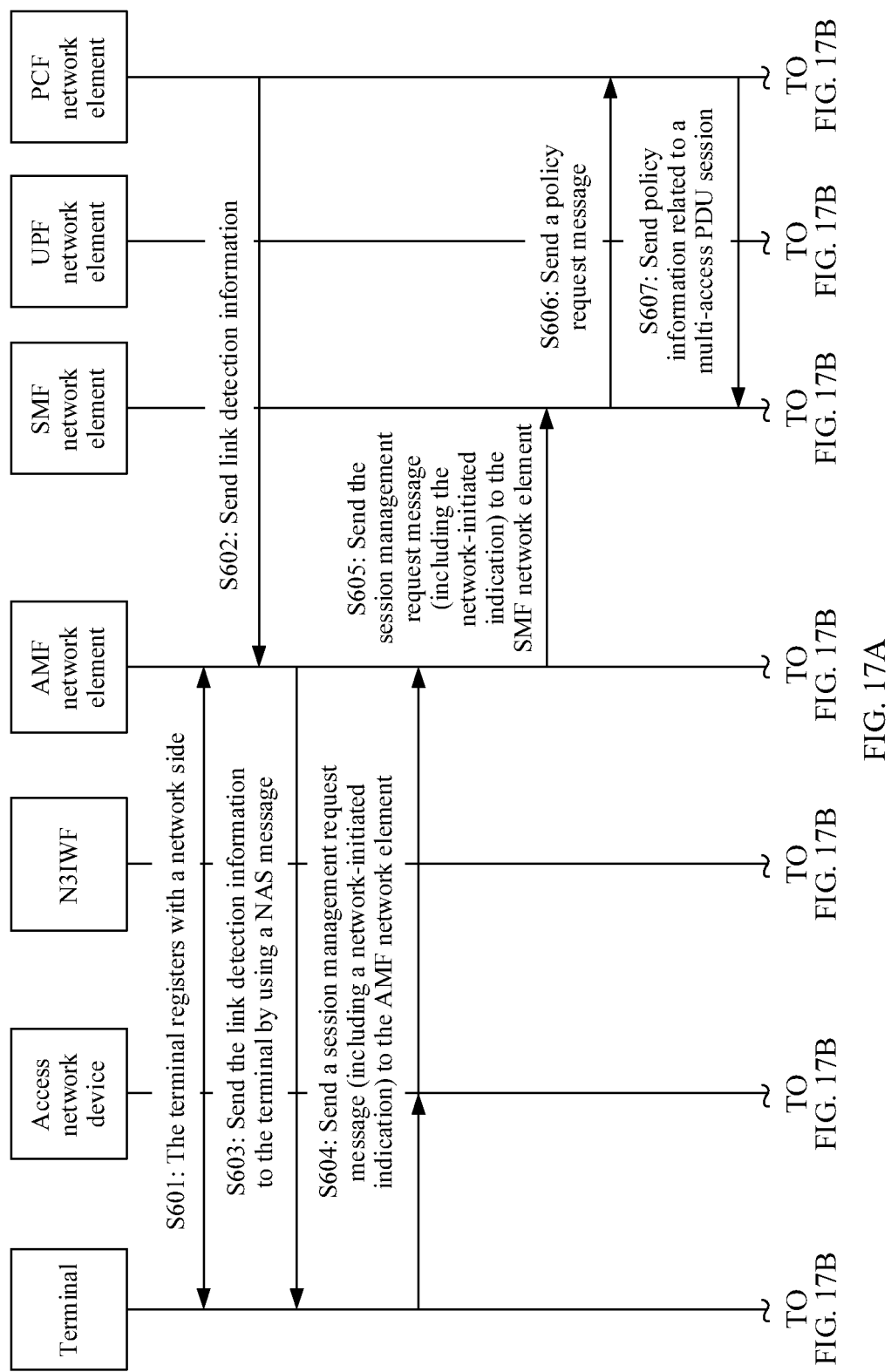
FIG. 17A and FIG. 17B are a schematic diagram of a specific embodiment of processing a service flow by a policy control network element according to an embodiment of this application.
Figure 17B:
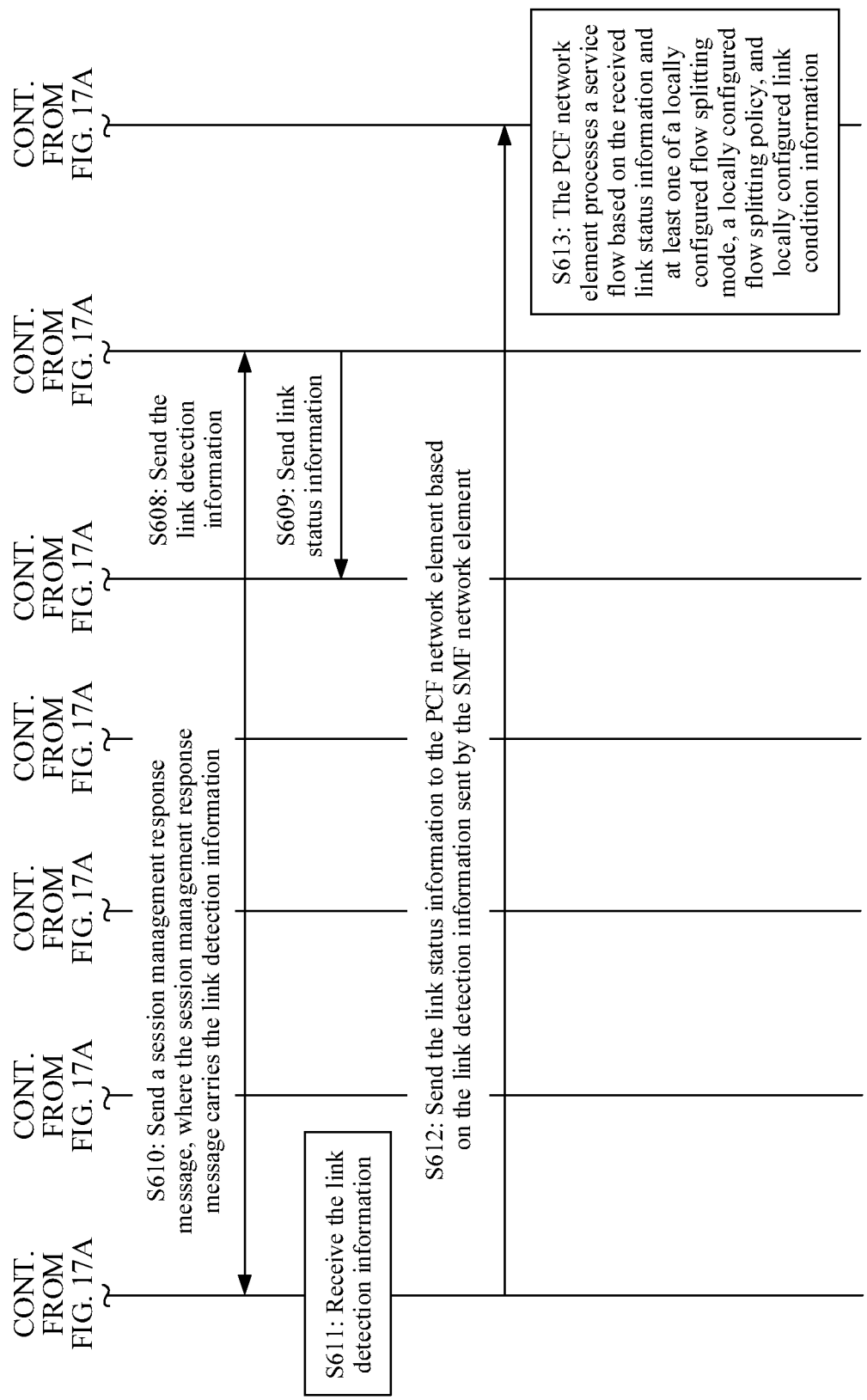

FIG. 17A and FIG. 17B are a schematic flowchart of initiating service flow migration by a PCF network element. A difference between this solution and the solutions in FIG. 15A, FIG. 15B, and FIG. 15C and FIG. 16A and FIG. 16B lies in that in FIG. 17A and FIG. 17B, steps S601 to S607 are the same as steps S501 to S507. For steps S608 to S611, refer to steps S508 to S511. Details are not described herein. A difference lies in that in FIG. 16A and FIG. 16B, the link detection information is obtained by the SMF network element from the PCF network element.

S612. The terminal sends link status information to the PCF network element based on the link detection information from the SMF network element.

Specifically, the UE sends the link status information to the SMF network element directly or by using the UPF network element, and the SMF network element sends the link status information to the PCF network element.

In addition, the link status information obtained by the UPF network element based on the link detection information is also sent to the SMF network element, and is from the SMF network element to the PCF network element.

S613. The PCF network element processes the service flow based on the received link status information and at least one of the locally configured flow steering mode, the locally configured flow steering policy, and the locally configured link condition information.

Specifically, the PCF network element determines that link status information of a target link meets the link condition information or link status information of a current link does not meet the link condition information, and the PCF network element processes the service flow based on at least one of the flow steering policy and the flow steering mode.

Specifically, that the PCF network element processes the service flow based on at least one of the flow steering policy and the flow steering mode may be as follows. The PCF network element updates the at least one of the flow steering policy and the flow steering mode.

The target link is a link (for example, a link corresponding to a 3GPP access technology) corresponding to an access technology used after service flow migration, and the current link is a link (a link corresponding to a non-3GPP access technology) corresponding to an access technology used before service flow migration.

For example, if the PCF network element determines that the link corresponding to the 3GPP access technology meets the link condition information, the PCF network element sends an updated flow steering policy to the SMF network element. The updated flow steering policy includes a 3GPP access technology indication.

Specifically, the PCF network element sends the updated flow steering policy to the SMF network element, so that the SMF network element can initiate service flow migration or the terminal can initiate service flow migration. To resolve the foregoing out-of-order problem in the migration process, steps S417 to S422 may be further performed. Details are not described herein again. Optionally, the method in this embodiment further includes the SMF network element receives recommended bandwidth of an access network device. For a specific process, refer to steps S411 to S414. Details are not described herein again.

Figure 18A:
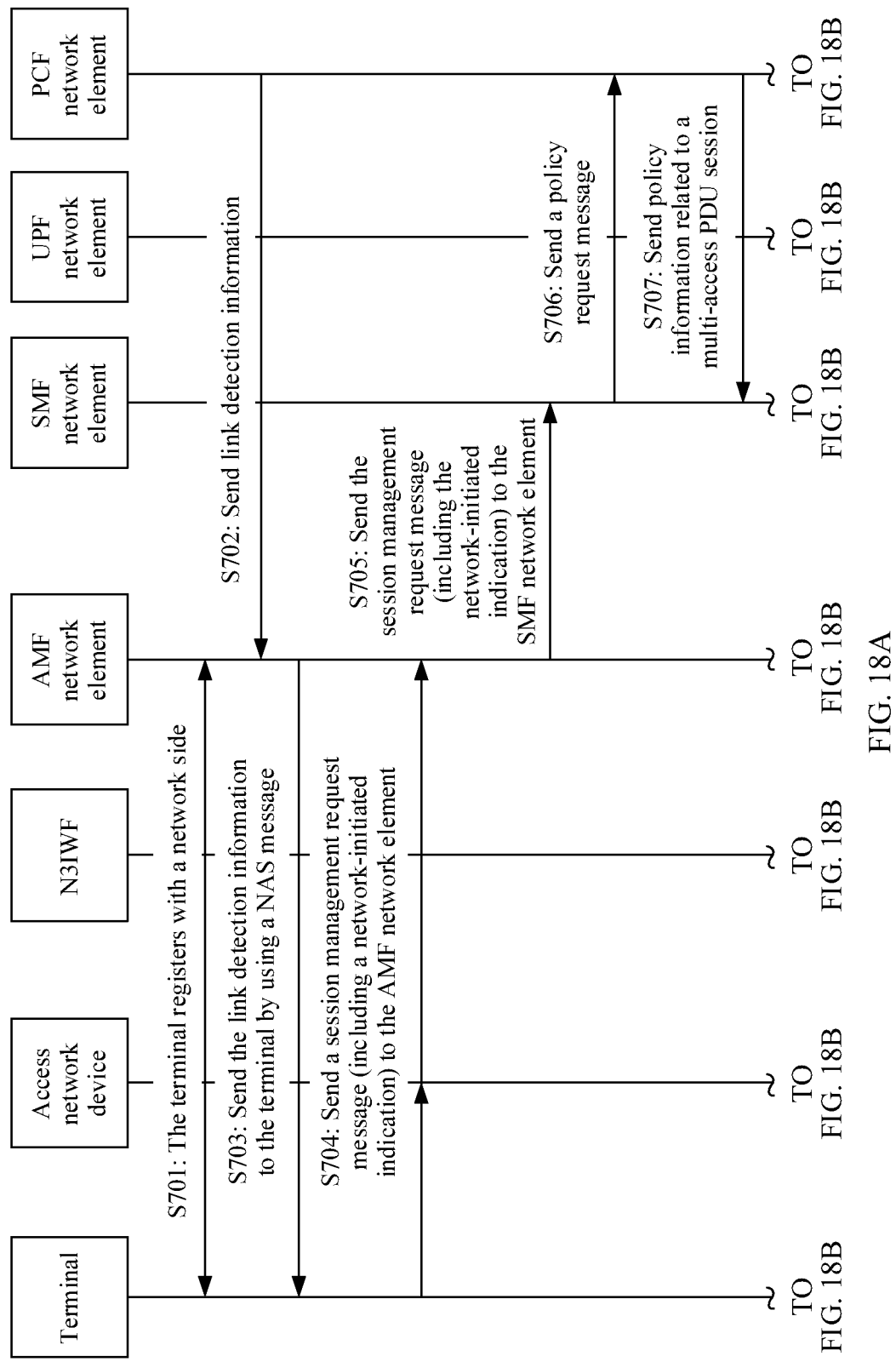
FIG. 18A and FIG. 18B are a schematic diagram of a specific embodiment of processing a service flow by a user plane network element according to an embodiment of this application.
Figure 18B:
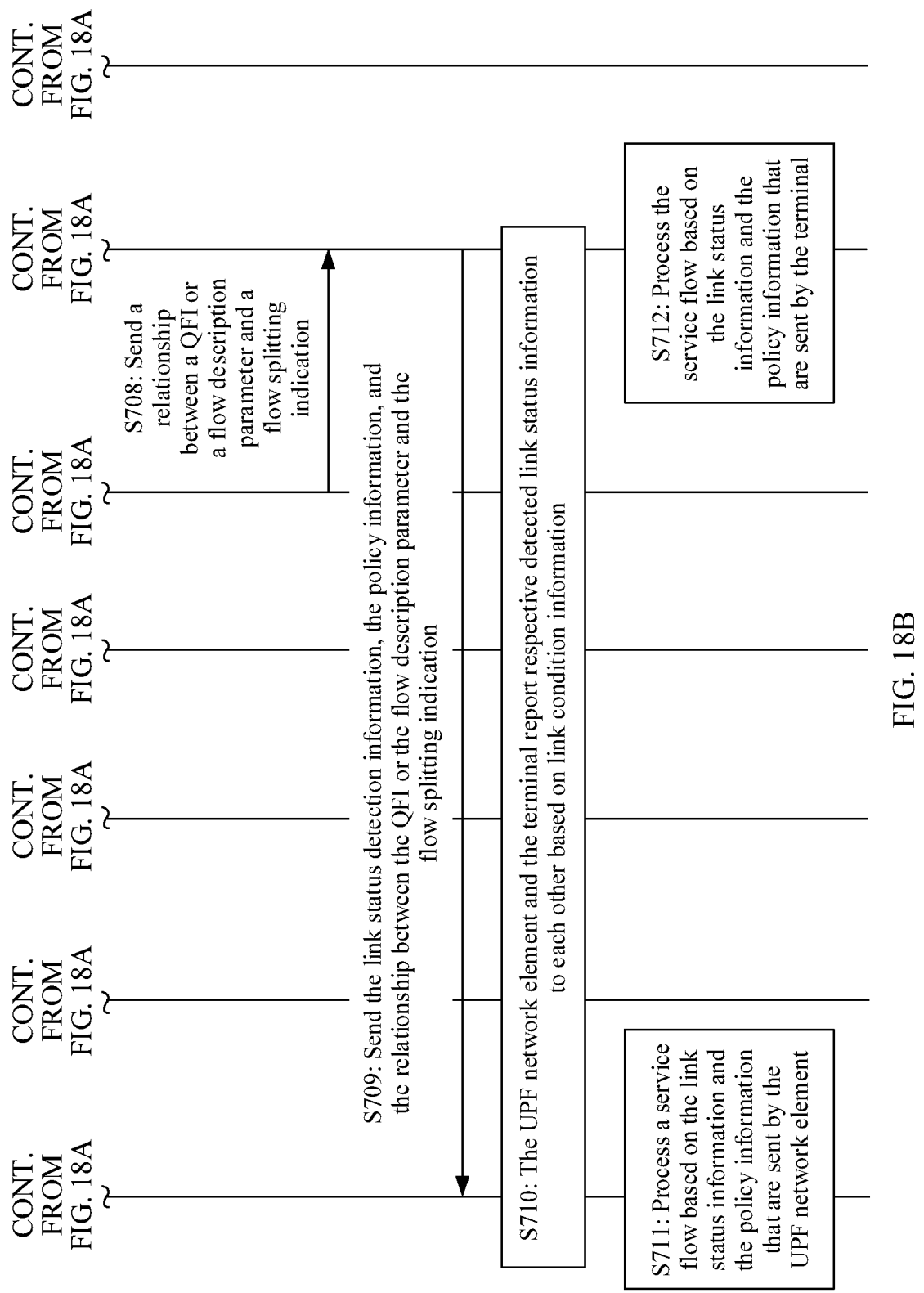

FIG. 18A and FIG. 18B are a schematic flowchart of directly sending service flow movement by a terminal and a UPF network element for a non-GBR service flow.

For steps S701 to S707, refer to the descriptions in steps S401 to S407 or steps S501 to S507. Details are not described herein again.

S708. The SMF network element sends the link status detection information, the policy information, and a relationship between a QFI or a flow description parameter and a flow steering indication to the UPF network element.

The flow steering indication indicates that a service flow corresponding to the QFI or a service flow corresponding to the flow description parameter may be migrated by the UPF network element. Optionally, in another implementation, the flow steering indication is an access technology and flow steering percentage indication. To be specific, the SMF network element sends the QFI and the access technology and flow steering percentage indication to the UPF network element.

When a flow steering percentage is a specific value, it indicates that the UPF network element moves the service flow based on the flow steering percentage. When a flow steering percentage is null, it indicates that the UPF network element may move the service flow based on any percentage.

S709. The UPF network element sends the link status detection information, the policy information, and the relationship between the QFI or the flow description parameter and the flow steering indication to the terminal.

S710. The UPF network element and the terminal report respective detected link status information to each other based on link condition information.

S711. The terminal processes the service flow based on the link status information and the policy information that are from the UPF network element.

Specifically, if the terminal determines that link status information of a link corresponding to a current access technology does not meet the link condition information, the terminal migrates the service flow to the link corresponding to a target access technology. Alternatively, if the terminal determines that link status information of a link corresponding to a target access technology meets the link condition information, the terminal migrates the service flow to the link corresponding to the target access technology.

S712. The UPF network element processes the service flow based on the link status information and the policy information that are from the terminal.

Specifically, if the UPF network element determines that link status information of a link corresponding to a current access technology does not meet the link condition information, the UPF network element migrates the service flow to the link corresponding to a target access technology. Alternatively, if the UPF network element determines that link status information of a link corresponding to a target access technology meets the link condition information, the UPF network element migrates the service flow to the link corresponding to the target access technology.

It may be understood that in step S712, the terminal determines a link through which a service flow is sent to the UPF network element, and the UPF network element determines a link through which a service flow is sent to the terminal.

The foregoing mainly describes the solutions in the embodiments of this application from a perspective of interaction between the network elements. It may be understood that to implement the foregoing functions, the network elements such as the service flow processing apparatus and the communications apparatus include corresponding hardware structures and/or software modules for performing the functions. A person skilled in the art should be easily aware that units, algorithms, and steps in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the service flow processing apparatus and the communications apparatus may be divided into function units based on the foregoing method examples. For example, the function units may be obtained through division based on corresponding functions, or two or more functions may be integrated into one processing unit. The integrated unit may be implemented in a form of hardware, or may be implemented in a form of a software function unit. It should be noted that in the embodiments of this application, division into the units is an example and is merely logical function division, and may be other division in an actual implementation.

An example in which each function module is obtained through division based on each corresponding function is used below for description.

Figure 19:
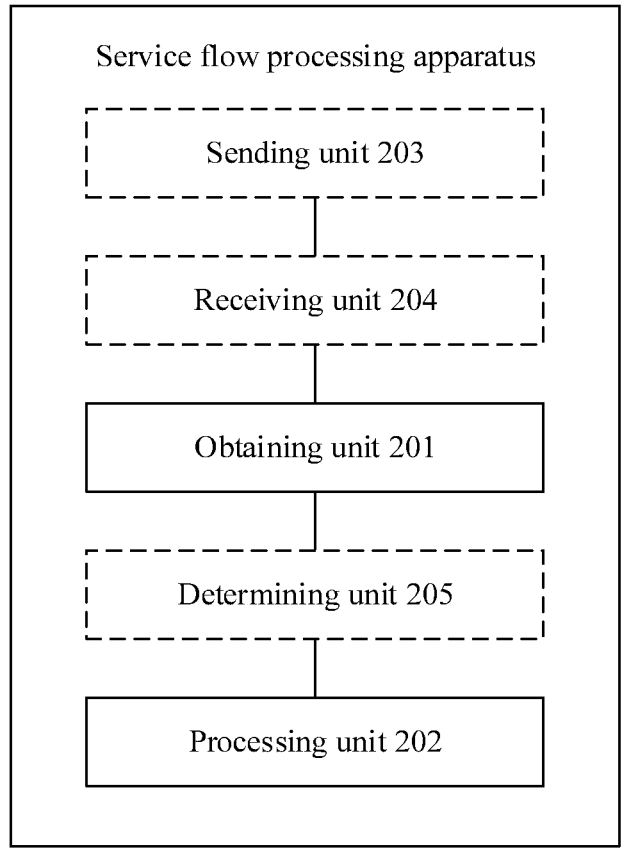
FIG. 19 is a schematic structural diagram 1 of a service flow processing apparatus according to an embodiment of this application.

When an integrated unit is used, FIG. 19 is a possible schematic structural diagram of a service flow processing apparatus in the foregoing embodiments. The service flow processing apparatus may be a terminal or a chip applied to a terminal. The service flow processing apparatus includes an obtaining unit 201 and a processing unit 202.

The obtaining unit 201 is configured to support the service flow processing apparatus in performing step S103 in the foregoing embodiment. The processing unit 202 is configured to support the service flow processing apparatus in performing steps S104, S1042, and S112 in the foregoing embodiments.

In a possible implementation, the service flow processing apparatus includes a sending unit 203, a receiving unit 204, and a determining unit 205.

The sending unit 203 is configured to support the service flow processing apparatus in performing steps S105, S110, and S114 in the foregoing embodiments.

The receiving unit 204 is configured to support the service flow processing apparatus in performing steps S109 and S119 in the foregoing embodiments.

The determining unit 205 is configured to support the service flow processing apparatus in performing steps S1041 and S113 in the foregoing embodiments.

All related content of the steps in the foregoing method embodiments may be cited in function descriptions of the corresponding function modules. Details are not described herein again.

Figure 20:
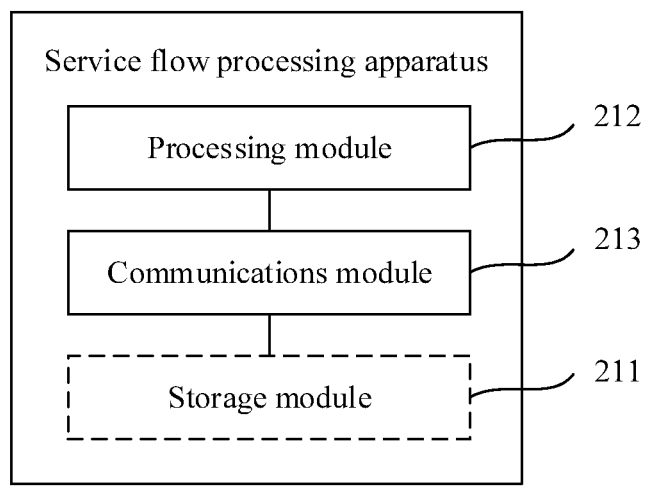
FIG. 20 is a schematic structural diagram 2 of a service flow processing apparatus according to an embodiment of this application.

When an integrated unit is used, FIG. 20 is a possible schematic logical structural diagram of a service flow processing apparatus in the foregoing embodiments. The service flow processing apparatus may be the terminal in the foregoing embodiments or a chip applied to the terminal. The service flow processing apparatus includes a processing module 212 and a communications module 213. The processing module 212 is configured to control and manage an action of the service flow processing apparatus. For example, the processing module 212 is configured to perform the step of processing a message or data on a side of the service flow processing apparatus. The communications module 213 is configured to perform the step of processing a message or data on a side of the service flow processing apparatus.

For example, the processing module 212 is configured to support the service flow processing apparatus in performing steps S104, S1042, and S112 in the foregoing embodiments. The communications module 213 is configured to support the service flow processing apparatus in performing steps S103, S105, S109, S110, S114, and S119 in the foregoing embodiments, and/or is configured to perform another process performed by the service flow processing apparatus in the technology described in this specification.

Optionally, the service flow processing apparatus may further include a storage module 211, configured to store program code and data that are of the service flow processing apparatus.

The processing module 212 may be a processor or controller, for example, may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing unit 212 may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 213 may be a communications interface, a transceiver, a transceiver circuit, an interface circuit, or the like. The storage module 211 may be a memory.

Figure 21:
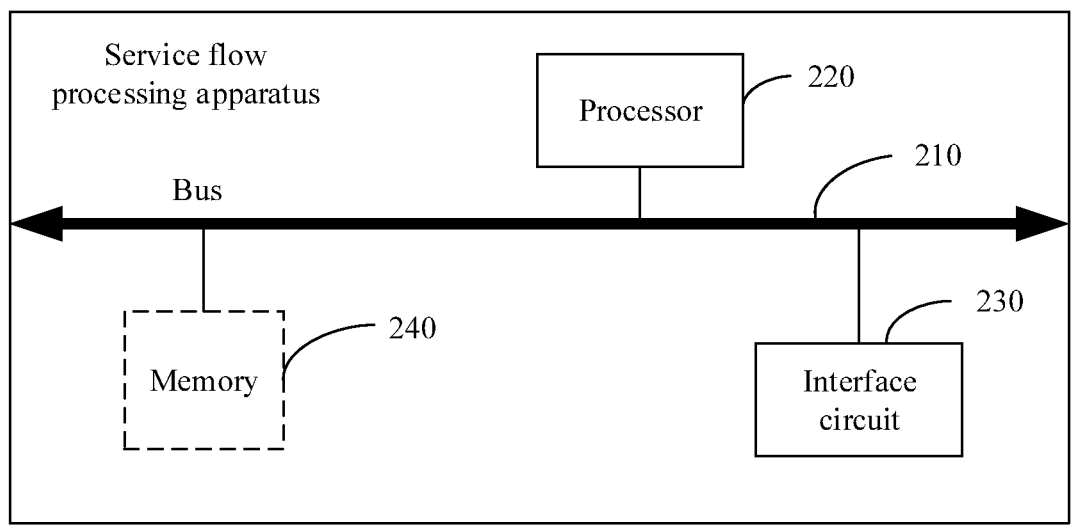
FIG. 21 is a schematic structural diagram 3 of a service flow processing apparatus according to an embodiment of this application.

When the processing module 212 is a processor 220, the communications module 213 is an interface circuit 230 or a transceiver, and the storage module 211 is a memory 240, the service flow processing apparatus in this application may be a device shown in FIG. 21.

The interface circuit 230, one or more (including two) processors 220, and the memory 240 are connected to each other by using a bus 210. The bus 210 may be a peripheral component interconnect (PCI) bus, an extended industry standard architecture (EISA) bus, or the like. The bus 210 may be classified into an address bus, a data bus, a control bus, and the like. For ease of representation, only one thick line is used to represent the bus 210 in FIG. 21, but this does not mean that there is only one bus or only one type of bus. The memory 240 is configured to store program code and data that are of the service flow processing apparatus. The interface circuit 230 is configured to support the service flow processing apparatus in communicating with another device (for example, a communications apparatus). The processor is configured to support the service flow processing apparatus in executing the program code and the data that are stored in the memory 240, to control and manage an action of the service flow processing apparatus.

For example, the interface circuit 230 supports the service flow processing apparatus in performing steps S103, S105, S109, S110, S114, and S119. The processor 220 is configured to support the service flow processing apparatus in executing the program code and the data that are stored in the memory 240, to implement steps S104, S1042, and S112 provided in this application.

Figure 22:
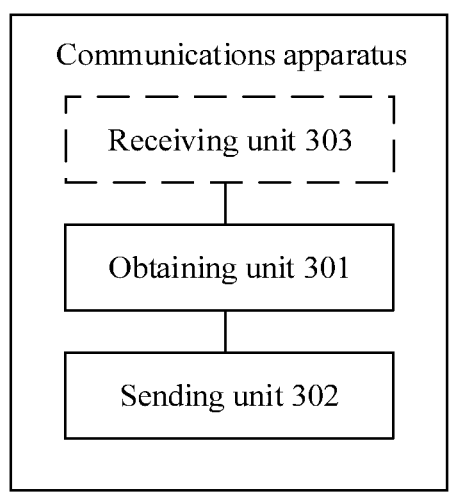
FIG. 22 is a schematic structural diagram 1 of a communications apparatus according to an embodiment of this application.

When an integrated unit is used, FIG. 22 is a possible schematic structural diagram of a communications apparatus in the foregoing embodiments. The communications apparatus may be a session management network element or a chip applied to a session management network element. The communications apparatus includes an obtaining unit 301 and a sending unit 302.

The obtaining unit 301 is configured to support the communications apparatus in performing steps S101, S106, and S107 in the foregoing embodiment. The sending unit 302 is configured to support the communications apparatus in performing steps S102, S108, S116, and S118 in the foregoing embodiments.

In a possible implementation, the communications apparatus further includes a receiving unit 303, configured to support the communications apparatus in performing steps S111 and S117 in the foregoing embodiment.

Figure 23:
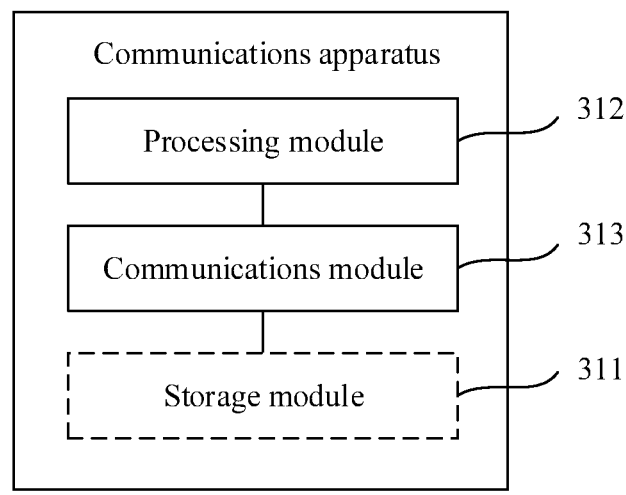
FIG. 23 is a schematic structural diagram 2 of a communications apparatus according to an embodiment of this application.

When an integrated unit is used, FIG. 23 is a possible schematic logical structural diagram of a communications apparatus in the foregoing embodiments. The communications apparatus may be the session management network element in the foregoing embodiments or a chip applied to the session management network element. The communications apparatus includes a processing module 312 and a communications module 313. The processing module 312 is configured to control and manage an action of the communications apparatus. The communications module 313 is configured to perform the step of processing a message or data on a side of the communications apparatus.

For example, the communications module 313 is configured to support the communications apparatus in performing steps S101, S102, S106, S107, S108, S111, S116, S117, and S118 in the foregoing embodiments, and/or is configured to perform another process performed by the communications apparatus in the technology described in this specification.

Optionally, the communications apparatus may further include a storage module 311, configured to store program code and data that are of the communications apparatus.

The processing module 312 may be a processor or controller, for example, may be a CPU, a general-purpose processor, a DSP, an ASIC, a FPGA or another programmable logic device, a transistor logic device, a hardware component, or any combination thereof. The processing unit 312 may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 313 may be a communications interface, a transceiver, a transceiver circuit, an interface circuit, or the like. The storage module 311 may be a memory.

Figure 24:
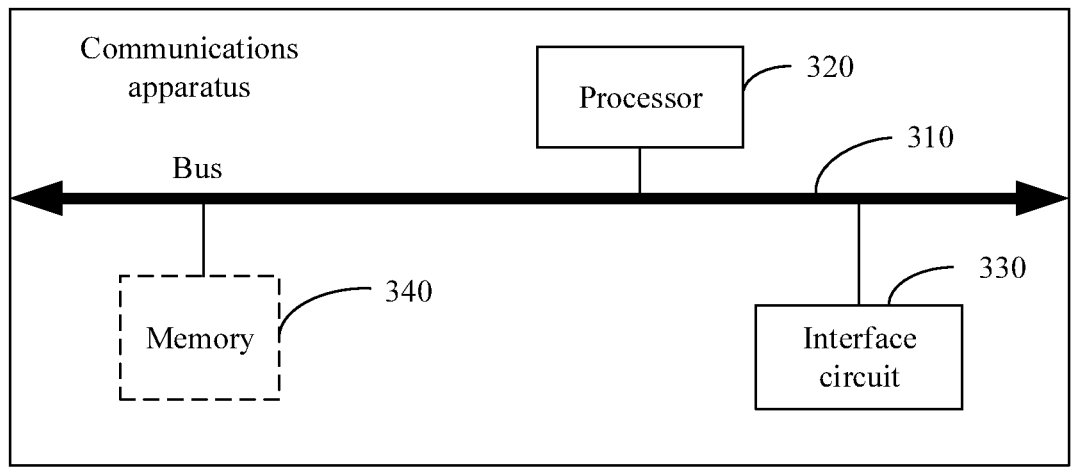
FIG. 24 is a schematic structural diagram 3 of a communications apparatus according to an embodiment of this application.

When the processing module 312 is a processor 320, the communications module 313 is an interface circuit 330 or a transceiver, and the storage module 311 is a memory 340, the communications apparatus in this application may be a device shown in FIG. 24.

The interface circuit 330, one or more (including two) processors 320, and the memory 340 are connected to each other by using a bus 310. The bus 310 may be a PCI bus, an EISA bus, or the like. The bus 310 may be classified into an address bus, a data bus, a control bus, and the like. For ease of representation, only one thick line is used to represent the bus 310 in FIG. 24, but this does not mean that there is only one bus or only one type of bus. The memory 340 is configured to store program code and data that are of the communications apparatus. The interface circuit 330 is configured to support the communications apparatus in communicating with another device (for example, a terminal). The processor 320 is configured to support the communications apparatus in executing the program code and the data that are stored in the memory 340, to implement the action of performing message/data control on a side of the communications apparatus.

In a possible implementation, the interface circuit 330 is configured to support the communications apparatus in performing steps S101, S102, S106, S107, S108, S111, S116, S117, and S118 in the foregoing embodiments, and/or is configured to perform another process performed by the communications apparatus in the technology described in this specification.

Figure 25:
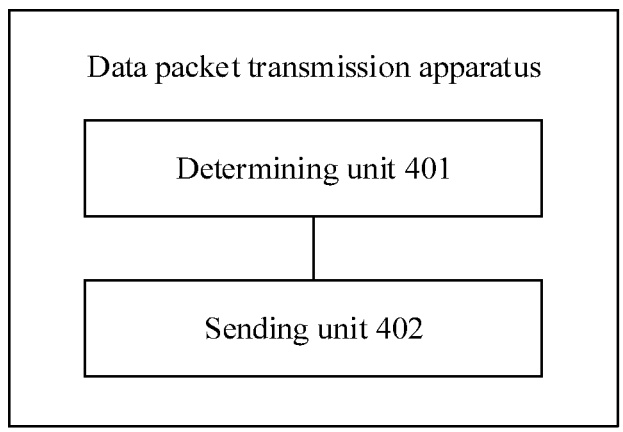
FIG. 25 is a schematic structural diagram 1 of a data packet transmission apparatus according to an embodiment of this application.

When an integrated unit is used, FIG. 25 is a possible schematic structural diagram of a data packet transmission apparatus in the foregoing embodiments. The data packet transmission apparatus may be a sending network element or a chip applied to a sending network element. The data packet transmission apparatus includes a determining unit 401 and a sending unit 402.

The determining unit 401 is configured to support the data packet transmission apparatus in performing steps S301 and S302 in the foregoing embodiment. The sending unit 302 is configured to support the data packet transmission apparatus in performing step S303 in the foregoing embodiment.

Figure 26:
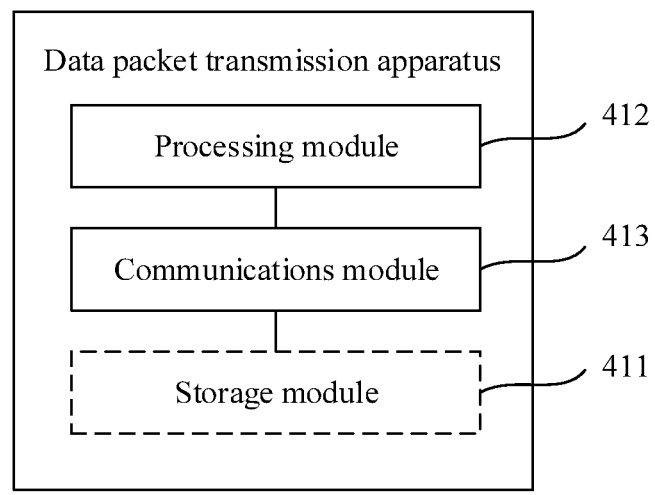
FIG. 26 is a schematic structural diagram 2 of a data packet transmission apparatus according to an embodiment of this application.

When an integrated unit is used, FIG. 26 is a possible schematic logical structural diagram of a data packet transmission apparatus in the foregoing embodiments. The data packet transmission apparatus may be the sending network element in the foregoing embodiments or a chip applied to the sending network element. The data packet transmission apparatus includes a processing module 412 and a communications module 413. The processing module 412 is configured to control and manage an action of the data packet transmission apparatus. The communications module 413 is configured to perform the step of processing a message or data on a side of the data packet transmission apparatus.

For example, the communications module 413 is configured to support the data packet transmission apparatus in performing steps S301, S302, and S303 in the foregoing embodiment, and/or is configured to perform another process performed by the data packet transmission apparatus in the technology described in this specification.

Optionally, the data packet transmission apparatus may further include a storage module 411, configured to store program code and data that are of the data packet transmission apparatus.

The processing module 412 may be a processor or a controller, for example, may be a CPU, a general purpose processor, a DSP, an ASIC, an FPGA or another programmable logic device, a transistor logic device, a hardware component, or any combination thereof. The processing unit 412 may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 413 may be a communications interface, a transceiver, a transceiver circuit, an interface circuit, or the like. The storage module 411 may be a memory.

Figure 27:
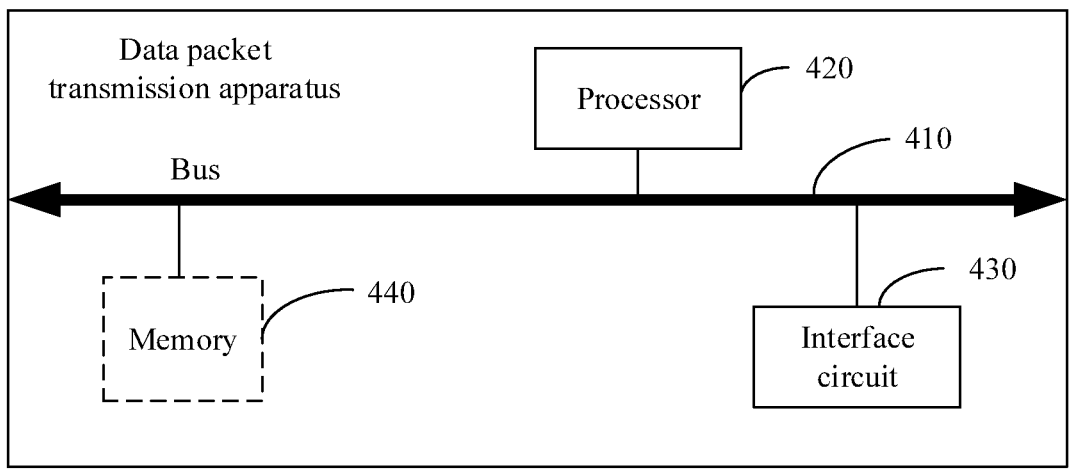
FIG. 27 is a schematic structural diagram 3 of a data packet transmission apparatus according to an embodiment of this application.

When the processing module 412 is a processor 420, the communications module 413 is an interface circuit 430 or a transceiver, and the storage module 411 is a memory 440, the data packet transmission apparatus in this application may be a device shown in FIG. 27.

The interface circuit 430, one or more (including two) processors 420, and the memory 440 are connected to each other by using a bus 410. The bus 410 may be a PCI bus, an EISA bus, or the like. The bus 410 may be classified into an address bus, a data bus, a control bus, and the like. For ease of representation, only one thick line is used to represent the bus 410 in FIG. 27, but this does not mean that there is only one bus or only one type of bus. The memory 440 is configured to store program code and data that are of the data packet transmission apparatus. The interface circuit 430 is configured to support the data packet transmission apparatus in communicating with another device (for example, a terminal/a user plane network element). The processor 420 is configured to support the data packet transmission apparatus in executing the program code and the data that are stored in the memory 440, to implement the action of performing message/data control on a side of the data packet transmission apparatus.

In a possible implementation, the interface circuit 330 is configured to support the data packet transmission apparatus in performing steps S301, S302, and S303 in the foregoing embodiment, and/or is configured to perform another process performed by the data packet transmission apparatus in the technology described in this specification.

When an integrated unit is used, FIG. 25 is a possible schematic structural diagram of a data packet transmission apparatus in the foregoing embodiments. The data packet transmission apparatus may be a sending network element or a chip applied to a sending network element. The data packet transmission apparatus includes a determining unit 401 and a sending unit 402.

The determining unit 401 is configured to support the data packet transmission apparatus in performing steps S301 and S302 in the foregoing embodiment. The sending unit 302 is configured to support the data packet transmission apparatus in performing step S303 in the foregoing embodiment.

When an integrated unit is used, FIG. 26 is a possible schematic logical structural diagram of a data packet transmission apparatus in the foregoing embodiments. The data packet transmission apparatus may be the sending network element in the foregoing embodiments or a chip applied to the sending network element. The data packet transmission apparatus includes a processing module 412 and a communications module 413. The processing module 412 is configured to control and manage an action of the data packet transmission apparatus. The communications module 413 is configured to perform the step of processing a message or data on a side of the data packet transmission apparatus.

For example, the communications module 413 is configured to support the data packet transmission apparatus in performing steps S301, S302, and S303 in the foregoing embodiment, and/or is configured to perform another process performed by the data packet transmission apparatus in the technology described in this specification.

Optionally, the data packet transmission apparatus may further include a storage module 411, configured to store program code and data that are of the data packet transmission apparatus.

The processing module 412 may be a processor or a controller, for example, may be a CPU, a general purpose processor, a DSP, an ASIC, an FPGA or another programmable logic device, a transistor logic device, a hardware component, or any combination thereof. The processing unit 412 may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 413 may be a communications interface, a transceiver, a transceiver circuit, an interface circuit, or the like. The storage module 411 may be a memory.

When the processing module 412 is a processor 420, the communications module 413 is an interface circuit 430 or a transceiver, and the storage module 411 is a memory 440, the data packet transmission apparatus in this application may be a device shown in FIG. 27.

The interface circuit 430, one or more (including two) processors 420, and the memory 440 are connected to each other by using a bus 410. The bus 410 may be a PCI bus, an EISA bus, or the like. The bus 410 may be classified into an address bus, a data bus, a control bus, and the like. For ease of representation, only one thick line is used to represent the bus 410 in FIG. 27, but this does not mean that there is only one bus or only one type of bus. The memory 440 is configured to store program code and data that are of the data packet transmission apparatus. The interface circuit 430 is configured to support the data packet transmission apparatus in communicating with another device (for example, a terminal/a user plane network element). The processor 420 is configured to support the data packet transmission apparatus in executing the program code and the data that are stored in the memory 440, to implement the action of performing message/data control on a side of the data packet transmission apparatus.

In a possible implementation, the interface circuit 330 is configured to support the data packet transmission apparatus in performing steps S301, S302, and S303 in the foregoing embodiment, and/or is configured to perform another process performed by the data packet transmission apparatus in the technology described in this specification.

Figure 28:
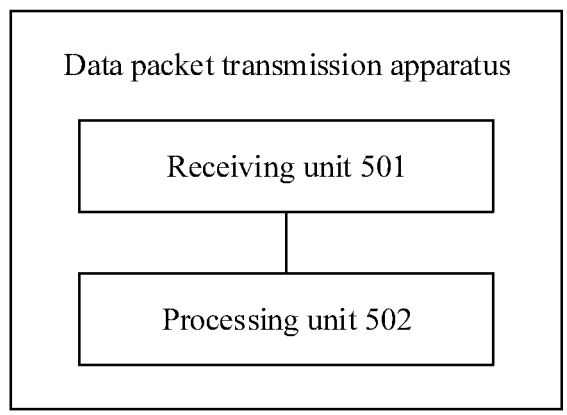
FIG. 28 is a schematic structural diagram 3 of a data packet transmission apparatus according to an embodiment of this application.

When an integrated unit is used, FIG. 28 is a possible schematic structural diagram of another data packet transmission apparatus in the foregoing embodiments. The data packet transmission apparatus may be a receiving network element or a chip applied to a receiving network element. The data packet transmission apparatus includes a receiving unit 501 and a processing unit 502.

The receiving unit 501 is configured to support the data packet transmission apparatus in performing steps S304 and S305 in the foregoing embodiment. The processing unit 502 is configured to support the data packet transmission apparatus in performing step S306 in the foregoing embodiment.

When an integrated unit is used, the data packet transmission apparatus may use the schematic logical structural diagram shown in FIG. 26. The data packet transmission apparatus may be the receiving network element in the foregoing embodiments or a chip applied to the receiving network element. In this case, the communications module 413 is configured to support the data packet transmission apparatus in performing steps S304 and S305 in the foregoing embodiment. The processing module 412 is configured to support the data packet transmission apparatus in performing step S306 in the foregoing embodiment.

In a possible implementation, the data packet transmission apparatus shown in FIG. 28 may alternatively be the device shown in FIG. 27. For connections and functions between the network elements in FIG. 27, refer to the descriptions in the foregoing embodiments. Details are not described herein again. In this case, the interface circuit 330 is configured to support the data packet transmission apparatus in performing steps S304 and S305 in the foregoing embodiment. The processor is configured to support the data packet transmission apparatus in performing step S306, and/or is configured to perform another process performed by the data packet transmission apparatus in the technology described in this specification.

Figure 29:
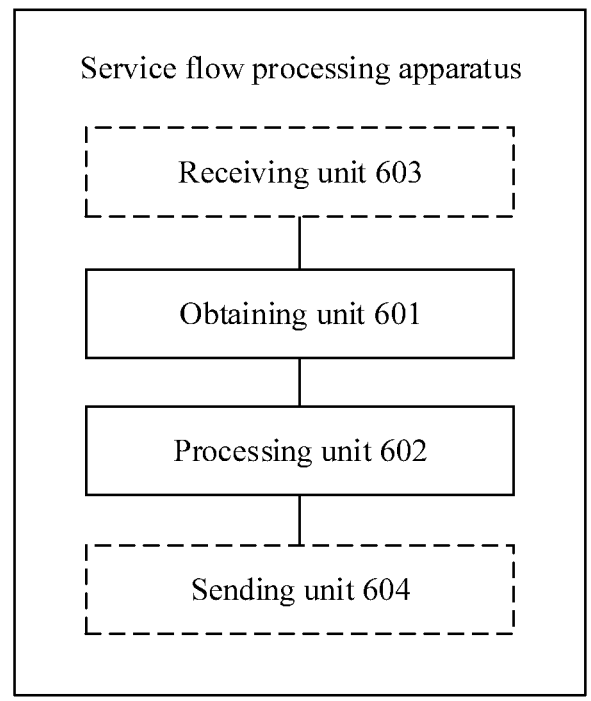
FIG. 29 is a schematic structural diagram 4 of a service flow processing apparatus according to an embodiment of this application.

When an integrated unit is used, FIG. 29 is a possible schematic structural diagram of a service flow processing apparatus in the foregoing embodiments. The service flow processing apparatus may be a core network element or a chip applied to a core network element. The service flow processing apparatus includes an obtaining unit 601 and a processing unit 602.

The obtaining unit 601 is configured to support the service flow processing apparatus in performing steps S201 and S203 in the foregoing embodiment. The processing unit 602 is configured to support the service flow processing apparatus in performing step S202 in the foregoing embodiment.

It should be noted that when the apparatus shown in FIG. 29 is the core network element or the chip applied to the core network element, in a possible implementation, if the core network element is a user plane network element or a policy control network element, the user plane network element or the policy control network element includes the obtaining unit 601 and the processing unit 602.

In another possible implementation, when the core network element is a session management network element, the service flow processing apparatus may further include a receiving unit 603 and a sending unit 604.

The receiving unit 603 is configured to support the service flow processing apparatus in performing step S209 in the foregoing embodiment. The sending unit 604 is configured to support the service flow processing apparatus in performing steps S204, S2021, and S210 in the foregoing embodiments.

In an example, the service flow processing apparatus shown in FIG. 29 may further use a logical structure shown in FIG. 20. When the service flow processing apparatus shown in FIG. 29 may further use the logical structure shown in FIG. 20, the processing module 212 is configured to support the service flow processing apparatus in performing step S202 in the foregoing embodiment. The communications module 213 is configured to support the service flow processing apparatus in performing steps S201 and S203 in the foregoing embodiment.

Optionally, when the core network element is a session management network element, the communications module 213 is further configured to support the service flow processing apparatus in performing steps S204, S2021, S210, and S209.

Figure 30:
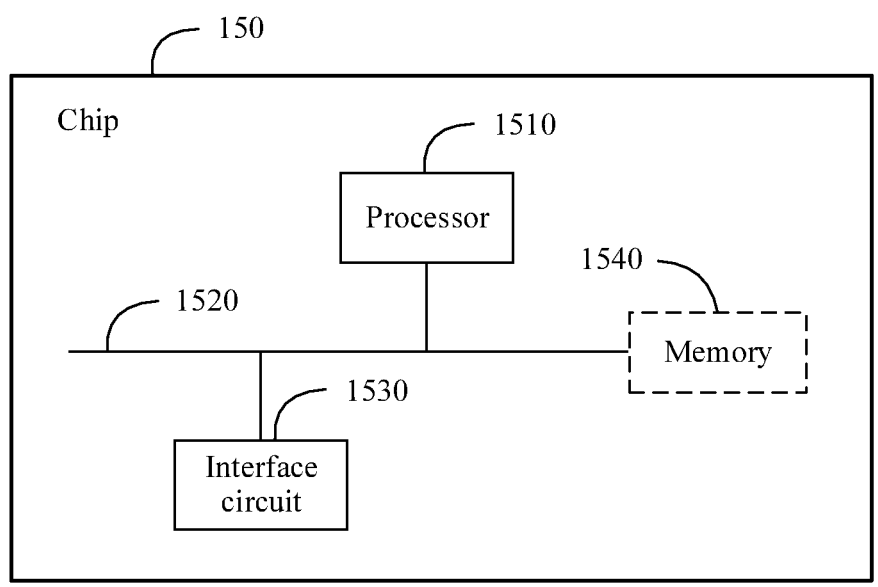
FIG. 30 is a schematic structural diagram of a chip according to an embodiment of this application.

In another example, the service flow processing apparatus shown in FIG. 30 may further use a structure shown in FIG. 21. When the service flow processing apparatus shown in FIG. 29 may further use the structure shown in FIG. 21, the processor 220 is configured to support the service flow processing apparatus in performing step S202 in the foregoing embodiment. The interface circuit 230 is configured to support the service flow processing apparatus in performing steps S201 and S203 in the foregoing embodiment.

Optionally, when the core network element is a session management network element, the interface circuit 230 is further configured to support the service flow processing apparatus in performing steps S204, S2021, S210, and S209.

It should be noted that in the embodiments of this application, the receiving unit or the obtaining unit (or a unit used for receiving/obtaining) is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The sending unit or the transmission unit (or a unit used for sending/transmission) is an interface circuit of the apparatus, and is configured to send a signal to another apparatus. For example, when the apparatus is implemented in a form of a chip, the sending unit is an interface circuit that is of the chip and that is configured to send a signal to another chip or apparatus. The processing unit or the determining unit in the embodiments of this application is a processor of the apparatus, and is configured to process a received signal or process a signal of the apparatus. For example, when the apparatus is implemented in a form of a chip, the processing unit or the determining unit is a processor that is of the chip and that is configured to process a signal received from another chip or apparatus.

FIG. 30 is a schematic structural diagram of a chip 150 according to an embodiment of the present disclosure. The chip 150 includes one or more (including two) processors 1510 and an interface circuit 1530.

Optionally, the chip 150 further includes a memory 1540. The memory 1540 may include a read-only memory (ROM) and a random access memory (RAM), and provide an operation instruction and data for the processor 1510. A part of the memory 1540 may further include a non-volatile random access memory (NVRAM).

In some implementations, the memory 1540 stores the following elements an executable module or a data structure, or a subset thereof, or an extension set thereof.

In this embodiment of the present disclosure, a corresponding operation is performed by invoking the operation instruction stored in the memory 1540 (where the operation instruction may be stored in an operating system).

In a possible implementation, a communications apparatus and a communications capability determining apparatus use a similar chip structure, and different apparatuses may use different chips to implement respective functions.

The processor 1510 controls operations of the communications apparatus and the communications capability determining apparatus. The processor 1510 may also be referred to as a CPU. The memory 1540 may include a ROM and a RAM, and provide an instruction and data for the processor 1510. A part of the memory 1540 may further include a NVRAM. For example, during application, the memory 1540, the interface circuit 1530, and the memory 1540 are coupled together through a bus system 1520. The bus system 1520 may further include a power bus, a control bus, a status signal bus, and the like in addition to a data bus. However, for clear description, various types of buses in FIG. 30 are marked as the bus system 1520.

The method disclosed in the foregoing embodiments of the present disclosure may be applied to the processor 1510, or implemented by the processor 1510. The processor 1510 may be an integrated circuit chip and has a signal processing capability. In an implementation process, steps in the foregoing method may be implemented by using a hardware integrated logical circuit in the processor 1510, or by using instructions in a form of software. The processor 1510 may be a general-purpose processor, a DSP, an ASIC, an FPGA or another programmable logic device, a discrete gate or transistor logic device, or a discrete hardware component. The processor 1510 may implement or perform the methods, the steps, and logical block diagrams that are disclosed in the embodiments of the present disclosure. The general-purpose processor may be a microprocessor, or the processor may be any conventional processor or the like. The steps of the methods disclosed in the embodiments of the present disclosure may be directly performed and completed by a hardware decoding processor, or may be performed and completed by using a combination of hardware and software modules in a decoding processor. The software module may be located in a mature storage medium in the art, such as a RAM, a flash memory, a ROM, a programmable ROM (PROM), an electrically erasable PROM (EEPROM), or a register. The storage medium is located in the memory 1540, and the processor 1510 reads information in the memory 1540 and completes the steps in the foregoing methods in combination with hardware of the processor 1510.

In a possible implementation, the interface circuit 1530 is configured to perform the receiving and sending steps of the terminal and the session management network element in the embodiments shown in FIG. 5 to FIG. 9. The processor 1510 is configured to perform the processing steps of the terminal and the session management network element in the embodiments shown in FIG. 5 to FIG. 9.

In another possible implementation, the interface circuit 1530 is configured to perform the receiving and sending steps of the terminal/the user plane network element and the core network element in the embodiments shown in FIG. 10 to FIG. 13. The processor 1510 is configured to perform the processing steps of the terminal/the user plane network element and the core network element in the embodiments shown in FIG. 10 to FIG. 13.

In still another possible implementation, the interface circuit 1530 is configured to perform the receiving and sending steps of the sending network element and the receiving network element in the embodiment shown in FIG. 14. The processor 1510 is configured to perform the processing steps of the sending network element and the receiving network element in the embodiment shown in FIG. 14.

In the foregoing embodiment, the instruction that is stored in the memory and that is to be executed by the processor may be implemented in a form of a computer program product. The computer program product may be written into the memory in advance, or may be downloaded in a form of software and installed in the memory.

The computer program product includes one or more computer instructions. When the computer program instructions are loaded or executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid state disk (SSD)), or the like.

According to one aspect, a computer readable storage medium is provided. The computer readable storage medium stores an instruction, and when the instruction is run, a terminal or a chip applied to a terminal is enabled to perform steps S103, S104, S1042, S105, S109, S110, S112, S114, and S119 in the embodiments, and/or is configured to perform another process performed by the terminal or the chip applied to the terminal in the technology described in this specification.

According to another aspect, a computer readable storage medium is provided. The computer readable storage medium stores an instruction, and when the instruction is run, a session management network element or a chip applied to a session management network element is enabled to perform steps S101, S102, S106, S107, S108, S111, S116, S117, and S118 in the embodiments, and/or is configured to perform another process performed by the session management network element or the chip applied to the session management network element in the technology described in this specification.

According to still another aspect, a computer readable storage medium is provided. The computer readable storage medium stores an instruction, and when the instruction is run, a sending network element or a chip applied to a sending network element is enabled to perform steps S301, S302, and S303 in the embodiment, and/or is configured to perform another process performed by the sending network element or the chip applied to the sending network element in the technology described in this specification.

According to yet another aspect, a computer readable storage medium is provided. The computer readable storage medium stores an instruction, and when the instruction is run, a receiving network element or a chip applied to a receiving network element is enabled to perform steps S304, S305, and S306 in the embodiment, and/or is configured to perform another process performed by the receiving network element or the chip applied to the receiving network element in the technology described in this specification.

According to still yet another aspect, a computer readable storage medium is provided. The computer readable storage medium stores an instruction, and when the instruction is run, a core network element or a chip applied to a core network element is enabled to perform steps S201, S202, S203, S204, S2021, S209, and S210 in the embodiment, and/or is configured to perform another process performed by the core network element or the chip applied to the core network element in the technology described in this specification.

The foregoing readable storage medium may include any medium that can store program code, such as a Universal Serial Bus (USB) flash drive, a removable hard disk, a read-only memory, a RAM, a magnetic disk, or an optical disc.

According to one aspect, a computer program product including an instruction is provided. The computer program product stores an instruction, and when the instruction is run, a terminal or a chip applied to a terminal is enabled to perform steps S103, S104, S1042, S105, S109, S110, S112, S114, and S119 in the embodiments, and/or is configured to perform another process performed by the terminal or the chip applied to the terminal in the technology described in this specification.

According to another aspect, a computer program product including an instruction is provided. The computer program product stores an instruction, and when the instruction is run, a session management network element or a chip applied to a session management network element is enabled to perform steps S101, S102, S106, S107, S108, S111, S116, S117, and S118 in the embodiments, and/or is configured to perform another process performed by the session management network element or the chip applied to the session management network element in the technology described in this specification.

According to still another aspect, a computer program product including an instruction is provided. The computer program product stores an instruction, and when the instruction is run, a sending network element or a chip applied to a sending network element is enabled to perform steps S301, S302, and S303 in the embodiment, and/or is configured to perform another process performed by the sending network element or the chip applied to the sending network element in the technology described in this specification.

According to yet another aspect, a computer program product including an instruction is provided. The computer program product stores an instruction, and when the instruction is run, a receiving network element or a chip applied to a receiving network element is enabled to perform steps S304, S305, and S306 in the embodiment, and/or is configured to perform another process performed by the receiving network element or the chip applied to the receiving network element in the technology described in this specification.

According to still yet another aspect, an embodiment of this application provides a computer program product including an instruction. The computer program product stores an instruction, and when the instruction is run, a core network element or a chip applied to a core network element is enabled to perform steps S201, S202, S203, S204, S2021, S209, and S210 in the embodiment.

According to one aspect, a chip is provided. The chip is applied to a terminal. The chip includes one or more (including two) processors and an interface circuit. The interface circuit is interconnected with the one or more (including two) processors by using a line, and the processor is configured to run an instruction, to perform steps S103, S104, S1042, S105, S109, S110, S112, S114, and S119 in the embodiments, and/or is configured to perform another process performed by the terminal in the technology described in this specification.

According to another aspect, a chip is provided. The chip is applied to a session management network element. The chip includes one or more (including two) processors and an interface circuit. The interface circuit is interconnected with the one or more (including two) processors by using a line, and the processor is configured to run an instruction, to perform steps S101, S102, S106, S107, S108, S111, S116, S117, and S118 in the embodiments, and/or is configured to perform another process performed by the session management network element in the technology described in this specification.

According to still another aspect, a chip is provided. The chip is applied to a sending network element. The chip includes one or more (including two) processors and an interface circuit. The interface circuit is interconnected with the one or more (including two) processors by using a line, and the processor is configured to run an instruction, to perform steps S301, S302, and S303 in the embodiment, and/or is configured to perform another process performed by the sending network element in the technology described in this specification.

According to yet another aspect, a chip is provided. The chip is applied to a receiving network element. The chip includes one or more (including two) processors and an interface circuit. The interface circuit is interconnected with the one or more (including two) processors by using a line, and the processor is configured to run an instruction, to perform steps S304, S305, and S306 in the embodiment, and/or is configured to perform another process performed by the receiving network element in the technology described in this specification.

According to still yet another aspect, a chip is provided. The chip is applied to a core network element. The chip includes one or more (including two) processors and an interface circuit. The interface circuit is interconnected with the one or more (including two) processors by using a line, and the processor is configured to run an instruction, to perform steps S201, S202, S203, S204, S2021, S209, and S210 in the embodiment, and/or is configured to perform another process performed by the core network element in the technology described in this specification.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded or executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a SSD), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to this application without departing from the scope of this application. Correspondingly, the specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:
1. A service flow processing method, comprising:
obtaining, by a terminal, policy information of a service flow, wherein the policy information comprises a flow steering mode, and link condition information of a link for transmitting the service flow, and wherein the link condition information comprises at least one of a link delay threshold value or a link packet loss rate threshold value;
determining, by the terminal, first link status information of a current link that does not meet the link condition information; and
processing, by the terminal, the service flow based on the flow steering mode and the terminal determining that the first link status information does not meet the link condition information.

2. The service flow processing method of claim 1, further comprising:
sending, by the terminal, a protocol data unit (PDU) session request message to a core network element, wherein the PDU session request message comprises link detection information to obtain second link status information of a second link; and
receiving, by the terminal, from the core network element, the second link status information.

3. The service flow processing method of claim 1, wherein processing the service flow comprises: transmitting, by the terminal, the service flow on links corresponding to a plurality of access technologies of a protocol data unit (PDU);
migrating, by the terminal, from a first link corresponding to a first access technology of the access technologies to a second link corresponding to a second access technology of the access technologies, the service flow; or
migrating, by the terminal, from the links corresponding to the access technologies to the first link or the second link, the service flow.

4. The service flow processing method of claim 2, wherein the link detection information comprises a subscribed link status parameter.

5. The service flow processing method of claim 4, wherein the subscribed link status parameter comprises one or more of a link delay parameter or a link packet loss rate parameter.

6. The service flow processing method of claim 4, wherein the link detection information further comprises a quality of service (QoS) flow identifier (QFI).

7. The service flow processing method of claim 1, wherein obtaining, by the terminal, the policy information comprises obtaining, by the terminal, through a session management response message from a session management network element, the flow steering mode of the service flow and the link condition information.

8. The service flow processing method of claim 1, further comprising sending, by the terminal, to a core network element, indication information indicating that the terminal processes the service flow.

9. The service flow processing method of claim 1, wherein determining that the first link status information of the current link that does not meet the link condition information further comprises determining, by the terminal, that the first link status information of the current link exceeds the link condition information.

10. The service flow processing method of claim 1, wherein obtaining the policy information comprises obtaining, by the terminal, at least one of the flow steering mode or the link condition information from a non-access stratum (NAS) transport message.

11. An apparatus comprising:
a processor; and
a memory coupled to the processor and configured to store instructions that, when executed by the processor, cause the apparatus to be configured to:
obtain policy information of a service flow, wherein the policy information comprises a flow steering mode and link condition information of a link for transmitting the service flow, and wherein the link condition information comprises at least one of a link delay threshold or a link packet loss rate threshold;
determine first link status information of a current link does not meet the link condition information; and
process the service flow based on the flow steering mode and the apparatus determining that the first link status information does not meet the link condition information.

12. The apparatus of claim 11, wherein the instructions further cause the apparatus to be configured to:
send a protocol data unit (PDU) session request message to a core network element, wherein the PDU session request message comprises link detection information to obtain second link status information of a second link; and
receive, from the core network element, the second link status information.

13. The apparatus of claim 12, wherein the second link status information comprises a recommended bandwidth of an access network device.

14. The apparatus of claim 11, wherein the instructions further cause the apparatus to be configured to:
transmit the service flow on links corresponding to a plurality of access technologies of a protocol data unit (PDU);
migrate, from a first link corresponding to a first access technology of the access technologies to a second link corresponding to a second access technology of the access technologies, the service flow; or
migrate, from the links corresponding to the access technologies to the first link or the second link, the service flow.

15. The apparatus of claim 12, wherein the link detection information comprises a subscribed link status parameter.

16. The apparatus of claim 15, wherein the subscribed link status parameter comprises a link delay parameter.

17. The apparatus of claim 15, wherein the subscribed link status parameter comprises a link packet loss rate parameter.

18. The apparatus of claim 11, wherein the instructions further cause the apparatus to be configured to send, to a core network element, indication information indicating that the apparatus processes the service flow.

19. A computer program product comprising computer-executable instructions stored on a non-transitory computer-readable medium that, when executed by a processor, cause an apparatus to:
obtain policy information of a service flow, wherein the policy information comprises a flow steering mode and link condition information of a link for transmitting the service flow, and wherein the link condition information comprises at least one of a link delay threshold or a link packet loss rate threshold;
determine first link status information of a current link does not meet the link condition information; and
process the service flow based on the flow steering mode and the apparatus determining that the first link status information does not meet the link condition information.

20. The computer program product of claim 19, wherein the apparatus obtains at least one of the flow steering mode or the link condition information via a non-access stratum (NAS) transport message.

* * * * *